(12) United States Patent
Rivera

(10) Patent No.: US 12,369,742 B2
(45) Date of Patent: *Jul. 29, 2025

(54) WINDOWED SINGLE-SERVING BREWING MATERIAL HOLDER

(71) Applicant: Adrian Rivera, Whittier, CA (US)

(72) Inventor: Adrian Rivera, Whittier, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/505,598

(22) Filed: Oct. 19, 2021

(65) Prior Publication Data

US 2022/0079372 A1 Mar. 17, 2022

Related U.S. Application Data

(62) Division of application No. 16/900,462, filed on Jun. 12, 2020, now Pat. No. 11,337,543.

(51) Int. Cl.
*A47J 31/44* (2006.01)
*A47J 31/40* (2006.01)
*B65B 29/02* (2006.01)

(52) U.S. Cl.
CPC ......... *A47J 31/4403* (2013.01); *A47J 31/404* (2013.01); *A47J 31/407* (2013.01); *B65B 29/022* (2017.08)

(58) Field of Classification Search
CPC .... A47J 31/4403; A47J 31/407; A47J 31/404; B65B 29/022
USPC ........................................................... 99/295
See application file for complete search history.

(56) References Cited

U.S. PATENT DOCUMENTS

| 1,377,316 | A | 5/1921 | Clermont |
| 2,234,397 | A | 3/1941 | Bentz |
| 2,242,684 | A | 5/1941 | Stuart |
| 2,407,118 | A | 9/1946 | Waters |
| 2,433,815 | A | 12/1947 | Laforge |
| 2,443,520 | A | 6/1948 | Schwartz et al. |
| 2,546,874 | A | 3/1951 | Siegrist |

(Continued)

FOREIGN PATENT DOCUMENTS

| CN | 2615077 Y | 5/2004 |
| DE | 102011012860 A1 | 12/2012 |

(Continued)

OTHER PUBLICATIONS

Keurig® My K-Cup® Reusable Coffee Filter, https://www.keurig.com/My-K-Cup%C2%AE-Reusable-Coffee-Filter/p/My-K-Cup-Universal-Reusable-Coffee-Filter#.

(Continued)

*Primary Examiner* — Jimmy Chou
(74) *Attorney, Agent, or Firm* — IP Strategies

(57) ABSTRACT

A container includes a receptacle and a cover. The receptacle includes a base and a sidewall. The base has an interior surface and a passageway in an interior area of the base. The passageway provides fluid communication from an interior of the receptacle to an exterior of the receptacle. The sidewall extends upward from the interior surface of the base. The cover is configured to sealingly engage with a top edge of the sidewall, and includes a cover opening. The container is configured to accept input fluid through the cover opening and to provide a corresponding outflow of fluid through the passageway. The passageway allows the outflow fluid to flow from the container while accommodating an outflow needle of a beverage brewer.

24 Claims, 34 Drawing Sheets

(56) References Cited

U.S. PATENT DOCUMENTS

| | | | |
|---|---|---|---|
| 2,968,560 A * | 1/1961 | Goros | B65D 85/8043 |
| | | | 426/115 |
| 3,022,411 A | 2/1962 | Soper et al. | |
| 3,115,822 A | 12/1963 | Totten | |
| 3,120,170 A | 2/1964 | Garte | |
| 3,136,241 A | 6/1964 | Price | |
| 3,199,682 A | 8/1965 | Scholtz | |
| 3,224,360 A | 12/1965 | Wickenberg et al. | |
| 3,316,388 A | 4/1967 | Wickenberg et al. | |
| 3,336,857 A | 8/1967 | Knodt et al. | |
| 3,384,004 A | 5/1968 | Perlman et al. | |
| 3,403,617 A | 10/1968 | Lampe | |
| 3,405,630 A | 10/1968 | Weber, III | |
| 3,583,308 A | 6/1971 | Williams | |
| 3,592,126 A | 7/1971 | Dombrowik | |
| 3,607,297 A | 9/1971 | Fasano | |
| 3,615,708 A * | 10/1971 | Abile-Gal | A47J 31/02 |
| | | | 426/77 |
| 3,695,168 A | 10/1972 | Van Brunt | |
| 3,713,377 A | 1/1973 | Arnett et al. | |
| 3,757,670 A | 9/1973 | Laama et al. | |
| 3,844,206 A | 10/1974 | Weber | |
| 3,948,157 A | 4/1976 | Layre | |
| 3,958,502 A | 5/1976 | Vitous | |
| 4,052,318 A | 10/1977 | Krebs | |
| 4,086,848 A | 5/1978 | Hahn | |
| 4,136,202 A * | 1/1979 | Favre | B65D 85/8049 |
| | | | 426/77 |
| 4,143,590 A | 3/1979 | Kasakoff | |
| 4,152,464 A | 5/1979 | Brody et al. | |
| 4,164,644 A | 8/1979 | Remsnyder et al. | |
| D255,313 S | 6/1980 | Elkerbout | |
| 4,221,670 A | 9/1980 | Ziemek | |
| 4,253,385 A | 3/1981 | Illy | |
| 4,286,515 A | 9/1981 | Baumann et al. | |
| 4,510,853 A | 4/1985 | Takagi | |
| 4,550,024 A | 10/1985 | le Granse | |
| 4,603,621 A | 8/1986 | Roberts | |
| 4,653,390 A | 3/1987 | Hayes | |
| 4,656,932 A | 4/1987 | Kopp | |
| 4,676,396 A | 6/1987 | Mamolou | |
| 4,703,687 A | 11/1987 | Wei | |
| 4,704,954 A | 11/1987 | Mollenhoff | |
| 4,706,555 A | 11/1987 | Nakamura et al. | |
| 4,721,835 A * | 1/1988 | Welker | A47J 31/547 |
| | | | 426/433 |
| 4,735,719 A | 4/1988 | Benedict | |
| 4,739,697 A | 4/1988 | Roberts | |
| 4,800,089 A | 1/1989 | Scott | |
| 4,832,845 A | 5/1989 | Hendretti | |
| 4,833,979 A | 5/1989 | Garulli et al. | |
| 4,836,592 A | 6/1989 | Roberts | |
| 4,846,052 A * | 7/1989 | Favre | A47J 31/3695 |
| | | | 99/302 R |
| 4,848,815 A | 7/1989 | Molloy | |
| 4,858,523 A | 8/1989 | Helbling | |
| 4,865,737 A | 9/1989 | McMichael | |
| 4,867,993 A * | 9/1989 | Nordskog | A47J 31/02 |
| | | | 426/82 |
| 4,882,982 A * | 11/1989 | Muttoni | A47J 31/0605 |
| | | | 99/295 |
| 4,957,217 A | 9/1990 | Ritson | |
| 4,967,648 A | 11/1990 | Helbling | |
| 4,986,172 A | 1/1991 | Hunnicutt, Jr. | |
| 4,995,310 A | 2/1991 | van der Lijn et al. | |
| 4,998,463 A | 3/1991 | Precht et al. | |
| 5,000,082 A | 3/1991 | Lassota | |
| 5,012,059 A | 4/1991 | Boatman | |
| 5,012,629 A | 5/1991 | Rehman et al. | |
| 5,028,328 A | 7/1991 | Long | |
| 5,046,409 A | 9/1991 | Henn | |
| 5,072,660 A | 12/1991 | Helbling | |
| 5,097,984 A | 3/1992 | Meisner et al. | |
| 5,120,439 A | 6/1992 | McFarlin | |
| 5,123,335 A | 6/1992 | Aselu | |
| 5,171,457 A | 12/1992 | Acuff et al. | |
| 5,190,653 A | 3/1993 | Herrick et al. | |
| 5,197,374 A | 3/1993 | Fond | |
| 5,233,914 A | 8/1993 | English | |
| 5,242,702 A * | 9/1993 | Fond | B65D 85/8061 |
| | | | 426/77 |
| 5,265,517 A | 11/1993 | Gilbert | |
| 5,287,797 A | 2/1994 | Grykiewicz et al. | |
| 5,298,267 A | 3/1994 | Gruenbacher | |
| 5,325,765 A * | 7/1994 | Sylvan | A47J 31/3695 |
| | | | 426/77 |
| 5,327,815 A * | 7/1994 | Fond | A47J 31/369 |
| | | | 99/302 R |
| 5,335,589 A | 8/1994 | Yerves, Jr. et al. | |
| 5,343,799 A | 9/1994 | Fond | |
| 5,347,916 A | 9/1994 | Fond et al. | |
| 5,363,745 A | 11/1994 | Lin | |
| 5,398,595 A * | 3/1995 | Fond | A47J 31/0668 |
| | | | 99/302 R |
| 5,398,596 A | 3/1995 | Fond | |
| 5,401,328 A | 3/1995 | Schmitz | |
| 5,402,707 A * | 4/1995 | Fond | A47J 31/3695 |
| | | | 99/302 R |
| 5,403,605 A | 4/1995 | Smith et al. | |
| 5,406,882 A | 4/1995 | Shaanan | |
| 5,460,078 A * | 10/1995 | Weller | A47J 31/103 |
| | | | 99/295 |
| 5,463,932 A | 11/1995 | Olson | |
| 5,472,719 A * | 12/1995 | Favre | B65D 85/8061 |
| | | | 426/77 |
| 5,473,973 A * | 12/1995 | Cortese | A47J 31/0605 |
| | | | 99/302 R |
| 5,490,448 A | 2/1996 | Weller et al. | |
| 5,526,733 A | 6/1996 | Klawuhn et al. | |
| 5,531,152 A | 7/1996 | Gardosi | |
| 5,562,941 A | 10/1996 | Levy | |
| 5,582,730 A | 12/1996 | Hugentobler | |
| 5,582,731 A | 12/1996 | Gianfranco | |
| 5,635,233 A | 6/1997 | Levinson | |
| 5,636,563 A | 6/1997 | Oppermann et al. | |
| 5,649,412 A | 7/1997 | Binacchi | |
| 5,649,472 A * | 7/1997 | Fond | A47J 31/4464 |
| | | | 99/302 R |
| 5,656,311 A * | 8/1997 | Fond | B65D 85/8061 |
| | | | 426/77 |
| 5,669,287 A | 9/1997 | Jefferson, Jr. et al. | |
| 5,676,041 A | 10/1997 | Glucksman et al. | |
| 5,687,637 A * | 11/1997 | Brookshire | A47J 45/085 |
| | | | 99/302 R |
| 5,746,113 A * | 5/1998 | Ko | A47G 19/16 |
| | | | 99/279 |
| 5,762,987 A * | 6/1998 | Fond | B65D 85/8043 |
| | | | 99/302 R |
| 5,775,206 A | 7/1998 | St-Gelais | |
| 5,826,492 A * | 10/1998 | Fond | B65D 85/8043 |
| | | | 99/302 R |
| 5,829,340 A | 11/1998 | Yang | |
| 5,840,189 A | 11/1998 | Sylvan et al. | |
| 5,865,094 A | 2/1999 | Kealy | |
| 5,870,943 A | 2/1999 | Levi et al. | |
| 5,887,510 A | 3/1999 | Porter | |
| D407,602 S | 4/1999 | Patel | |
| 5,895,672 A | 4/1999 | Cooper | |
| 5,897,899 A * | 4/1999 | Fond | A47J 31/3695 |
| | | | 426/77 |
| 5,910,205 A | 6/1999 | Patel | |
| 5,913,964 A | 6/1999 | Melton | |
| 5,924,563 A | 7/1999 | Salyers | |
| 5,931,329 A | 8/1999 | Wu | |
| 5,932,260 A | 8/1999 | Soughan | |
| 6,065,609 A | 5/2000 | Lake | |
| 6,079,315 A * | 6/2000 | Beaulieu | A47J 31/4467 |
| | | | 99/302 R |
| 6,082,247 A * | 7/2000 | Beaulicu | A47J 31/402 |
| | | | 222/394 |
| D431,423 S | 10/2000 | Ohm et al. | |
| 6,136,352 A | 10/2000 | Silverstein et al. | |

(56) References Cited

U.S. PATENT DOCUMENTS

| | | | |
|---|---|---|---|
| 6,138,551 A | 10/2000 | Bauer et al. | |
| 6,142,063 A * | 11/2000 | Beaulieu | A47J 31/3623 |
| | | | 99/302 R |
| 6,182,554 B1 * | 2/2001 | Beaulieu | A47J 31/3638 |
| | | | 99/302 R |
| 6,189,438 B1 * | 2/2001 | Bielfeldt | A47J 31/08 |
| | | | 99/321 |
| 6,202,542 B1 | 3/2001 | Melton | |
| RE37,173 E | 5/2001 | Jefferson, Jr. et al. | |
| 6,227,102 B1 | 5/2001 | Sham et al. | |
| 6,231,909 B1 | 5/2001 | Levinson | |
| 6,250,209 B1 | 6/2001 | Pope | |
| 6,253,662 B1 | 7/2001 | Zelson | |
| 6,263,781 B1 | 7/2001 | Calagui | |
| 6,273,293 B1 | 8/2001 | Carlson | |
| D454,433 S | 3/2002 | Peter | |
| 6,440,256 B1 | 8/2002 | Gordon et al. | |
| 6,499,388 B2 | 12/2002 | Schmed | |
| D474,110 S | 5/2003 | Sweeney | |
| D474,111 S | 5/2003 | Lazaris | |
| 6,589,577 B2 | 7/2003 | Lazaris et al. | |
| 6,606,938 B2 * | 8/2003 | Taylor | A47J 31/32 |
| | | | 426/77 |
| 6,607,762 B2 | 8/2003 | Lazaris et al. | |
| 6,644,173 B2 * | 11/2003 | Lazaris | A47J 31/446 |
| | | | 99/302 R |
| 6,645,537 B2 | 11/2003 | Sweeney et al. | |
| 6,655,260 B2 | 12/2003 | Lazaris et al. | |
| 6,658,989 B2 | 12/2003 | Sweeney et al. | |
| 6,662,955 B1 | 12/2003 | Lassota | |
| 6,666,130 B2 * | 12/2003 | Taylor | A47J 31/3695 |
| | | | 222/394 |
| 6,672,200 B2 * | 1/2004 | Duffy | A47J 31/0642 |
| | | | 222/394 |
| 6,688,490 B2 | 2/2004 | Carlson | |
| 6,708,600 B2 | 3/2004 | Winkler et al. | |
| 6,727,484 B2 | 4/2004 | Policappelli | |
| 6,740,345 B2 | 5/2004 | Cai | |
| 6,758,130 B2 | 7/2004 | Sargent et al. | |
| 6,777,007 B2 | 8/2004 | Cai | |
| 6,786,136 B2 | 9/2004 | Cirigliano et al. | |
| 6,832,542 B2 * | 12/2004 | Hu | A47J 31/0673 |
| | | | 99/302 R |
| 6,843,165 B2 | 1/2005 | Stoner | |
| D502,362 S | 3/2005 | Lazaris et al. | |
| 6,904,840 B1 | 6/2005 | Pfeifer et al. | |
| 6,931,984 B2 * | 8/2005 | Lassota | A47J 31/52 |
| | | | 99/283 |
| 6,948,420 B2 | 9/2005 | Kirschner et al. | |
| 6,968,775 B2 | 11/2005 | Burrows et al. | |
| 7,047,870 B2 | 5/2006 | Gantt et al. | |
| 7,063,238 B2 * | 6/2006 | Hale | A47J 31/3638 |
| | | | 222/83.5 |
| 7,081,263 B2 | 7/2006 | Albrecht | |
| 7,131,369 B2 | 11/2006 | Gantt et al. | |
| 7,165,488 B2 | 1/2007 | Bragg et al. | |
| 7,279,188 B2 * | 10/2007 | Arrick | B65D 85/8055 |
| | | | 426/86 |
| 7,318,374 B2 | 1/2008 | Guerrero | |
| 7,320,274 B2 | 1/2008 | Castellani | |
| D567,021 S | 4/2008 | Bach et al. | |
| 7,377,089 B2 | 5/2008 | Rapparini | |
| 7,444,925 B2 * | 11/2008 | Mahlich | G06K 19/06168 |
| | | | 99/289 P |
| 7,461,587 B2 | 12/2008 | Guerrero | |
| 7,490,542 B2 * | 2/2009 | Macchi | A47J 31/3695 |
| | | | 426/77 |
| 7,552,672 B2 * | 6/2009 | Schmed | B65D 85/8061 |
| | | | 426/77 |
| 7,604,826 B2 * | 10/2009 | Denisart | B65D 85/8046 |
| | | | 426/77 |
| 7,624,673 B2 * | 12/2009 | Zanetti | B65D 85/8052 |
| | | | 426/77 |
| 7,681,492 B2 * | 3/2010 | Suggi Liverani | B65D 85/8043 |
| | | | 426/77 |
| 7,703,381 B2 * | 4/2010 | Liverani | A47J 31/3695 |
| | | | 99/302 R |
| 7,730,829 B2 | 7/2010 | Hammad | |
| 7,815,953 B2 * | 10/2010 | Mastropasqua | B65D 85/8061 |
| | | | 99/302 R |
| 7,836,819 B2 * | 11/2010 | Suggi Liverani | B65D 85/8055 |
| | | | 99/302 R |
| 7,836,820 B2 * | 11/2010 | Hammad | A47J 31/0605 |
| | | | 426/433 |
| 7,854,192 B2 * | 12/2010 | Denisart | A47J 31/3695 |
| | | | 99/302 R |
| 7,856,920 B2 * | 12/2010 | Schmed | A47J 31/3695 |
| | | | 99/305 |
| 7,856,921 B2 * | 12/2010 | Arrick | B65D 85/8055 |
| | | | 426/115 |
| 7,878,108 B2 * | 2/2011 | Mock | B65D 85/8055 |
| | | | 426/77 |
| 7,930,972 B2 * | 4/2011 | Denisart | A47J 31/4496 |
| | | | 99/302 R |
| 7,946,217 B2 * | 5/2011 | Favre | A47J 31/0668 |
| | | | 99/302 R |
| 7,993,691 B2 * | 8/2011 | Yoakim | B65D 85/8064 |
| | | | 426/77 |
| 8,039,029 B2 * | 10/2011 | Ozanne | B65D 85/8061 |
| | | | 426/77 |
| 8,047,127 B2 | 11/2011 | Lin | |
| 8,087,347 B2 * | 1/2012 | Halliday | A47J 31/4492 |
| | | | 99/279 |
| 8,147,887 B2 * | 4/2012 | Dogan | B65D 85/8052 |
| | | | 426/77 |
| 8,161,866 B2 * | 4/2012 | Kollep | B65D 85/8064 |
| | | | 426/77 |
| 8,161,868 B2 * | 4/2012 | Bolzicco | B65D 85/8061 |
| | | | 426/77 |
| 8,202,560 B2 * | 6/2012 | Yoakim | B65D 85/8064 |
| | | | 426/77 |
| 8,220,382 B2 * | 7/2012 | Verbeek | B67D 1/0045 |
| | | | 426/77 |
| 8,221,813 B2 | 7/2012 | Boul | |
| 8,304,006 B2 * | 11/2012 | Yoakim | A47J 31/0678 |
| | | | 99/302 R |
| 8,322,271 B2 * | 12/2012 | Glucksman | B65D 85/8049 |
| | | | 99/302 R |
| 8,327,754 B2 | 12/2012 | Kirschner et al. | |
| 8,424,447 B2 * | 4/2013 | Colantonio | B65D 85/8061 |
| | | | 99/302 R |
| 8,491,948 B2 * | 7/2013 | Ozanne | B65D 85/8055 |
| | | | 426/77 |
| D688,095 S | 8/2013 | DeMiglio et al. | |
| 8,512,886 B2 * | 8/2013 | Ozanne | B65D 85/8055 |
| | | | 429/79 |
| 8,561,524 B2 * | 10/2013 | DeMiglio | A47J 31/0689 |
| | | | 99/305 |
| D694,579 S | 12/2013 | Khubani | |
| 8,640,604 B2 * | 2/2014 | Doglioni Majer | B65D 85/8043 |
| | | | 426/77 |
| 8,695,484 B2 * | 4/2014 | Mori | A47J 31/44 |
| | | | 220/908 |
| 8,707,855 B2 * | 4/2014 | DeMiglio | A47J 31/0689 |
| | | | 99/279 |
| 8,720,320 B1 * | 5/2014 | Rivera | A47J 31/0678 |
| | | | 99/295 |
| 8,794,125 B1 * | 8/2014 | Rivera | B65B 29/025 |
| | | | 99/295 |
| 8,846,120 B2 * | 9/2014 | Wong | B65D 77/38 |
| | | | 426/77 |
| 8,927,037 B2 * | 1/2015 | Kihnke | A47J 31/0673 |
| | | | 426/77 |
| 9,023,412 B2 | 5/2015 | Doleac et al. | |
| 9,149,149 B2 | 10/2015 | Oh | |
| 9,232,871 B2 * | 1/2016 | Rivera | A47J 31/0689 |
| 9,232,872 B2 | 1/2016 | Rivera | |
| 9,271,597 B2 | 3/2016 | Rivera | |
| 9,277,837 B2 * | 3/2016 | Yoakim | B65D 85/8055 |

(56) References Cited

U.S. PATENT DOCUMENTS

| | | | |
|---|---|---|---|
| 9,320,385 B2 * | 4/2016 | Spiegel | A47J 31/3676 |
| 9,392,902 B2 * | 7/2016 | Perentes | H01H 35/00 |
| 9,402,501 B1 * | 8/2016 | Vu | A47J 31/407 |
| 9,409,704 B2 * | 8/2016 | Digiuni | B65D 85/8061 |
| 9,415,931 B2 * | 8/2016 | Gerbaulet | A47J 31/22 |
| 9,428,328 B2 * | 8/2016 | Trombetta | B65B 29/022 |
| 9,434,525 B2 * | 9/2016 | Fabozzi | B65D 81/18 |
| 9,463,921 B2 * | 10/2016 | Oh | B65D 85/8052 |
| 9,486,108 B1 * | 11/2016 | Douglas | B65D 85/804 |
| 9,756,974 B2 * | 9/2017 | Rivera | A47J 31/06 |
| 9,764,891 B1 * | 9/2017 | Aviles | B65D 85/8061 |
| 9,795,243 B2 | 10/2017 | Rivera | |
| 9,844,292 B2 | 12/2017 | Rivera | |
| 9,907,425 B2 | 3/2018 | Rivera | |
| 10,010,211 B2 * | 7/2018 | Digiuni | B65D 85/8061 |
| 10,144,579 B2 * | 12/2018 | Perentes | B65D 85/8049 |
| 10,336,531 B2 | 7/2019 | Trombetta et al. | |
| 10,450,130 B2 | 10/2019 | Hansen | |
| 10,450,131 B2 | 10/2019 | Norton et al. | |
| 10,858,177 B2 * | 12/2020 | Krüger | B65D 85/8058 |
| 10,870,531 B2 * | 12/2020 | Krüger | A47J 31/4492 |
| 10,994,923 B2 * | 5/2021 | Krüger | A47J 31/4492 |
| 11,001,433 B2 * | 5/2021 | Mühlemann | B65D 81/3216 |
| 11,001,436 B2 * | 5/2021 | Marcinkowski | B65B 29/022 |
| 11,001,437 B2 * | 5/2021 | Wicks | B65D 85/8052 |
| 11,166,587 B2 * | 11/2021 | Van Davelaar | B65D 85/8043 |
| 11,254,491 B2 * | 2/2022 | Krüger | B65D 85/8061 |
| 11,337,543 B2 * | 5/2022 | Rivera | A47J 31/407 |
| 2001/0043954 A1 | 11/2001 | Sweet | |
| 2002/0005367 A1 | 1/2002 | Zelson | |
| 2002/0023543 A1 * | 2/2002 | Schmed | A47J 31/58 99/302 R |
| 2002/0035929 A1 | 3/2002 | Kanba et al. | |
| 2002/0048621 A1 * | 4/2002 | Boyd | B65D 85/8046 426/77 |
| 2002/0059870 A1 | 5/2002 | Walters Jr et al. | |
| 2002/0078831 A1 * | 6/2002 | Cai | A47J 31/14 99/295 |
| 2002/0088807 A1 * | 7/2002 | Perkovic | B65D 85/8046 99/279 |
| 2002/0144602 A1 * | 10/2002 | Taylor | A47J 31/3695 99/289 R |
| 2002/0144603 A1 * | 10/2002 | Taylor | A47J 31/32 99/295 |
| 2002/0144604 A1 * | 10/2002 | Winkler | A47J 31/3695 99/302 R |
| 2002/0148356 A1 | 10/2002 | Lazaris et al. | |
| 2002/0148358 A1 | 10/2002 | Sweeney et al. | |
| 2002/0152895 A1 * | 10/2002 | Duffy | A47J 31/0642 99/279 |
| 2003/0006185 A1 | 1/2003 | Hepler | |
| 2003/0041739 A1 | 3/2003 | Cai | |
| 2003/0167928 A1 | 9/2003 | Mulle et al. | |
| 2003/0172813 A1 * | 9/2003 | Schifferle | A47J 31/0673 99/275 |
| 2003/0200872 A1 | 10/2003 | Lin | |
| 2003/0213370 A1 | 11/2003 | Hammad et al. | |
| 2003/0222089 A1 | 12/2003 | Hale | |
| 2003/0226449 A1 | 12/2003 | Carasso et al. | |
| 2004/0005384 A1 * | 1/2004 | Cai | A47J 31/0678 426/77 |
| 2004/0020368 A1 | 2/2004 | Cai | |
| 2004/0020922 A1 | 2/2004 | Alves | |
| 2004/0045443 A1 | 3/2004 | Lazaris et al. | |
| 2004/0118290 A1 | 6/2004 | Cai | |
| 2004/0182247 A1 | 9/2004 | Guerrero | |
| 2004/0216616 A1 * | 11/2004 | Meador | A47J 31/0573 99/279 |
| 2004/0244600 A1 | 12/2004 | Lalanne-Eygun | |
| 2004/0250686 A1 * | 12/2004 | Hale | A47J 31/0673 99/295 |
| 2005/0051478 A1 * | 3/2005 | Karanikos | B65D 85/8061 210/477 |
| 2005/0084569 A1 * | 4/2005 | Hu | A47J 31/0673 426/118 |
| 2005/0115415 A1 * | 6/2005 | Arrick | B65D 85/8055 99/348 |
| 2005/0150390 A1 * | 7/2005 | Schifferle | B65D 85/8061 99/295 |
| 2005/0150391 A1 * | 7/2005 | Schifferle | A47J 31/3695 99/295 |
| 2005/0160918 A1 | 7/2005 | Winstanley et al. | |
| 2005/0172819 A1 | 8/2005 | Chen et al. | |
| 2005/0223904 A1 * | 10/2005 | Laigneau | A47J 31/3695 206/0.5 |
| 2005/0236323 A1 | 10/2005 | Oliver et al. | |
| 2005/0257695 A1 | 11/2005 | Dobranski et al. | |
| 2005/0266122 A1 * | 12/2005 | Franceschi | B65D 85/8046 426/77 |
| 2005/0284303 A1 | 12/2005 | Zell et al. | |
| 2006/0019000 A1 * | 1/2006 | Zanetti | B65D 85/8055 426/112 |
| 2006/0065127 A1 * | 3/2006 | Dalton | B65D 85/8046 99/279 |
| 2006/0107841 A1 * | 5/2006 | Schifferle | A47J 31/0668 99/279 |
| 2006/0110507 A1 * | 5/2006 | Yoakim | B65D 85/8064 426/433 |
| 2006/0159815 A1 | 7/2006 | Crook et al. | |
| 2006/0174769 A1 * | 8/2006 | Favre | A47J 31/0678 99/275 |
| 2006/0196364 A1 * | 9/2006 | Kirschner | A47J 31/3623 99/295 |
| 2006/0230944 A1 | 10/2006 | Neace et al. | |
| 2006/0236871 A1 * | 10/2006 | Ternite | B65D 85/8061 99/295 |
| 2006/0254428 A1 | 11/2006 | Glucksman et al. | |
| 2007/0062375 A1 * | 3/2007 | Liverani | B65D 85/8043 99/279 |
| 2007/0068395 A1 * | 3/2007 | Masek | B65D 85/8046 99/295 |
| 2007/0084352 A1 * | 4/2007 | Yuen | A47J 31/3685 99/295 |
| 2007/0144355 A1 * | 6/2007 | Denisart | A47J 31/3695 99/275 |
| 2007/0148290 A1 * | 6/2007 | Ternite | B65D 85/8043 426/90 |
| 2007/0151460 A1 | 7/2007 | Beck | |
| 2007/0175334 A1 | 8/2007 | Halliday et al. | |
| 2007/0181003 A1 * | 8/2007 | Bardazzi | A47J 31/0673 99/279 |
| 2007/0186784 A1 * | 8/2007 | Liverani | A47J 31/0668 99/295 |
| 2007/0224319 A1 * | 9/2007 | Yoakim | A47J 31/3628 426/433 |
| 2007/0277677 A1 | 12/2007 | Roberg | |
| 2008/0026121 A1 * | 1/2008 | Mastropasqua | B65D 85/8061 426/433 |
| 2008/0105131 A1 * | 5/2008 | Castellani | A47J 31/3695 99/295 |
| 2008/0187638 A1 | 8/2008 | Hansen | B65D 85/8058 426/433 |
| 2008/0216666 A1 * | 9/2008 | Doglioni Majer | B65D 85/8043 222/1 |
| 2008/0245236 A1 * | 10/2008 | Ternite | A47J 31/3623 99/295 |
| 2008/0257165 A1 * | 10/2008 | Bolzicco | B65D 85/8061 99/295 |
| 2008/0317931 A1 * | 12/2008 | Mandralis | A23F 5/24 426/594 |
| 2009/0007794 A1 * | 1/2009 | Cortese | A47J 31/3638 99/289 R |
| 2009/0007796 A1 * | 1/2009 | Ricotti | A47J 31/0668 99/295 |
| 2009/0017177 A1 * | 1/2009 | Yoakim | A47J 31/0678 99/302 R |
| 2009/0110775 A1 * | 4/2009 | Rijskamp | A47J 31/3695 426/77 |

(56) References Cited

U.S. PATENT DOCUMENTS

| | | | |
|---|---|---|---|
| 2009/0126577 A1* | 5/2009 | Ternite | A47J 31/0673 99/295 |
| 2009/0158938 A1* | 6/2009 | Jarisch | A47J 31/3638 99/289 R |
| 2009/0175986 A1* | 7/2009 | Doglioni Majer | B65D 85/8061 426/77 |
| 2009/0183640 A1* | 7/2009 | Ozanne | A47J 31/3695 99/295 |
| 2009/0205503 A1* | 8/2009 | Cortese | A47J 31/3633 99/302 R |
| 2009/0211458 A1* | 8/2009 | Denisart | B65D 85/8061 99/300 |
| 2009/0223373 A1* | 9/2009 | Kollep | B65D 85/8064 99/279 |
| 2009/0223375 A1* | 9/2009 | Verbeek | B67D 1/0021 99/287 |
| 2009/0229470 A1 | 9/2009 | Dorfmueller | |
| 2009/0229471 A1 | 9/2009 | Lun et al. | |
| 2009/0235827 A1* | 9/2009 | Bongers | B65D 85/8055 220/669 |
| 2009/0255410 A1* | 10/2009 | Jarisch | A47J 31/3638 99/289 R |
| 2009/0263545 A1* | 10/2009 | Ozanne | B65D 85/8061 426/77 |
| 2009/0280219 A1* | 11/2009 | Yoakim | A47J 31/3628 426/77 |
| 2009/0320692 A1* | 12/2009 | Simanski | B65D 85/8064 206/0.5 |
| 2009/0320693 A1* | 12/2009 | Ozanne | A47J 31/0673 426/77 |
| 2010/0003371 A1* | 1/2010 | Ozanne | B65D 85/8061 426/77 |
| 2010/0005973 A1* | 1/2010 | Doglioni Majer | B65D 75/38 99/295 |
| 2010/0037779 A1* | 2/2010 | Pecci | A47J 31/3628 99/289 R |
| 2010/0047418 A1* | 2/2010 | Bongers | B65D 85/8055 426/431 |
| 2010/0047419 A1* | 2/2010 | Boul | A47J 31/08 426/433 |
| 2010/0062127 A1* | 3/2010 | Bongers | B65D 85/8055 426/431 |
| 2010/0078480 A1* | 4/2010 | Aker | G06K 19/06009 235/494 |
| 2010/0083843 A1 | 4/2010 | Denisart et al. | |
| 2010/0108541 A1* | 5/2010 | Roberto | B65D 85/8049 206/0.5 |
| 2010/0126354 A1* | 5/2010 | Mahlich | A47J 31/4485 99/323.1 |
| 2010/0132564 A1* | 6/2010 | Ozanne | A47J 31/4492 99/275 |
| 2010/0147156 A1* | 6/2010 | Colantonio | B65D 85/8061 426/79 |
| 2010/0154644 A1* | 6/2010 | Skalski | A47J 31/407 99/275 |
| 2010/0159109 A1* | 6/2010 | Van Puijenbroek | A47J 31/0668 99/275 |
| 2010/0178392 A1* | 7/2010 | Yoakim | A47J 31/0642 99/302 C |
| 2010/0180774 A1* | 7/2010 | Kollep | B65D 85/8049 426/77 |
| 2010/0203198 A1* | 8/2010 | Yoakim | B65D 85/8061 426/80 |
| 2010/0206177 A1* | 8/2010 | Ricotti | B65D 85/8043 99/295 |
| 2010/0239734 A1* | 9/2010 | Yoakim | A47J 31/22 99/302 C |
| 2010/0282087 A1* | 11/2010 | Boussemart | A47J 31/52 99/280 |
| 2010/0288131 A1 | 11/2010 | Kilber et al. | |
| 2010/0297299 A1* | 11/2010 | Epars | A23L 33/40 426/431 |
| 2010/0303964 A1* | 12/2010 | Beaulieu | A47J 31/446 426/77 |
| 2010/0303965 A1* | 12/2010 | Mariller | B65D 65/466 426/77 |
| 2010/0307930 A1* | 12/2010 | Zangerle | B65D 85/8055 206/0.5 |
| 2011/0005399 A1* | 1/2011 | Epars | B65D 85/8055 99/295 |
| 2011/0020497 A1* | 1/2011 | Steven | B65D 85/8061 99/300 |
| 2011/0041702 A1* | 2/2011 | Yoakim | B65D 65/466 99/302 R |
| 2011/0045144 A1* | 2/2011 | Boussemart | B65D 85/8049 426/431 |
| 2011/0064852 A1* | 3/2011 | Mann | B65D 85/8061 426/78 |
| 2011/0073607 A1* | 3/2011 | Fu | B65D 85/8061 220/711 |
| 2011/0076361 A1* | 3/2011 | Peterson | A47J 31/0673 426/77 |
| 2011/0097450 A1* | 4/2011 | Kruger | B65D 85/8061 426/77 |
| 2011/0100228 A1* | 5/2011 | Rivera | A47J 31/446 99/295 |
| 2011/0100229 A1* | 5/2011 | Rivera | A47J 31/4407 99/287 |
| 2011/0117248 A1* | 5/2011 | Rivera | B65B 29/022 426/77 |
| 2011/0142996 A1* | 6/2011 | Kruger | B65B 29/022 426/77 |
| 2011/0168029 A1* | 7/2011 | Fulco | A47J 31/446 99/295 |
| 2011/0185910 A1* | 8/2011 | Ryser | A47J 31/369 426/77 |
| 2011/0189350 A1* | 8/2011 | Van Belleghem | B65D 85/8064 99/289 R |
| 2011/0189362 A1* | 8/2011 | Denisart | A47J 31/22 426/433 |
| 2011/0197771 A1* | 8/2011 | Bolzicco | A47J 31/0668 99/283 |
| 2011/0209623 A1 | 9/2011 | Leung et al. | |
| 2011/0259204 A1* | 10/2011 | Kaeser | B65D 85/8064 427/372.2 |
| 2011/0262601 A1* | 10/2011 | Manser | A23L 33/40 426/431 |
| 2011/0274794 A1* | 11/2011 | Gerbaulet | B65D 85/8061 99/302 R |
| 2011/0274802 A1* | 11/2011 | Rivera | B65D 85/8061 426/431 |
| 2011/0283890 A1* | 11/2011 | Scrivani | B65B 7/2842 99/295 |
| 2011/0283891 A1* | 11/2011 | Mariller | B65D 85/8046 206/0.5 |
| 2011/0297005 A1* | 12/2011 | Mariller | A47J 31/0673 99/289 P |
| 2011/0303095 A1* | 12/2011 | Fu | B65D 85/8046 99/317 |
| 2011/0305801 A1* | 12/2011 | Beer | B65D 85/8061 426/77 |
| 2012/0015080 A1* | 1/2012 | Roulin | B65D 85/8055 426/106 |
| 2012/0015081 A1* | 1/2012 | Crump | B65D 81/267 426/106 |
| 2012/0052163 A1* | 3/2012 | Doleac | B65D 85/8058 426/112 |
| 2012/0052164 A1* | 3/2012 | Doleac | A47J 31/407 426/112 |
| 2012/0058226 A1* | 3/2012 | Winkler | A47J 31/3695 426/431 |
| 2012/0070543 A1* | 3/2012 | Mahlich | A47J 31/3695 426/123 |
| 2012/0070551 A1* | 3/2012 | Mahlich | B65B 29/022 426/433 |

(56) References Cited

U.S. PATENT DOCUMENTS

| | | | |
|---|---|---|---|
| 2012/0090475 A1* | 4/2012 | Deuber | B65B 51/225 426/106 |
| 2012/0097041 A1* | 4/2012 | Bucher | B65D 85/8058 426/106 |
| 2012/0097602 A1* | 4/2012 | Tedford | B65D 65/466 210/500.1 |
| 2012/0100259 A1* | 4/2012 | Rapparini | B65D 85/8061 426/77 |
| 2012/0118166 A1* | 5/2012 | Macchi | B65D 85/8061 99/295 |
| 2012/0118880 A1* | 5/2012 | Wnek | B65D 5/4266 220/660 |
| 2012/0121779 A1* | 5/2012 | Lai | A47J 31/42 426/433 |
| 2012/0121780 A1* | 5/2012 | Lai | A47J 31/3623 426/433 |
| 2012/0148709 A1 | 6/2012 | Kamerbeek et al. | |
| 2012/0171333 A1* | 7/2012 | Crump | B65D 85/8061 426/118 |
| 2012/0196008 A1* | 8/2012 | York | B65D 85/8052 426/112 |
| 2012/0201932 A1* | 8/2012 | Kihnke | B67D 3/0067 426/77 |
| 2012/0201933 A1* | 8/2012 | Dran | B65D 85/8061 426/77 |
| 2012/0207895 A1* | 8/2012 | Rivera | A47J 31/0689 426/433 |
| 2012/0207896 A1* | 8/2012 | Rivera | A47J 31/0689 426/433 |
| 2012/0240779 A1* | 9/2012 | Perentes | A47J 31/22 99/283 |
| 2012/0251668 A1* | 10/2012 | Wong | B65D 85/8061 426/77 |
| 2012/0251671 A1* | 10/2012 | Kamerbeek | A47J 31/407 426/77 |
| 2012/0258210 A1* | 10/2012 | Wong | A47J 31/3695 426/115 |
| 2012/0269933 A1* | 10/2012 | Rapparini | B65D 85/812 206/0.5 |
| 2012/0276264 A1* | 11/2012 | Rivera | B65D 85/8061 426/433 |
| 2012/0285330 A1* | 11/2012 | Demiglio | A47J 31/0689 99/279 |
| 2012/0285334 A1* | 11/2012 | DeMiglio | A47J 31/0689 99/317 |
| 2012/0295234 A1* | 11/2012 | Rognon | B65D 85/8058 434/127 |
| 2012/0308688 A1* | 12/2012 | Peterson | B01F 23/551 426/86 |
| 2012/0321748 A1 | 12/2012 | Otto et al. | |
| 2012/0321756 A1* | 12/2012 | Estabrook | B65D 81/3205 426/115 |
| 2012/0328739 A1* | 12/2012 | Nocera | A47J 31/3623 426/77 |
| 2013/0014648 A1* | 1/2013 | Rognon | A47J 31/3623 426/87 |
| 2013/0017303 A1* | 1/2013 | Vu | A47J 31/0689 426/433 |
| 2013/0025466 A1* | 1/2013 | Fu | B65D 65/466 99/295 |
| 2013/0040021 A1* | 2/2013 | Digiuni | B65D 85/8043 426/431 |
| 2013/0045307 A1* | 2/2013 | Safai | A47J 31/3676 426/77 |
| 2013/0055903 A1* | 3/2013 | Deuber | A47J 31/3623 426/112 |
| 2013/0059039 A1* | 3/2013 | Trombetta | B65B 29/022 99/295 |
| 2013/0064936 A1* | 3/2013 | Meelker | B65D 85/8043 426/112 |
| 2013/0064937 A1* | 3/2013 | Jarisch | G06K 19/00 426/112 |
| 2013/0078341 A1* | 3/2013 | York | B65D 85/8055 426/115 |
| 2013/0095212 A1* | 4/2013 | Beer | B65D 85/8061 426/433 |
| 2013/0095214 A1* | 4/2013 | Ozanne | B65D 85/8061 99/275 |
| 2013/0105340 A1* | 5/2013 | Hother | A47J 31/3676 206/222 |
| 2013/0115340 A1* | 5/2013 | Doleac | B65D 85/8043 426/115 |
| 2013/0118360 A1* | 5/2013 | Dogan | A47J 31/0678 99/295 |
| 2013/0122157 A1* | 5/2013 | Dogan | B65D 85/8043 426/115 |
| 2013/0125762 A1* | 5/2013 | Dogan | B65D 85/8064 426/115 |
| 2013/0129870 A1* | 5/2013 | Novak | B01F 35/713 426/115 |
| 2013/0129872 A1* | 5/2013 | Kruger | B65D 85/8061 426/115 |
| 2013/0129876 A1* | 5/2013 | Ye | A47J 31/3638 426/232 |
| 2013/0133522 A1* | 5/2013 | Denisart | B65D 65/466 99/295 |
| 2013/0136828 A1* | 5/2013 | Anghileri | B31B 50/00 426/112 |
| 2013/0139699 A1* | 6/2013 | Rivera | B65D 85/8061 99/295 |
| 2013/0139700 A1* | 6/2013 | Fabozzi | B65D 11/02 99/295 |
| 2013/0146495 A1* | 6/2013 | Fabozzi | B29C 45/0046 425/506 |
| 2013/0156897 A1 | 6/2013 | Goldstein | |
| 2013/0164414 A1* | 6/2013 | Hermanowski | B65D 85/8049 426/77 |
| 2013/0180409 A1* | 7/2013 | Dogan | B65D 85/8052 426/115 |
| 2013/0186282 A1* | 7/2013 | Guo | A47J 31/3638 99/295 |
| 2013/0209618 A1* | 8/2013 | Trombetta | B32B 15/09 428/35.8 |
| 2013/0216663 A1* | 8/2013 | Dogan | B65D 85/8043 426/115 |
| 2013/0230627 A1* | 9/2013 | Hansen | A47J 31/0689 426/431 |
| 2013/0236609 A1* | 9/2013 | Magniet | B65D 85/8058 426/87 |
| 2013/0243910 A1* | 9/2013 | Kruger | A23F 3/16 426/115 |
| 2013/0247774 A1* | 9/2013 | Macchiavelli | A47J 31/369 426/115 |
| 2013/0259983 A1* | 10/2013 | Vanni | A47J 31/3676 426/115 |
| 2013/0270176 A1* | 10/2013 | Schreiber | B65D 85/8061 210/477 |
| 2013/0302476 A1* | 11/2013 | Abegglen | B65D 65/466 426/112 |
| 2013/0312619 A1* | 11/2013 | Spiegel | A47J 31/3623 426/87 |
| 2013/0323381 A1* | 12/2013 | Dakis | A47J 31/404 99/302 R |
| 2013/0327223 A1* | 12/2013 | Bartoli | A47J 31/3676 426/115 |
| 2013/0340626 A1* | 12/2013 | Oh | A23F 3/18 426/115 |
| 2013/0344206 A1* | 12/2013 | Yoakim | A47J 31/52 426/232 |
| 2014/0004231 A1* | 1/2014 | Norton | A47J 31/368 426/112 |
| 2014/0008368 A1 | 1/2014 | Severini | |
| 2014/0017359 A1* | 1/2014 | Kruger | B65D 85/8061 426/77 |
| 2014/0020565 A1* | 1/2014 | Nabeiro | B65D 85/8046 426/115 |
| 2014/0026761 A1* | 1/2014 | Bartoli | A47J 31/369 426/112 |

(56) References Cited

U.S. PATENT DOCUMENTS

| | | | |
|---|---|---|---|
| 2014/0037802 A1* | 2/2014 | Cardoso | B65B 5/06 426/115 |
| 2014/0053735 A1* | 2/2014 | Verbeek | A47J 31/3676 99/295 |
| 2014/0065269 A1* | 3/2014 | Favre | B65D 85/8055 426/112 |
| 2014/0069280 A1* | 3/2014 | Frydman | B65D 85/8049 426/112 |
| 2014/0072675 A1* | 3/2014 | Norton | B65D 85/8055 426/112 |
| 2014/0072676 A1* | 3/2014 | Moutty | A47J 31/407 426/112 |
| 2014/0072677 A1* | 3/2014 | Hansen | A47J 31/0673 426/115 |
| 2014/0076169 A1* | 3/2014 | Nabeiro | A47J 31/3695 426/112 |
| 2014/0076170 A1* | 3/2014 | Epars | A47J 31/46 426/115 |
| 2014/0083301 A1* | 3/2014 | Nakao | A47J 31/44 99/295 |
| 2014/0087028 A1* | 3/2014 | Orsi | B65D 85/8064 426/77 |
| 2014/0090564 A1* | 4/2014 | Vanni | B65D 85/8046 426/77 |
| 2014/0106036 A1* | 4/2014 | Cardoso | B65B 29/022 426/115 |
| 2014/0120217 A1* | 5/2014 | O'Brien | B65D 85/8061 426/115 |
| 2014/0123859 A1* | 5/2014 | Verbeek | B65D 85/8055 426/115 |
| 2014/0124435 A1* | 5/2014 | Jackson | A47J 31/0689 210/473 |
| 2014/0127364 A1* | 5/2014 | Fu | B65D 85/8061 426/115 |
| 2014/0130680 A1* | 5/2014 | Fin | A47J 31/3638 99/295 |
| 2014/0141128 A1* | 5/2014 | Trombetta | B65B 1/32 426/77 |
| 2014/0161936 A1* | 6/2014 | Trombetta | B65D 85/816 426/77 |
| 2014/0161940 A1* | 6/2014 | Aviles | B65D 81/3238 426/115 |
| 2014/0170269 A1* | 6/2014 | Schreiber | B65D 85/8061 426/77 |
| 2014/0170271 A1* | 6/2014 | Zweed | B65D 85/8052 426/433 |
| 2014/0174300 A1* | 6/2014 | Husband | B65D 65/466 426/77 |
| 2014/0178538 A1* | 6/2014 | Husband | A47J 31/446 426/115 |
| 2014/0186498 A1* | 7/2014 | Dogan | B65D 85/804 426/115 |
| 2014/0190863 A1* | 7/2014 | Fabozzi | B65B 29/022 206/524.6 |
| 2014/0196608 A1* | 7/2014 | Amrein | B65D 85/8043 426/77 |
| 2014/0205721 A1* | 7/2014 | Orsi | B65D 85/8043 426/115 |
| 2014/0220189 A1* | 8/2014 | Giovanni | B65D 85/8061 426/115 |
| 2014/0220190 A1* | 8/2014 | Giovanni | B65D 85/8061 426/115 |
| 2014/0224130 A1* | 8/2014 | Castellani | A47J 31/4492 426/77 |
| 2014/0242239 A1* | 8/2014 | Boggavarapu | A47J 31/4492 426/433 |
| 2014/0245893 A1* | 9/2014 | Vu | A47J 31/42 29/401.1 |
| 2014/0245895 A1 | 9/2014 | Demiglio et al. | |
| 2014/0272016 A1* | 9/2014 | Nowak | A23L 2/52 426/112 |
| 2014/0272018 A1* | 9/2014 | Koller | B65D 65/466 426/115 |
| 2014/0287099 A1* | 9/2014 | Trombetta | B65D 85/8061 426/115 |
| 2014/0287104 A1* | 9/2014 | Austin | A47J 31/369 426/115 |
| 2014/0287105 A1* | 9/2014 | Husband | B65D 85/8061 426/115 |
| 2014/0290494 A1* | 10/2014 | Chia | B65D 85/8061 99/295 |
| 2014/0295032 A1* | 10/2014 | Magri | B29C 45/372 235/494 |
| 2014/0299000 A1* | 10/2014 | Hanneson | A47J 31/3695 99/323 |
| 2014/0302204 A1* | 10/2014 | Evers | B65D 1/32 426/106 |
| 2014/0305315 A1* | 10/2014 | Perentes | A47J 31/407 426/115 |
| 2014/0314919 A1* | 10/2014 | Perentes | A47J 31/407 426/115 |
| 2014/0318378 A1* | 10/2014 | Ertur | A47J 31/407 426/106 |
| 2014/0318379 A1* | 10/2014 | Perentes | B65D 85/8052 426/115 |
| 2014/0318380 A1* | 10/2014 | Doglioni Majer | A47J 31/407 426/115 |
| 2014/0318381 A1* | 10/2014 | Talon | A47J 31/4492 99/295 |
| 2014/0328983 A1* | 11/2014 | Jarisch | A47J 31/407 235/494 |
| 2014/0342059 A1* | 11/2014 | Trombetta | B65D 85/8061 426/115 |
| 2014/0342060 A1* | 11/2014 | Bartoli | B65D 85/8043 426/115 |
| 2014/0356484 A1* | 12/2014 | Capitani | B65D 85/8043 426/77 |
| 2014/0373725 A1* | 12/2014 | Mastropasqua | B65D 77/30 426/115 |
| 2014/0377413 A1* | 12/2014 | Liu | B65D 85/8061 426/115 |
| 2015/0001100 A1* | 1/2015 | Bartoli | A47J 31/407 206/0.5 |
| 2015/0010680 A9* | 1/2015 | Mahlich | B65B 29/022 426/433 |
| 2015/0017290 A1* | 1/2015 | Rondelli | A23F 5/262 426/115 |
| 2015/0017293 A1* | 1/2015 | Carr | A47J 31/3623 426/232 |
| 2015/0021209 A1* | 1/2015 | Rondelli | B65D 85/8046 206/0.5 |
| 2015/0027318 A1* | 1/2015 | Dogan | A47J 31/605 99/295 |
| 2015/0040769 A1* | 2/2015 | Righetti | B65G 47/1428 99/290 |
| 2015/0047509 A1* | 2/2015 | Trombetta | A47J 31/4492 426/115 |
| 2015/0050391 A1* | 2/2015 | Rapparini | B65D 85/8043 426/115 |
| 2015/0056331 A1* | 2/2015 | Rivera | B65D 85/8052 99/287 |
| 2015/0056340 A1* | 2/2015 | Trombetta | B65D 85/8061 426/115 |
| 2015/0056351 A1* | 2/2015 | Deuber | A23F 5/262 99/295 |
| 2015/0056352 A1* | 2/2015 | Dogan | A47J 31/407 426/431 |
| 2015/0064324 A1* | 3/2015 | Oh | A47J 31/4492 426/433 |
| 2015/0068404 A1* | 3/2015 | Rivera | A47J 31/4492 99/323 |
| 2015/0068405 A1* | 3/2015 | Bartoli | A47J 31/407 426/115 |
| 2015/0072049 A1* | 3/2015 | Oh | A47J 31/407 426/232 |
| 2015/0072052 A1* | 3/2015 | Bartoli | B65D 85/8061 426/112 |

(56) References Cited

U.S. PATENT DOCUMENTS

| | | | |
|---|---|---|---|
| 2015/0072053 A1* | 3/2015 | Dogan | B65D 85/8043 426/112 |
| 2015/0082989 A1* | 3/2015 | Besson | A47J 31/407 99/280 |
| 2015/0086680 A1* | 3/2015 | Kamerbeek | B65D 21/0233 426/115 |
| 2015/0108011 A1* | 4/2015 | Bartoli | A47J 31/407 206/0.5 |
| 2015/0125576 A1* | 5/2015 | Dogan | B65D 85/8043 426/115 |
| 2015/0135962 A1* | 5/2015 | Jarisch | G11C 7/1006 235/492 |
| 2015/0135967 A1* | 5/2015 | Hoffman | B65D 85/8061 220/203.19 |
| 2015/0140182 A1* | 5/2015 | Dogan | B65D 85/8043 426/112 |
| 2015/0150409 A1* | 6/2015 | Cross | A23F 3/18 426/232 |
| 2015/0151903 A1* | 6/2015 | Bartoli | B65D 85/8064 206/0.5 |
| 2015/0157164 A1* | 6/2015 | Digiuni | A47J 31/0673 99/295 |
| 2015/0158609 A1* | 6/2015 | Villain | B65B 31/028 426/112 |
| 2015/0158666 A1* | 6/2015 | Kruger | B65B 7/2871 426/87 |
| 2015/0164262 A1* | 6/2015 | Dingle | B65D 85/8049 99/295 |
| 2015/0173555 A1 | 6/2015 | Sumiyoshi et al. | |
| 2015/0175347 A1* | 6/2015 | Empl | B65B 47/04 426/433 |
| 2015/0183577 A1* | 7/2015 | Talon | A47J 31/4492 426/115 |
| 2015/0196159 A1* | 7/2015 | Spiegel | A47J 31/407 206/0.5 |
| 2015/0201790 A1* | 7/2015 | Smith | A47J 31/3695 426/431 |
| 2015/0201791 A1* | 7/2015 | Tinkler | A47J 31/4492 426/431 |
| 2015/0203285 A1* | 7/2015 | Baldo | A47J 31/407 426/112 |
| 2015/0208852 A1* | 7/2015 | Doglioni Majer | B65D 85/8064 426/115 |
| 2015/0208853 A1* | 7/2015 | Melzer | A47J 19/005 99/287 |
| 2015/0225169 A1* | 8/2015 | Jarisch | A47J 31/4492 426/115 |
| 2015/0230652 A1* | 8/2015 | Chalk | A47J 31/40 99/295 |
| 2015/0230654 A1* | 8/2015 | Ye | A47J 31/407 99/295 |
| 2015/0238044 A1* | 8/2015 | Halliday | B65D 85/8058 99/283 |
| 2015/0239652 A1* | 8/2015 | Trombetta | A23F 5/243 426/594 |
| 2015/0245733 A1* | 9/2015 | Castellani | B65D 85/8049 426/112 |
| 2015/0246741 A1* | 9/2015 | Hansen | B65B 29/022 156/215 |
| 2015/0246768 A1* | 9/2015 | Talon | A47J 31/002 426/431 |
| 2015/0251847 A1* | 9/2015 | Talon | A47J 31/407 426/112 |
| 2015/0257580 A1* | 9/2015 | Crarer | A47J 31/3638 99/295 |
| 2015/0272379 A1* | 10/2015 | Perentes | B65D 65/466 99/295 |
| 2015/0282663 A1* | 10/2015 | Talon | A47J 31/36 426/433 |
| 2015/0297021 A1* | 10/2015 | Bugnano | A47J 31/4492 426/115 |
| 2015/0307266 A1* | 10/2015 | Zanetti | B65D 85/8043 426/112 |
| 2015/0314954 A1* | 11/2015 | Empl | A23C 9/00 426/115 |
| 2015/0314955 A1* | 11/2015 | Savage | B65D 65/466 426/115 |
| 2015/0320254 A1* | 11/2015 | Perentes | B65D 85/8058 426/232 |
| 2015/0327717 A1* | 11/2015 | Burrows | A47J 31/3628 99/295 |
| 2015/0329282 A1* | 11/2015 | Bartoli | B01F 35/51 426/115 |
| 2015/0336736 A1* | 11/2015 | Cabilli | B29C 45/0001 264/494 |
| 2015/0344285 A1* | 12/2015 | Joseph | A47J 31/3676 222/173 |
| 2015/0353272 A1* | 12/2015 | Mariller | B65D 85/8061 426/433 |
| 2015/0353275 A1* | 12/2015 | Accursi | B65D 85/8046 426/115 |
| 2015/0360854 A1* | 12/2015 | Massey | B65D 85/8055 426/115 |
| 2015/0368033 A1* | 12/2015 | Krug | A47J 31/407 426/112 |
| 2015/0374165 A1* | 12/2015 | Rivera | A47J 31/3695 99/323 |
| 2016/0001903 A1* | 1/2016 | Bartoli | B65B 29/02 426/112 |
| 2016/0001968 A1* | 1/2016 | Krüger | B65D 85/8061 426/433 |
| 2016/0009486 A1* | 1/2016 | Bugnano | A47J 31/0668 426/77 |
| 2016/0016727 A1* | 1/2016 | Katz | B65D 85/8061 426/115 |
| 2016/0029833 A1 | 2/2016 | Lin | |
| 2016/0037961 A1* | 2/2016 | Digiuni | B65D 85/8061 99/295 |
| 2016/0045059 A1* | 2/2016 | Cross | A47J 31/407 426/112 |
| 2016/0045061 A1* | 2/2016 | Balestier | A47J 31/4457 99/300 |
| 2016/0051080 A1* | 2/2016 | Lo Faro | A47J 31/4492 99/283 |
| 2016/0052706 A1* | 2/2016 | Talon | B65D 85/8055 426/115 |
| 2016/0066591 A1* | 3/2016 | Halliday | A47J 31/369 426/115 |
| 2016/0068334 A1* | 3/2016 | Cafaro | A23L 2/56 426/115 |
| 2016/0068336 A1 | 3/2016 | Biesheuvel et al. | |
| 2016/0075506 A1* | 3/2016 | Chapman | A47J 31/407 426/112 |
| 2016/0107831 A1* | 4/2016 | Talon | A47J 31/407 426/115 |
| 2016/0113435 A1* | 4/2016 | Cabilli | A23F 5/262 426/115 |
| 2016/0114967 A1* | 4/2016 | Van Belleghem | A47J 31/3628 99/295 |
| 2016/0120356 A1* | 5/2016 | Kohli | B65D 85/8049 426/115 |
| 2016/0130076 A1* | 5/2016 | Jarisch | B65D 85/8058 426/87 |
| 2016/0137401 A1* | 5/2016 | Heydel | B65D 85/8064 426/115 |
| 2016/0137402 A1* | 5/2016 | Talon | B65D 85/8055 426/115 |
| 2016/0145037 A1* | 5/2016 | Trombley | A61K 31/135 428/458 |
| 2016/0145038 A1* | 5/2016 | Apone | A47J 42/46 53/445 |
| 2016/0157660 A1* | 6/2016 | Rivera | A47J 31/0689 99/323 |
| 2016/0157666 A1* | 6/2016 | Brandsma | A47J 31/407 99/295 |
| 2016/0174757 A1* | 6/2016 | Rivera | A47J 31/4492 99/284 |

(56) References Cited

U.S. PATENT DOCUMENTS

| | | | |
|---|---|---|---|
| 2016/0176624 A1* | 6/2016 | Talon | B65D 85/8043 426/115 |
| 2016/0176625 A1* | 6/2016 | Brockman | B65D 65/466 426/115 |
| 2016/0192807 A1* | 7/2016 | Ait Bouziad | A47J 31/446 99/323 |
| 2016/0194147 A1* | 7/2016 | Harrington | A47J 31/407 220/523 |
| 2016/0198732 A1* | 7/2016 | Charles | B65D 85/8043 426/433 |
| 2016/0206133 A1* | 7/2016 | Rivera | A47J 31/0689 |
| 2016/0214787 A1* | 7/2016 | Iotti | B65D 85/8052 |
| 2016/0242594 A1* | 8/2016 | Empl | A47J 31/4492 |
| 2016/0251150 A1* | 9/2016 | Macchi | A23F 5/262 426/115 |
| 2016/0280430 A1* | 9/2016 | Petlikovski | B65D 51/2835 |
| 2016/0280453 A1* | 9/2016 | Accursi | B65B 7/16 |
| 2016/0288990 A1* | 10/2016 | Roberts | A23F 5/243 |
| 2016/0302613 A1* | 10/2016 | Cross | G01N 27/025 |
| 2016/0311608 A1 | 10/2016 | Accursi | |
| 2016/0311609 A1* | 10/2016 | Deuber | B65D 53/02 |
| 2016/0311610 A1* | 10/2016 | Deuber | A47J 31/407 |
| 2016/0325898 A1* | 11/2016 | Footz | B65D 85/8061 |
| 2016/0332759 A1* | 11/2016 | Trombetta | B65B 31/028 |
| 2016/0332805 A1* | 11/2016 | Krupa | B65D 65/466 |
| 2016/0340110 A1* | 11/2016 | Trombetta | B65D 85/8061 |
| 2016/0345769 A1* | 12/2016 | Clausen | A47J 31/3695 |
| 2017/0020329 A1* | 1/2017 | Douglas | B65D 85/804 |
| 2017/0027374 A1* | 2/2017 | Smith | A47J 31/4492 |
| 2017/0036854 A1* | 2/2017 | Doglioni Majer | B65D 85/8049 |
| 2017/0036857 A1* | 2/2017 | Empl | B29C 65/08 |
| 2017/0042365 A1* | 2/2017 | Del Bon | A47J 31/18 |
| 2017/0043943 A1* | 2/2017 | Lamb | B65B 29/022 |
| 2017/0050799 A1* | 2/2017 | Anghileri | B65D 85/8046 |
| 2017/0071395 A1* | 3/2017 | Krüger | B65D 21/086 |
| 2017/0081111 A1* | 3/2017 | Wicks | B65D 75/5883 |
| 2017/0120203 A1* | 5/2017 | Novak | B01F 23/23611 |
| 2017/0143158 A1* | 5/2017 | Nachawati | G06Q 20/405 |
| 2017/0158422 A1 | 6/2017 | Andreae et al. | |
| 2017/0174418 A1* | 6/2017 | Cai | B65D 85/8061 |
| 2017/0190451 A1* | 7/2017 | van der Vliet | B65D 85/8043 |
| 2017/0258260 A1* | 9/2017 | Hsu | A47J 31/0626 |
| 2017/0258264 A1* | 9/2017 | Holten | B65D 85/8061 |
| 2017/0275087 A1* | 9/2017 | Perentes | B65D 85/8049 |
| 2017/0275088 A1* | 9/2017 | Ait Bouziad | A47J 31/4492 |
| 2017/0275089 A1* | 9/2017 | Perentes | A47J 31/4492 |
| 2017/0275090 A1* | 9/2017 | Dubesset | B65D 85/8052 |
| 2017/0280750 A1* | 10/2017 | Arnaud | A23L 27/72 |
| 2017/0295988 A1* | 10/2017 | Chung | A47J 31/4403 |
| 2017/0305653 A1* | 10/2017 | Norton | B65D 85/8061 |
| 2017/0313496 A1* | 11/2017 | Zaccanti | A47J 31/0668 |
| 2017/0319001 A1* | 11/2017 | Butscher | A47J 31/4492 |
| 2017/0320658 A1* | 11/2017 | Accursi | B65D 85/8061 |
| 2017/0326617 A1* | 11/2017 | Shabudin | B21D 51/16 |
| 2017/0327308 A1* | 11/2017 | Valsecchi | B65D 85/8061 |
| 2017/0334623 A1* | 11/2017 | Gualandi | B65B 7/16 |
| 2017/0334624 A1* | 11/2017 | Cabilli | B65D 65/466 |
| 2017/0355514 A1* | 12/2017 | Perentes | B65D 85/8049 |
| 2017/0355515 A1* | 12/2017 | Marcinkowski | B65D 85/8043 |
| 2017/0360057 A1* | 12/2017 | Rivera | A23F 5/262 |
| 2017/0360239 A1* | 12/2017 | Rivera | A47J 31/0689 |
| 2017/0361961 A1* | 12/2017 | Rivera | A47J 31/0689 |
| 2017/0362020 A1* | 12/2017 | Hanneson | B65D 77/2064 |
| 2018/0002104 A1* | 1/2018 | Moura De Castro Gandra | B65B 29/022 |
| 2018/0016092 A1* | 1/2018 | Dogan | B65D 85/8052 |
| 2018/0029780 A1* | 2/2018 | Empl | B65D 77/24 |
| 2018/0037402 A1* | 2/2018 | Cabilli | B65D 65/466 |
| 2018/0044104 A1* | 2/2018 | Eppler | A47J 31/02 |
| 2018/0084941 A1* | 3/2018 | Noth | B65D 85/8046 |
| 2018/0116444 A1 | 5/2018 | Rivera | |
| 2018/0116446 A1* | 5/2018 | Noth | A47J 31/4492 |
| 2018/0125288 A1* | 5/2018 | Noth | A47J 31/4492 |
| 2018/0134485 A1* | 5/2018 | Stefanoni | B65D 85/8055 |
| 2018/0148250 A1* | 5/2018 | Schaude | B65D 85/8049 |
| 2018/0162634 A1* | 6/2018 | De Ruvo | A47J 31/0689 |
| 2018/0178972 A1* | 6/2018 | Mondillon | B65B 1/02 |
| 2018/0178973 A1* | 6/2018 | Kaiserman | B65D 85/8061 |
| 2018/0201436 A1* | 7/2018 | Savage | B65D 85/8055 |
| 2018/0206667 A1* | 7/2018 | Footz | B65D 43/0233 |
| 2018/0215533 A1* | 8/2018 | Rossomando | B65D 85/8043 |
| 2018/0220840 A1* | 8/2018 | Vorfeld | A47J 31/4492 |
| 2018/0237217 A1* | 8/2018 | Stefanoni | B65D 85/8043 |
| 2018/0242776 A1* | 8/2018 | Schäling | A47J 31/40 |
| 2018/0257856 A1* | 9/2018 | Oliver | B65D 85/8061 |
| 2018/0273286 A1* | 9/2018 | Dijkstra | B65D 85/8064 |
| 2018/0290824 A1* | 10/2018 | Dijkstra | A47J 31/407 |
| 2018/0290825 A1* | 10/2018 | Dijkstra | A47J 31/407 |
| 2018/0297309 A1* | 10/2018 | Evans | B65D 85/8043 |
| 2018/0297775 A1* | 10/2018 | Dijkstra | A47J 31/4403 |
| 2018/0297776 A1* | 10/2018 | Dijkstra | B65D 85/8064 |
| 2018/0303275 A1* | 10/2018 | Ergican | A23L 2/395 |
| 2018/0305194 A1* | 10/2018 | Corker | B65D 85/8043 |
| 2018/0319582 A1* | 11/2018 | Footz | B65B 29/022 |
| 2018/0325301 A1* | 11/2018 | de Graaff | B65D 85/8052 |
| 2018/0325309 A1* | 11/2018 | Short | A47J 31/60 |
| 2018/0332995 A1* | 11/2018 | Rapparini | A23F 5/262 |
| 2018/0346239 A1* | 12/2018 | Heydel | B65D 85/8049 |
| 2018/0354713 A1* | 12/2018 | Ting | B65D 85/8058 |
| 2018/0362198 A1* | 12/2018 | Volpe | B65B 29/022 |
| 2018/0370720 A1* | 12/2018 | Heydel | B65D 85/8052 |
| 2019/0002192 A1* | 1/2019 | Wicks | A47J 31/407 |
| 2019/0016527 A1* | 1/2019 | Doglioni Majer | B65D 85/8043 |
| 2019/0023483 A1* | 1/2019 | Krüger | A47J 31/4492 |
| 2019/0047771 A1* | 2/2019 | Mühlemann | B65D 85/8049 |
| 2019/0047782 A1* | 2/2019 | Rehfuss | B65D 85/8067 |
| 2019/0047783 A1* | 2/2019 | Brivois | B29C 45/14418 |
| 2019/0055083 A1* | 2/2019 | Noth | B65D 85/8043 |
| 2019/0055084 A1* | 2/2019 | D'Urso | B65D 85/8052 |
| 2019/0077588 A1* | 3/2019 | Bartel | B65D 85/8064 |
| 2019/0084758 A1* | 3/2019 | Stefanoni | B65D 81/3216 |
| 2019/0100376 A1* | 4/2019 | Rondelli | B65D 85/8061 |
| 2019/0167031 A1* | 6/2019 | Rijskamp | A47J 31/0647 |
| 2019/0177078 A1* | 6/2019 | Dijkstra | A47J 31/407 |
| 2019/0177079 A1* | 6/2019 | Lach | B65D 85/8046 |
| 2019/0202629 A1* | 7/2019 | Rodriguez Bernal | B65D 85/8043 |
| 2019/0208950 A1* | 7/2019 | Wong | A47J 31/368 |
| 2019/0225413 A1* | 7/2019 | Dogan | B65D 85/8055 |
| 2019/0225414 A1* | 7/2019 | McHugh | B65D 85/8043 |
| 2019/0233200 A1* | 8/2019 | Mercier | B65D 85/8043 |
| 2019/0313835 A1* | 10/2019 | Valsecchi | A47J 31/407 |
| 2019/0328170 A1* | 10/2019 | Cai | B65D 85/8043 |
| 2019/0359418 A1* | 11/2019 | Krüger | A47J 31/3628 |
| 2019/0382191 A1* | 12/2019 | Orler | B65D 85/8055 |
| 2020/0017288 A1* | 1/2020 | Nabeiro | B65B 29/022 |
| 2020/0047984 A1* | 2/2020 | Halliday | A47J 31/3628 |
| 2020/0121115 A1* | 4/2020 | Oh | A47J 31/0652 |
| 2020/0189772 A1* | 6/2020 | Rivera | B65B 29/022 |
| 2020/0231370 A1* | 7/2020 | Appleford | D21J 5/00 |
| 2020/0231372 A1* | 7/2020 | Parise | A47J 31/4492 |
| 2020/0253413 A1* | 8/2020 | Orler | A47J 31/407 |
| 2021/0127889 A1* | 5/2021 | Sasena | A47J 31/0689 |
| 2021/0147138 A1* | 5/2021 | Affolter | A47J 31/407 |
| 2021/0253334 A1* | 8/2021 | Rivera | A23F 5/262 |
| 2021/0261280 A1* | 8/2021 | Krüger | B65B 29/022 |
| 2021/0331864 A1* | 10/2021 | Zwart | A47J 31/407 |
| 2022/0071434 A1* | 3/2022 | Tseng | A47J 31/525 |
| 2022/0330742 A1* | 10/2022 | Ioannidis | A47J 31/4492 |

FOREIGN PATENT DOCUMENTS

| | | |
|---|---|---|
| EP | 1183195 A1 | 3/2002 |
| EP | 1364605 B1 | 11/2005 |
| EP | 1837294 B1 | 7/2008 |
| EP | 2580145 B1 | 5/2015 |
| KR | 100535744 B1 | 1/2006 |
| NZ | 248659 A | 12/1994 |

(56) References Cited

FOREIGN PATENT DOCUMENTS

| | | |
|---|---|---|
| WO | 2005/092160 A1 | 10/2005 |
| WO | 2008125256 A1 | 10/2008 |

OTHER PUBLICATIONS

My-Kap lid for K-Cup, https://www.amazon.com/My-Kap-Kaps-K-Cups-Brush-2-45-Ounce/dp/B0076I4OGK/ref=cm_cr_arp_d_product_top?ie=UTF8.
Perfect Pod EZ-Cup, https://www.perfectpod.com/products/ez-cup-2.

* cited by examiner

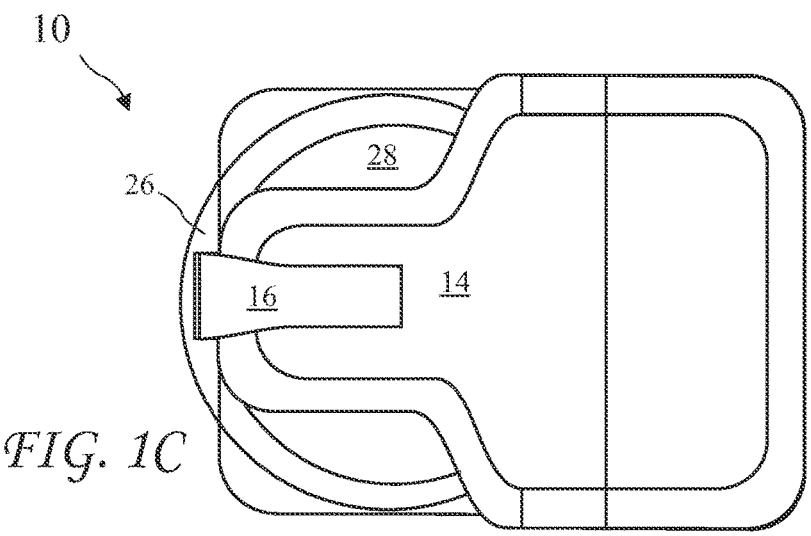
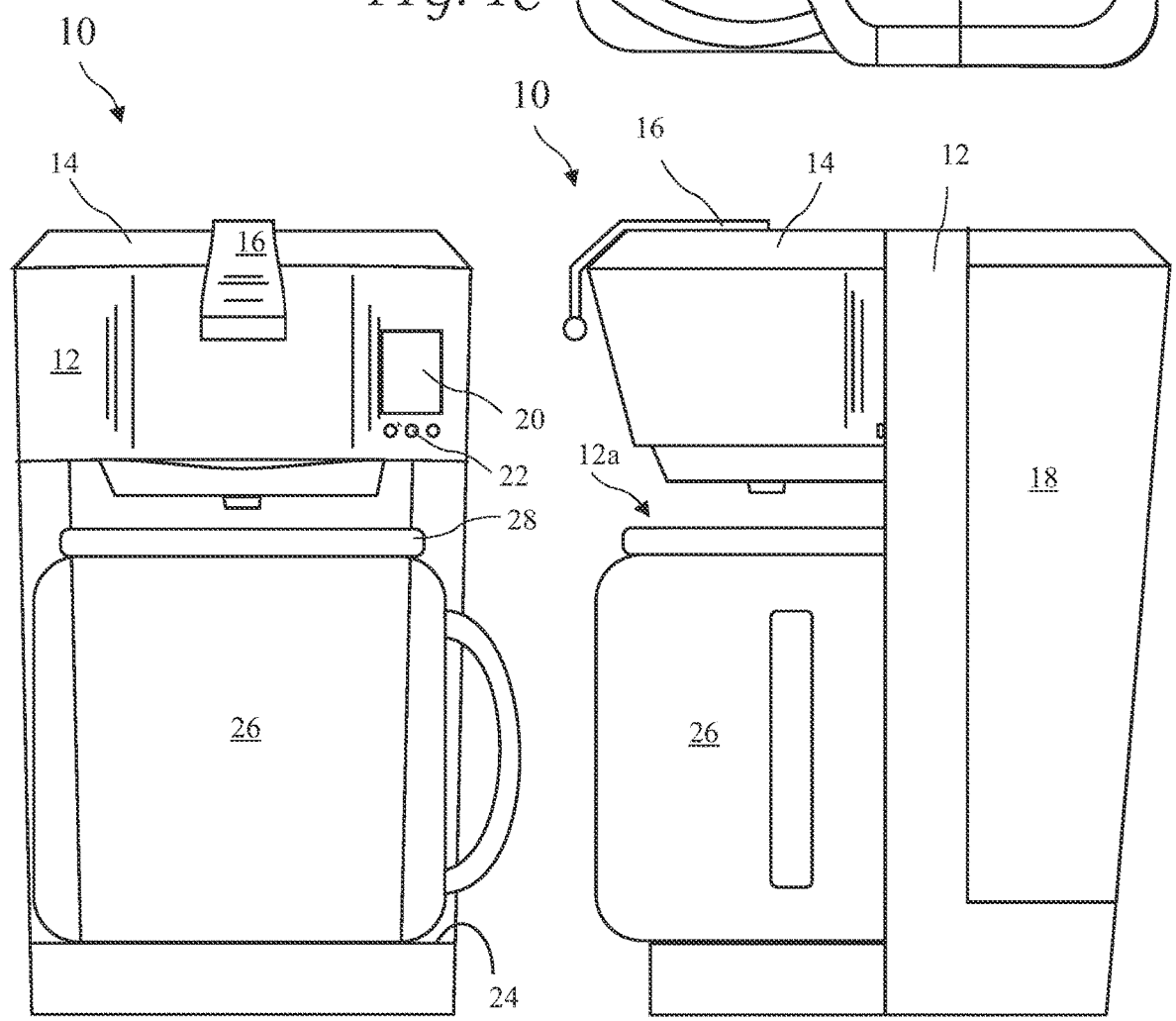
FIG. 1C
FIG. 1A
FIG. 1B

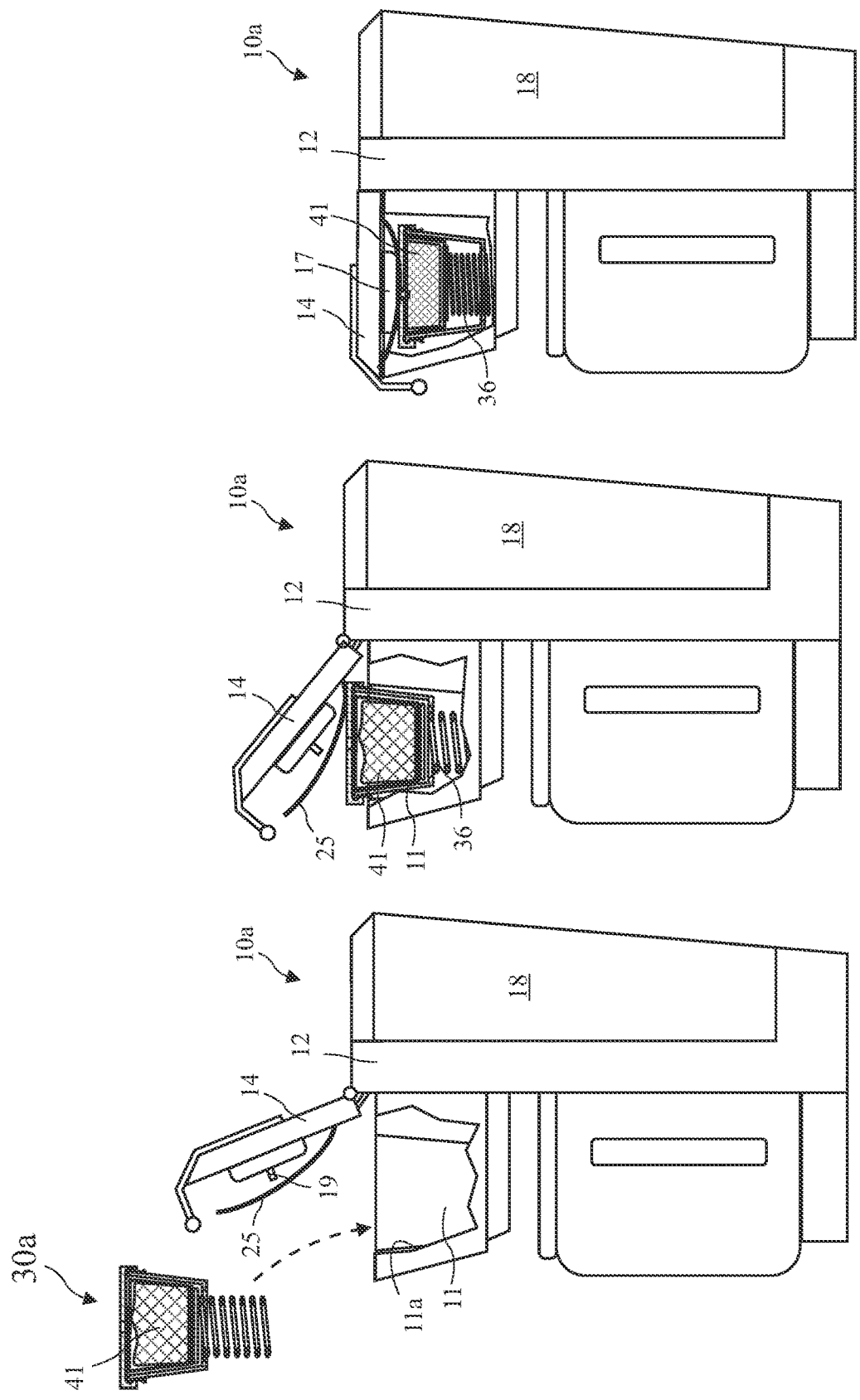

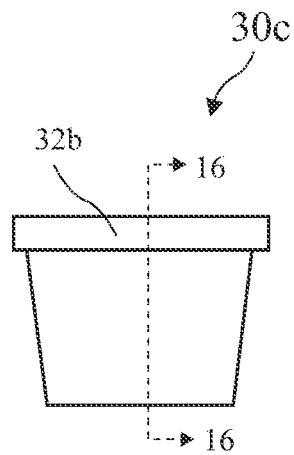
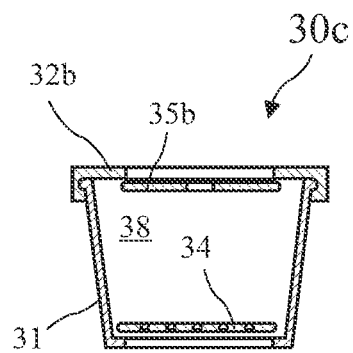
FIG. 15       FIG. 16
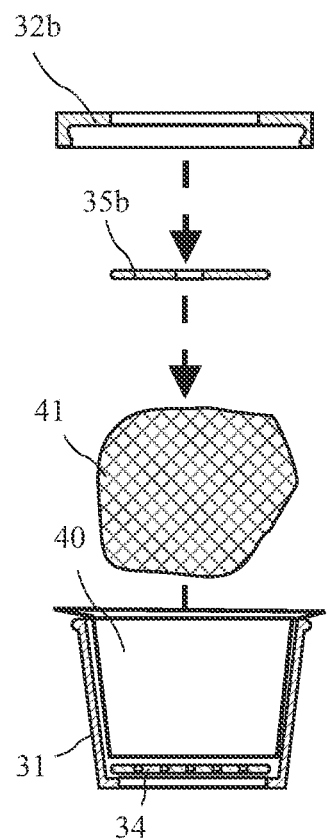
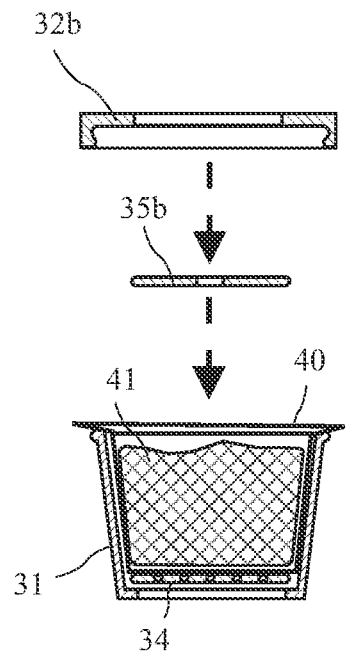
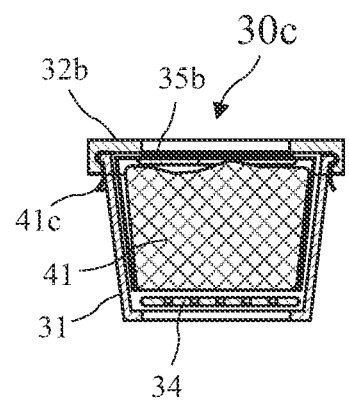
FIG. 17A       FIG. 17B       FIG. 17C

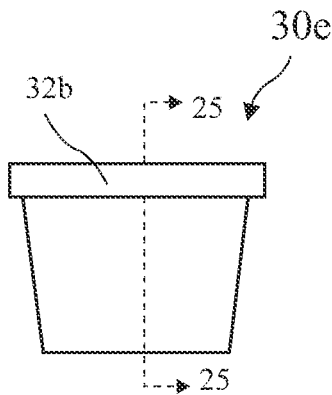
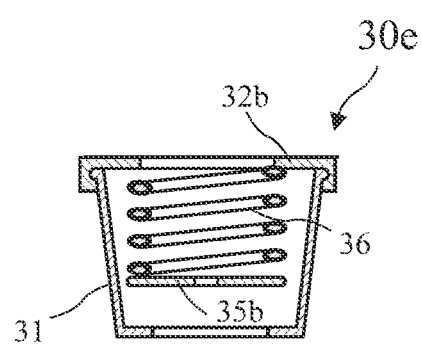
FIG. 24  FIG. 25
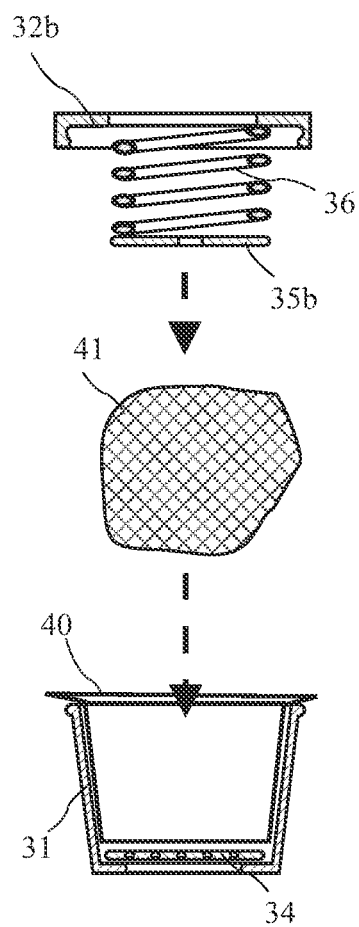
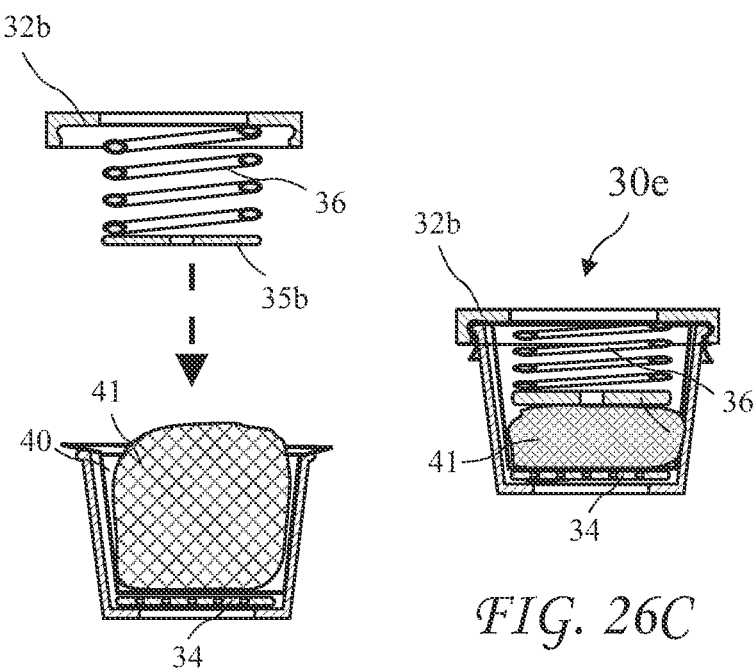
FIG. 26A  FIG. 26B  FIG. 26C

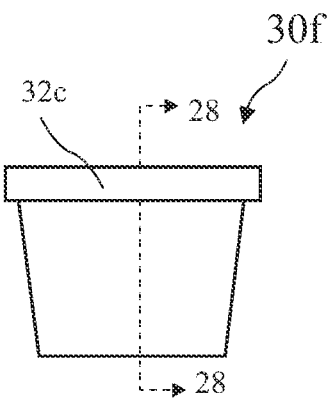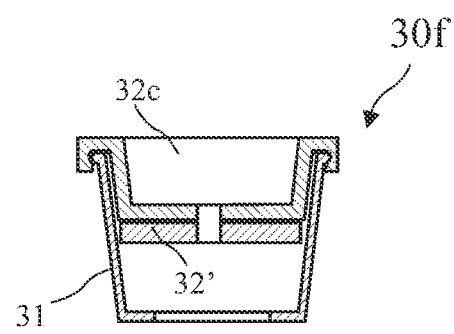
FIG. 27  FIG. 28
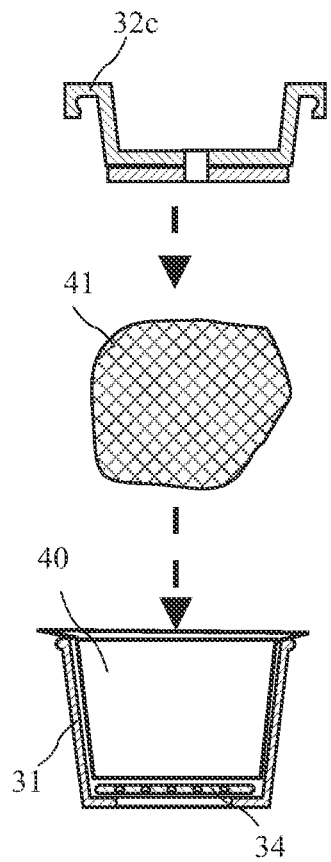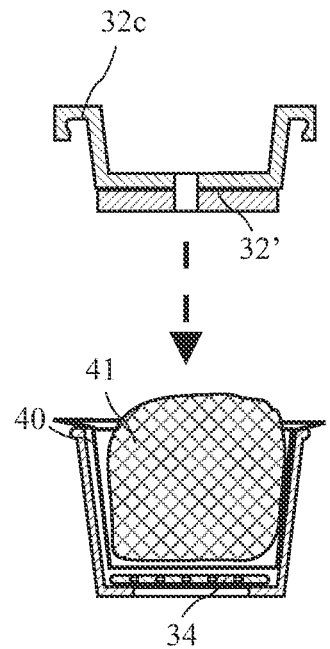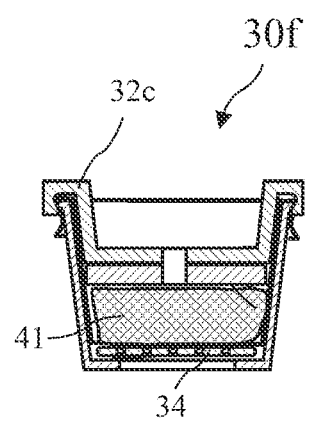
FIG. 29A  FIG. 29B  FIG. 29C

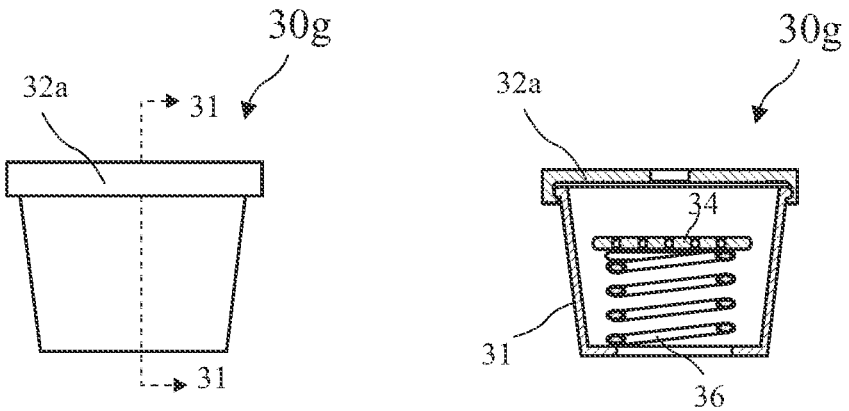
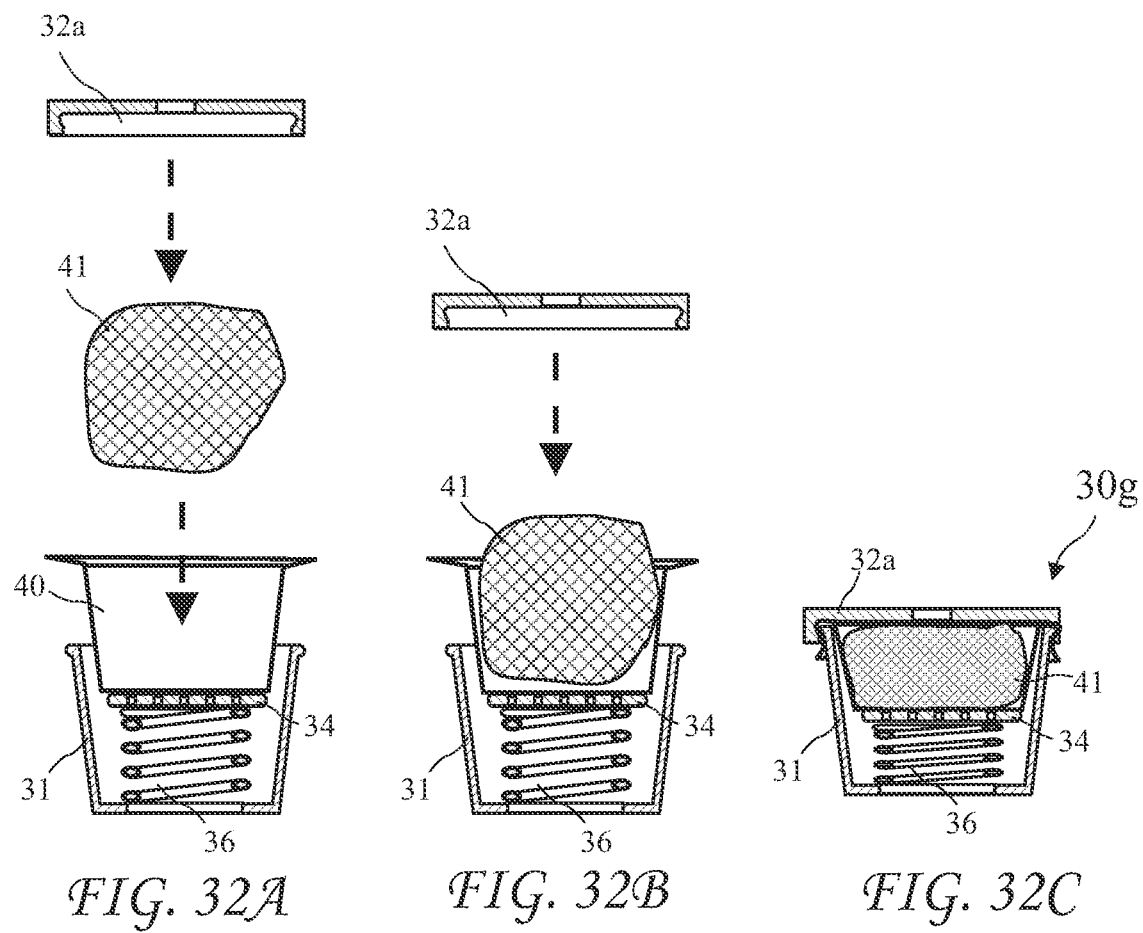
FIG. 30  FIG. 31  FIG. 32A  FIG. 32B  FIG. 32C

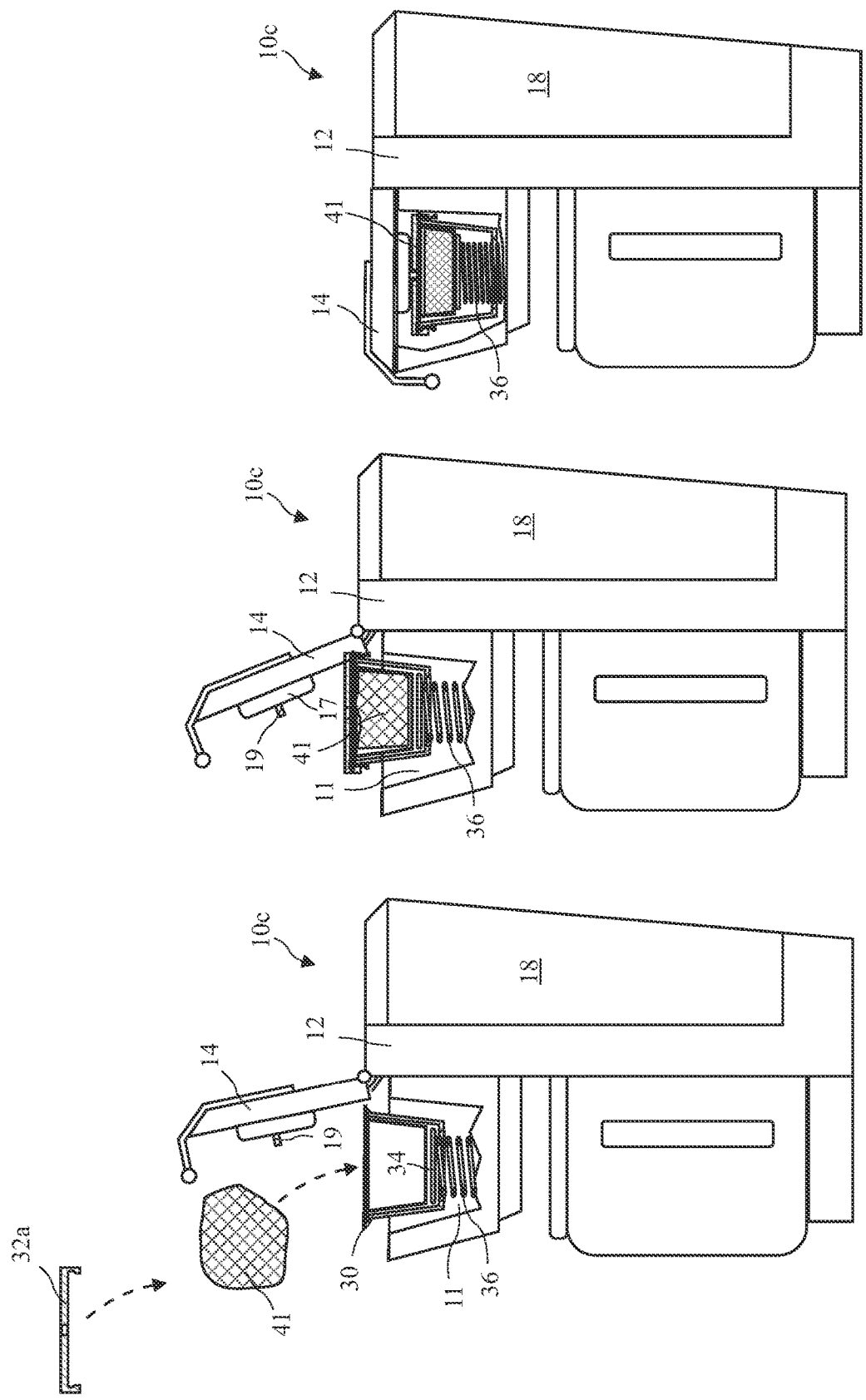

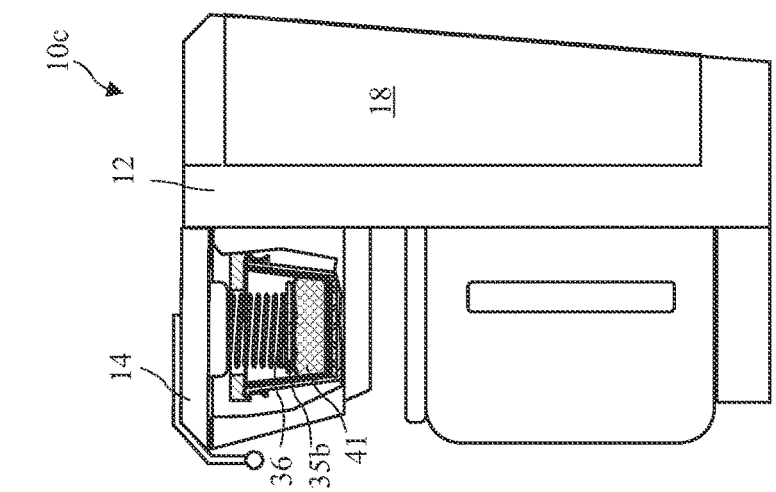
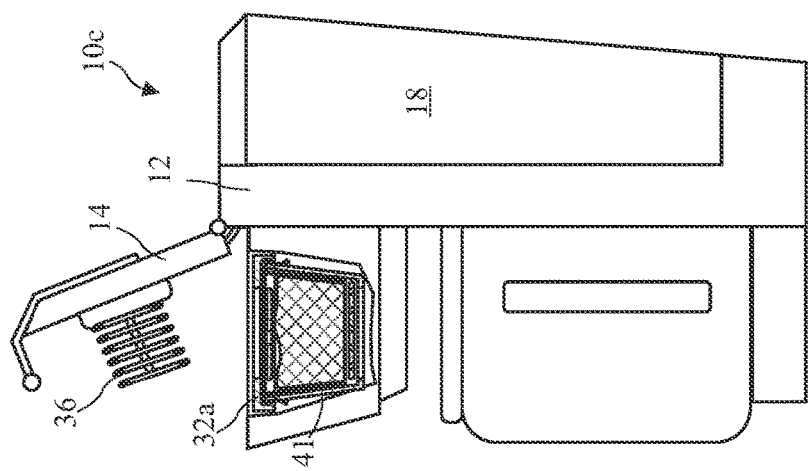
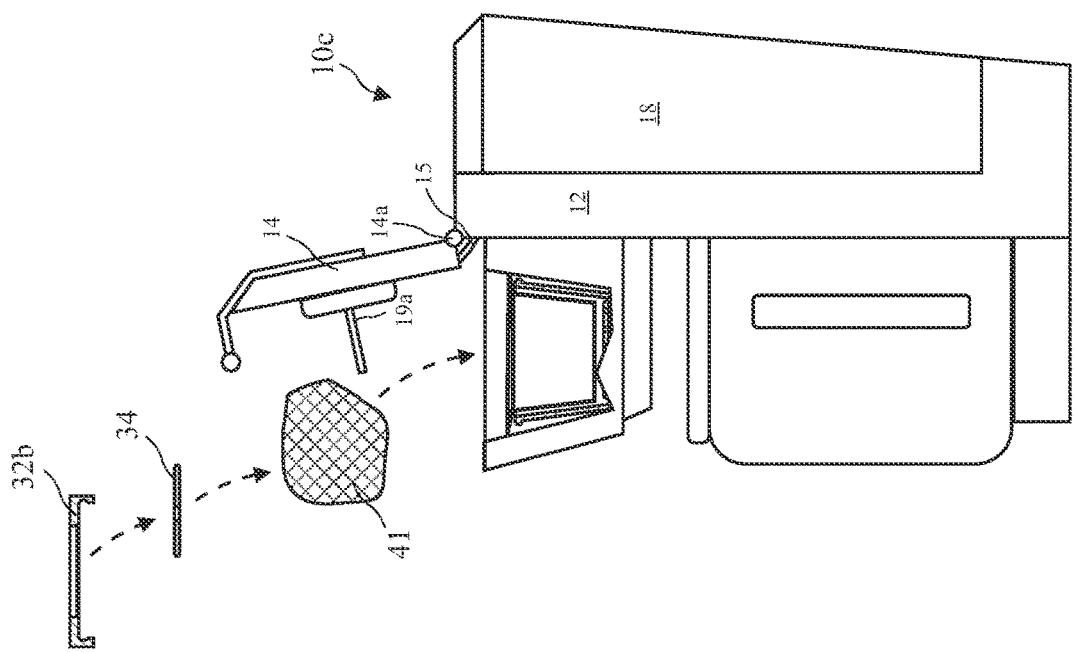

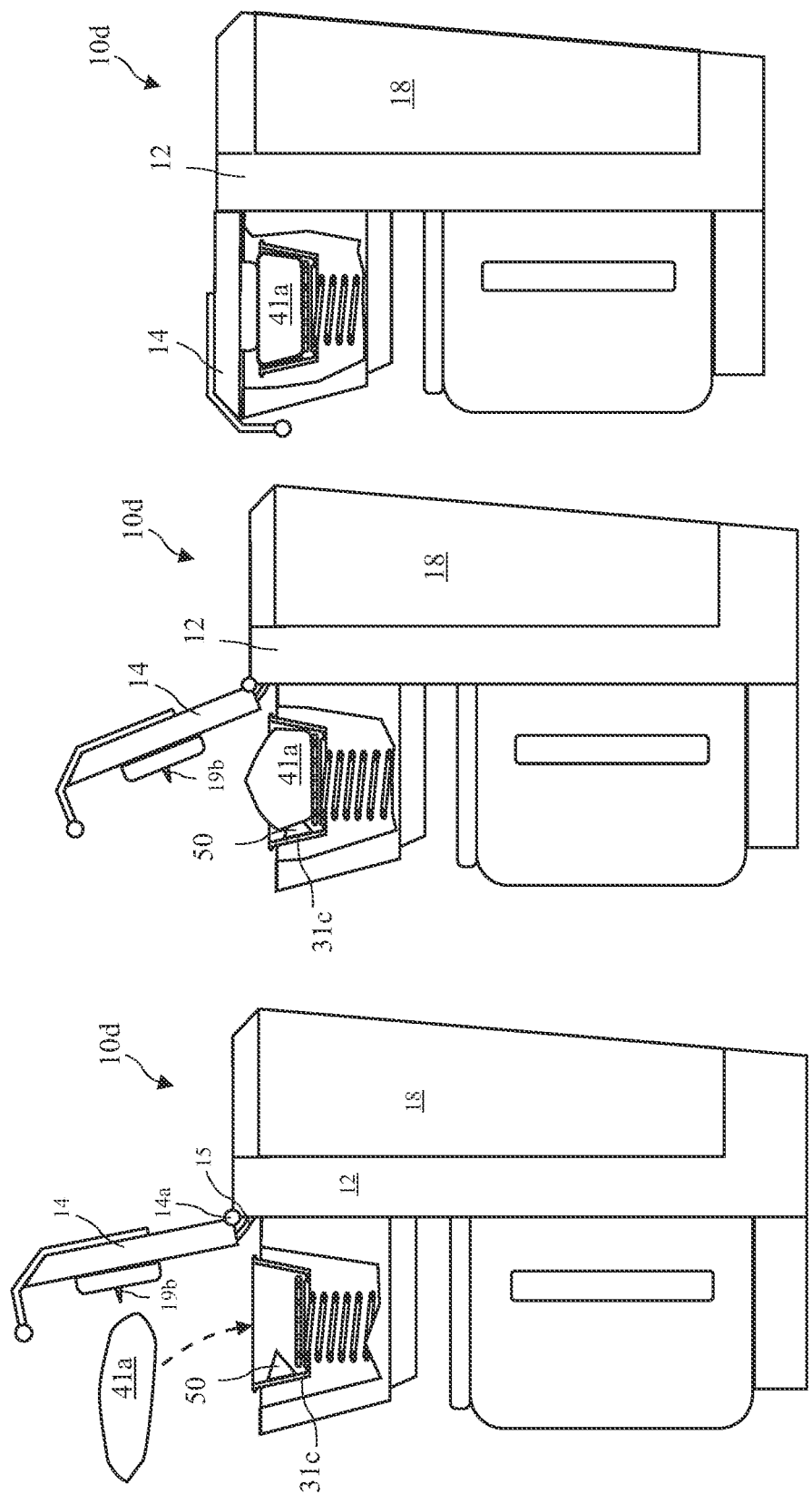

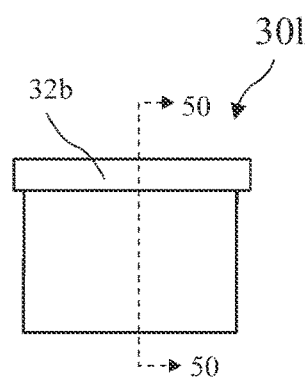
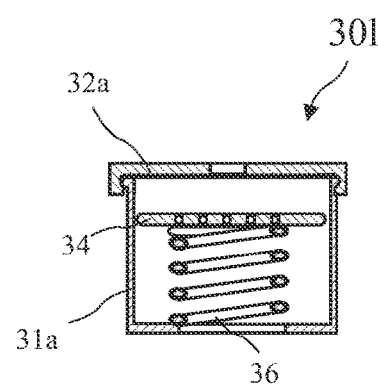
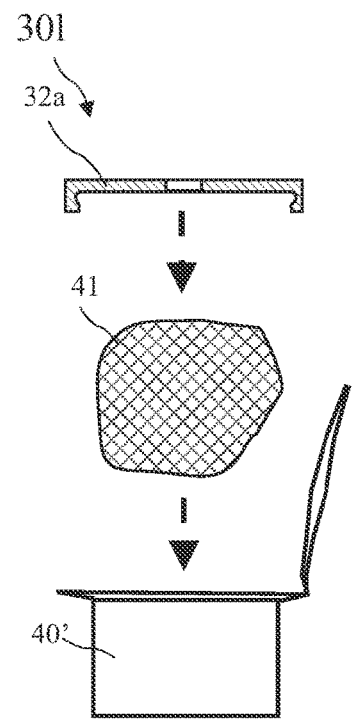
FIG. 49   FIG. 50   FIG. 51A
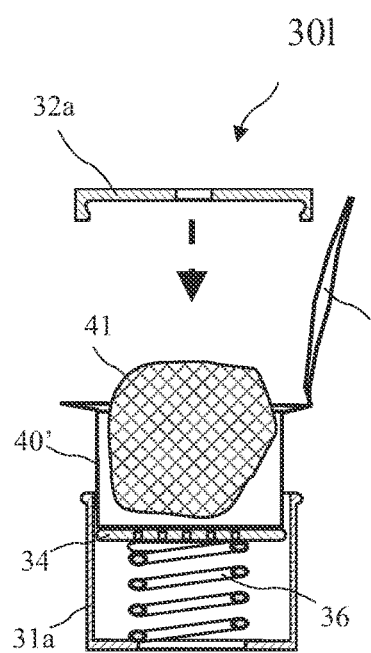
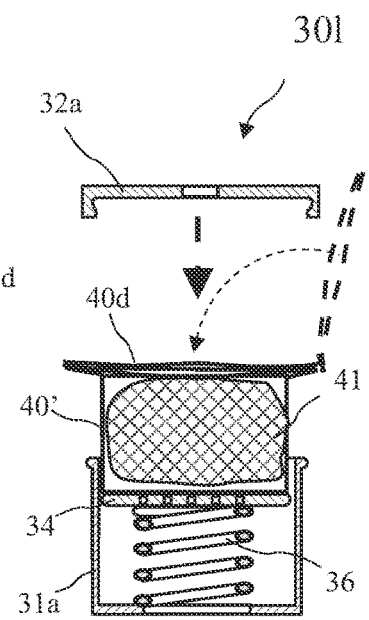
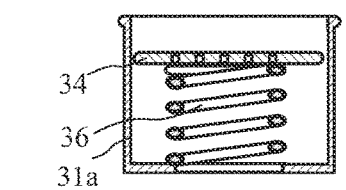
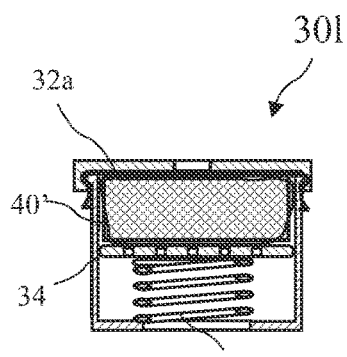
FIG. 51B   FIG. 51C   FIG. 51D

WINDOWED SINGLE-SERVING BREWING MATERIAL HOLDER

CROSS-REFERENCE TO RELATED APPLICATIONS

This is a divisional of co-pending U.S. patent application Ser. No. 16/900,462, which was filed on Jun. 12, 2020; which in turn is a continuation of U.S. patent application Ser. No. 15/855,776, which was filed on Dec. 27, 2017; which in turn was a continuation-in-part of U.S. patent application Ser. No. 15/790,398, which was filed on Oct. 23, 2017, and a continuation-in-part of U.S. patent application Ser. No. 12/960,496, which was filed on Dec. 4, 2010; which in turn is a continuation-in-part of U.S. patent application Ser. No. 11/777,831, which was filed on Jul. 13, 2007, the disclosures of which are incorporated herein in their entireties.

BACKGROUND OF THE INVENTION

The present invention relates to brewing coffee and in particular to a single serving brewing material holder.

Coffee is generally prepared in a coffee maker by measuring an amount of ground coffee into a coffee filter, closing a lid over the ground coffee, and providing a stream of hot water through the loosely packed ground coffee. Unfortunately, water passes freely through the loosely packed ground coffee and does not obtain the full flavor which might otherwise be obtained.

Pod adapter systems overcome this problem using pre-packaged coffee in closed filter paper commonly called a pod, and inserting the closed pod into a pod holder including a tamping spring and bottom tamper for tamping the pod between the bottom tamper and a coffee holder lid. While the pod adapters work well for coffee pods, they do not always hold the pod (or packer) firmly against the cover of the pod adapter and in some instances a needle for injecting water into the pod fails to puncture the pod.

BRIEF SUMMARY OF THE INVENTION

The present invention addresses the above and other needs by providing a container, which includes a receptacle and a cover. The receptacle includes a base and a sidewall. The base has an interior surface and a passageway in an interior area of the base. The passageway provides fluid communication from an interior of the receptacle to an exterior of the receptacle. The sidewall extends upward from the interior surface of the base. The cover is configured to sealingly engage with a top edge of the sidewall, and includes a cover opening. The container is configured to accept input fluid through the cover opening and to provide a corresponding outflow of fluid through the passageway, The passageway allows the outflow fluid to flow from the container while accommodating an outflow needle of a beverage brewer.

The receptacle can also include an extension extending from an exterior surface of the base such that at least a portion of the base is separated a fixed distance from a support surface when a distal end of the extension is in contact with the support surface. The fixed distance can be large enough to prevent the outflow needle from contacting the portion of the base. The extension can extend from a periphery of the base, such as from an interior portion of the base.

The container can also include a filter that is configured to be held within the receptacle.

The container can be constructed of a material that is reusable after being wet.

The passageway can be at least partially covered by a screen material.

At least one portion of the sidewall can include a sidewall opening that is at least partially covered by a screen material.

The cover can include a perforated bay extending from the opening.

According to another aspect of the invention, a beverage brewing container includes a receptacle and a cover. The receptacle includes a passageway, a base, and a sidewall. The passageway provides fluid communication between an interior of the receptacle and an exterior of the receptacle. The base has an interior surface and an exterior surface and is configured to avoid contact with an outflow needle of a beverage brewer. The sidewall extends upward from the interior surface of the base and is configured to avoid contact with the outflow needle. The cover is configured to sealingly engage with a top edge of the sidewall, and includes a cover opening. The container is configured to accept input fluid through the cover opening and to provide a corresponding outflow of fluid through the passageway while the passageway accommodates the outflow needle.

The receptacle can also include an extension extending from an exterior surface of the base such that at least a portion of the base is separated a fixed distance from a support surface when a distal end of the extension is in contact with the support surface. The fixed distance can be large enough to prevent the outflow needle from contacting the portion of the base. The extension can extend from a periphery of the base, or the extension can extend from an interior portion of the base.

The container can also include a filter that is configured to be held within the receptacle.

The container can be constructed of a material that is reusable after being wet.

The passageway can have an unobstructed configuration, and can be at least partially covered by a screen material.

At least one portion of the sidewall can include a sidewall opening that is at least partially covered by a screen material.

The cover can include a perforated bay extending from the cover opening.

BRIEF DESCRIPTION OF THE DRAWINGS

These and other aspects, features, and advantages of the present invention will be more apparent from the following more particular description thereof, presented in conjunction with the following drawings wherein:

FIG. 1A is a front view of a coffee maker according to the present invention.

FIG. 1B is a side view of the coffee maker according to the present invention.

FIG. 1C is a top view of the coffee maker according to the present invention.

FIG. 8A shows the first coffee holder ready for insertion into the coffee maker.

FIG. 8B shows the first coffee holder inserted into the coffee maker before tamping the coffee.

FIG. 8C shows the first coffee holder inserted into the coffee maker after tamping the coffee.

FIG. 15 is a side view of a third coffee holder according to the present invention.

FIG. 16 is a cross-sectional side view of the third coffee holder according to the present invention taken along line 16-16 of FIG. 15.

FIG. 17A is a cross-sectional side view of the third coffee holder according to the present invention taken along line 16-16 of FIG. 15 showing the portion of coffee above the coffee holder and the top tamper and the holder lid ready to attach to the coffee holder, according to the present invention.

FIG. 17B is a cross-sectional side view of the third coffee holder according to the present invention taken along line 16-16 of FIG. 15 showing the portion of coffee in the coffee holder, and the top tamper and the holder lid ready to attach to the coffee holder, according to the present invention.

FIG. 17C is a cross-sectional side view of the third coffee holder according to the present invention taken along line 16-16 of FIG. 15 showing the portion of coffee in the coffee holder, and the bottom tamper, the top tamper, and the holder lid attached to the coffee holder, according to the present invention.

FIG. 24 is a side view of a fifth coffee holder according to the present invention.

FIG. 25 is a cross-sectional side view of the fifth coffee holder according to the present invention taken along line 25-25 of FIG. 24.

FIG. 26A is a cross-sectional side view of the fifth coffee holder according to the present invention taken along line 25-25 of FIG. 24 showing the portion of coffee above the coffee holder body, and the holder lid with the top tamper and tamping spring, ready to attach to the coffee holder body, according to the present invention.

FIG. 26B is a cross-sectional side view of the fifth coffee holder according to the present invention taken along line 25-25 of FIG. 24 showing the coffee holder with the portion of coffee in the coffee holder, and the holder lid with the top tamper and tamping spring ready to attach to the coffee holder body, according to the present invention.

FIG. 26C is a cross-sectional side view of the fifth coffee holder according to the present invention taken along line 25-25 of FIG. 24 showing the portion of coffee in the coffee holder, and the holder lid with the top tamper and tamping spring attached to the holder body, according to the present invention.

FIG. 27 is a side view of a sixth coffee holder according to the present invention.

FIG. 28 is a cross-sectional side view of the sixth coffee holder according to the present invention taken along line 28-28 of FIG. 27.

FIG. 29A is a cross-sectional side view of the sixth coffee holder according to the present invention taken along line 28-28 of FIG. 27 showing the portion of coffee above the coffee holder, and the holder lid ready to attach to the holder body, according to the present invention.

FIG. 29B is a cross-sectional side view of the sixth coffee holder according to the present invention taken along line 28-28 of FIG. 27 showing the portion of coffee in the coffee holder, and the holder lid ready to attach to the holder body, according to the present invention.

FIG. 29C is a cross-sectional side view of the sixth coffee holder according to the present invention taken along line 28-28 of FIG. 27 showing the portion of coffee in the coffee holder, and the holder lid attached and tam ping the coffee, according to the present invention.

FIG. 30 is a side view of a seventh coffee holder according to the present invention.

FIG. 31 is a cross-sectional side view of the seventh coffee holder according to the present invention taken along line 31-31 of FIG. 30.

FIG. 32A is a cross-sectional side view of the seventh coffee holder according to the present invention taken along line 31-31 of FIG. 30 showing the portion of coffee above the coffee holder, and the holder lid ready to attach to the holder body, according to the present invention.

FIG. 32B is a cross-sectional side view of the seventh coffee holder according to the present invention taken along line 31-31 of FIG. 30 showing the portion of coffee in the coffee holder, and the holder lid ready to attach to the holder body. according to the present invention.

FIG. 32C is a cross-sectional side view of the seventh coffee holder according to the present invention taken along line 31-31 of FIG. 30 showing the portion of coffee in the coffee holder, and the holder lid attached to the holder body and the coffee tamped between the bottom tamper and spring and the holder lid, according to the present invention.

FIG. 37A shows a third coffee maker having a coffee holder for receiving a portion of coffee and tamping spring according to the present invention for tamping the coffee when the coffee maker lid is closed.

FIG. 37B shows the third coffee maker with the coffee holder holding the portion of coffee and the tamping spring under the coffee holder according to the present invention for tamping the coffee when the coffee maker lid is closed.

FIG. 37C shows the third coffee maker with the coffee holder holding the portion of tamped coffee with the coffee maker lid closed for tamping the coffee according to the present invention.

FIG. 38A shows a third coffee maker having a coffee holder for receiving a portion of coffee and tamping spring attached to the coffee maker lid according to the present invention for tamping the coffee when the coffee maker lid is closed.

FIG. 38B shows the third coffee maker with the coffee holder holding the portion of untamped coffee according to the present invention for tamping the coffee when the coffee maker lid is closed.

FIG. 38C shows the third coffee maker with the coffee holder holding the portion of tamped coffee with the coffee maker lid closed to push the tamping spring into the coffee holder for tamping the coffee according to the present invention.

FIG. 39A shows a fourth coffee maker having a coffee holder for receiving a packet containing untamped coffee, a knife for cutting the packet open, and tamping spring attached to the coffee maker lid according to the present invention for tamping the coffee when the coffee maker lid is closed.

FIG. 39B shows the fourth coffee maker with the coffee holder holding the packet of untamped coffee according to the present invention for tamping the coffee when the coffee maker lid is closed.

FIG. 39C shows the fourth coffee maker with the coffee holder holding the packet of tamped coffee with the coffee maker lid closed to push the tamping spring into the coffee holder for tamping the coffee according to the present invention.

FIG. 49 is a side view of a twelfth coffee holder with straight walls according to the present invention.

FIG. 50 is a cross-sectional view of the twelfth coffee holder taken along line 50-50 of FIG. 49 showing an empty coffee holder.

FIG. 51A is a cross-sectional view of the twelfth coffee holder taken along line 50-50 of FIG. 49 showing a lid, coffee, a filter paper cup, above the base, and the coffee holder base.

FIG. 51B is a cross-sectional view of the twelfth coffee holder taken along line 50-50 of FIG. 49 showing the lid, above the coffee and the filter paper cup resting in the coffee holder base.

FIG. 51C is a cross-sectional view of the twelfth coffee holder taken along line 50-50 of FIG. 49 showing the lid, above the coffee and the filter paper cup resting in the coffee holder base with a filter paper cover folded over the coffee in the filter paper cup.

FIG. 51D is a cross-sectional view of the twelfth coffee holder taken along line 50-50 of FIG. 49 showing the lid attached to the base with the coffee and the filter paper cup residing in the coffee holder base with the coffee tamped.

FIG. 62A shows a pre-packaged brewing material for use in the coffee making according to the present invention.

FIG. 62B shows a cut away view of the pre-packaged brewing material for use in the coffee making according to the present invention showing the brewing material.

FIG. 62C shows the pre-packaged brewing material in a coffee holding having a window to expose a bar code.

FIG. 62D shows the pre-packaged brewing material in the coffee holding having the window to expose a bar code in the cavity of a coffee maker including a bar code reader.

FIG. 62E shows a coffee holder having the bar code on the coffee holder in the cavity of a coffee maker including the bar code reader FIG. 63A is a side view of a filter cup according to the present invention.

FIG. 63B is a top view of the filter cup according to the present invention.

FIG. 64 is a side view of multi-mode coffee maker according to the present invention.

FIG. 65A is a front view of the multi-mode coffee maker according to the present invention with a carafe positioned for receiving a volume of coffee.

FIG. 65B is a side view of the multi-mode coffee maker according to the present invention with the carafe positioned for receiving a volume of coffee.

FIG. 66A is a front view of the multi-mode coffee maker according to the present invention with a coffee cup positioned for receiving a volume of coffee.

FIG. 66B is a side view of the multi-mode coffee maker according to the present invention with the coffee cup positioned for receiving a volume of coffee.

FIG. 67A is a front view of a single cup adapter according to the present invention.

Figure 67C:
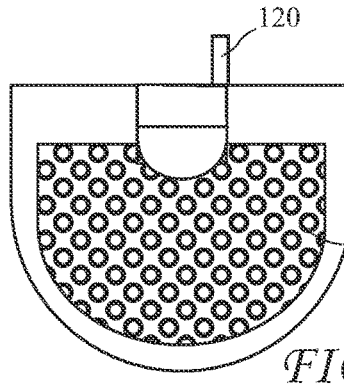
Figure 67A:
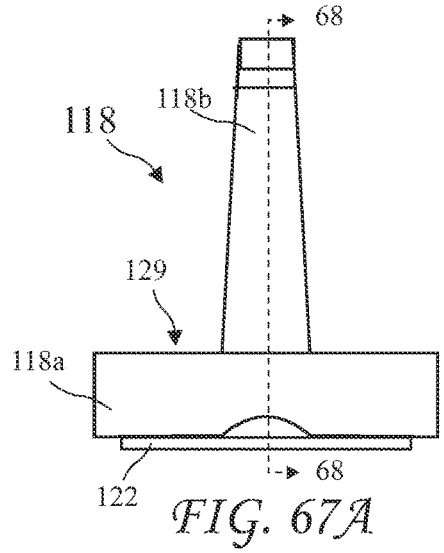
Figure 67B:
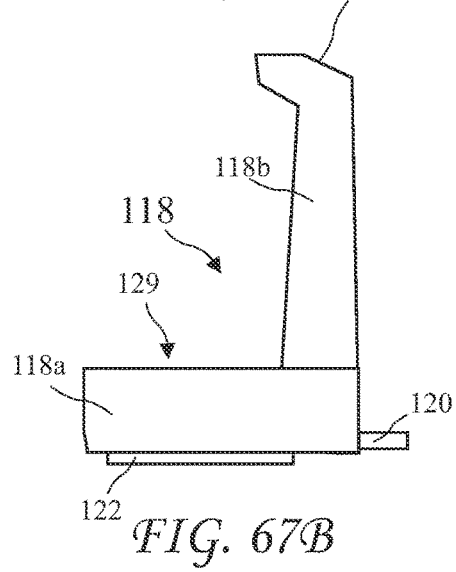

FIG. 67B is a side view of the single cup adapter according to the present invention.

FIG. 67C is a top view of the single cup adapter according to the present invention.

Figure 67D:
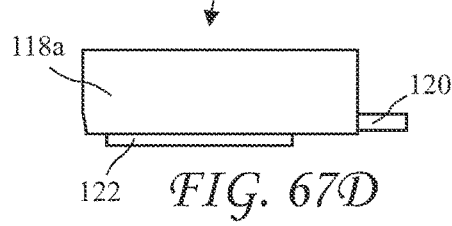

FIG. 67D is a side view of a second single cup adapter according to the present invention.

Figure 68:
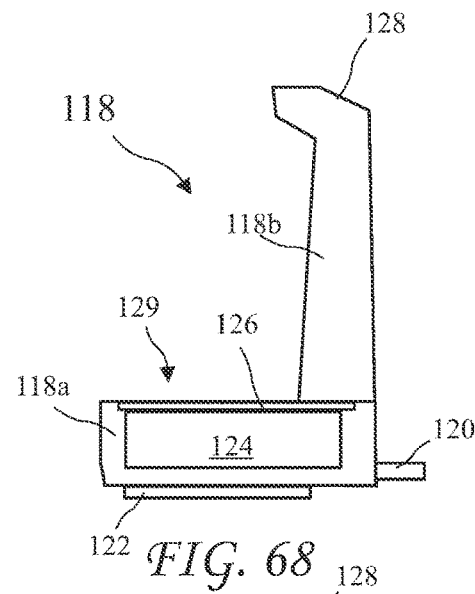

FIG. 68 is a cross-sectional view of the single cup adapter according to the present invention taken along line 68-68 of FIG. 67A.

Figure 69A:
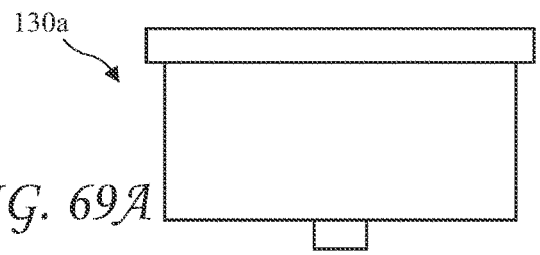

FIG. 69A is a side view of a multi-serving coffee holder according to the present invention for use in the multi-mode coffee maker for making several cups of coffee.

Figure 69B:
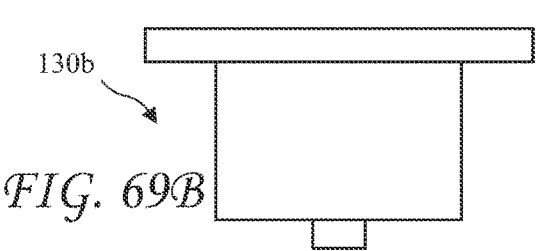

FIG. 69B is a side view of a single-serving coffee holder according to the present invention for use in the multi-mode coffee maker for making one cup of coffee.

Figure 70:
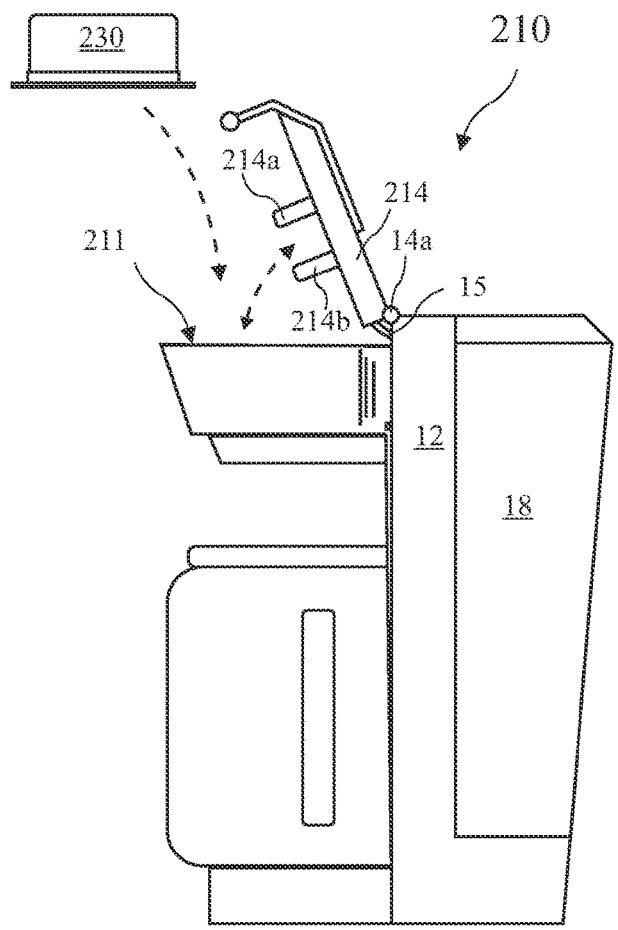
Figure 71A:
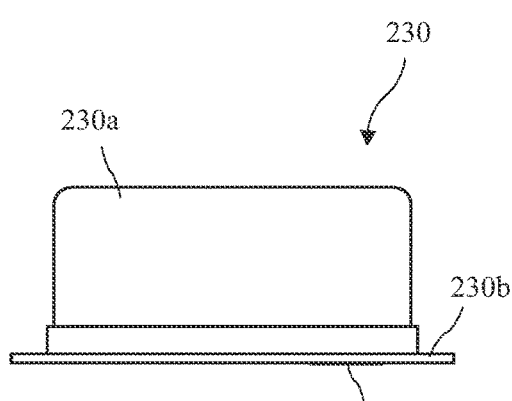

FIG. 70 shows a coffee maker and reuseable cartridge according to the present invention, FIG. 71A shows a side view of the reuseable cartridge according to the present invention.

Figure 71B:
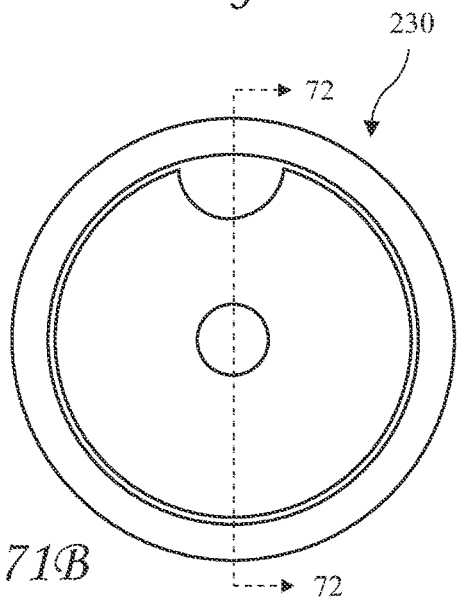

FIG. 71B shows a top view of the reuseable cartridge according to the present invention.

Figure 72:
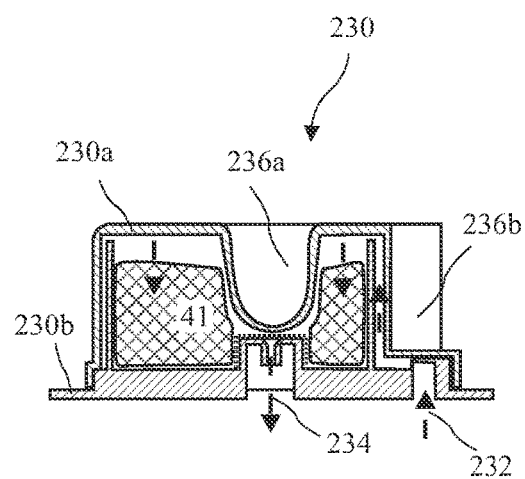

FIG. 72 show a cross-sectional view of the reuseable cartridge according to the present invention taken along line 72-72 of FIG. 71B.

Figure 73A:
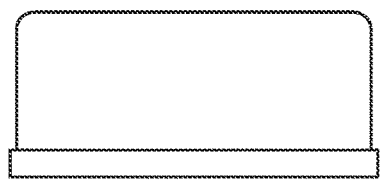

FIG. 73A shows a side view of a cover of the reuseable cartridge according to the present invention.

Figure 73B:
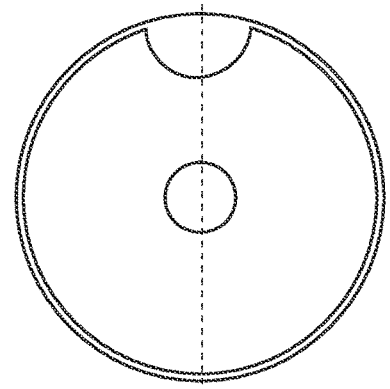

FIG. 73B shows a top view of the cover of the reuseable cartridge according to the present invention.

Figure 74:
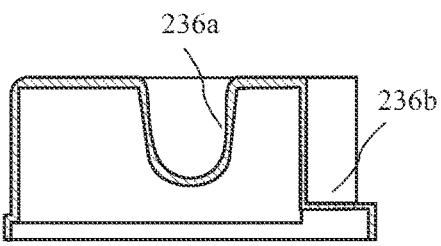

FIG. 74 show a cross-sectional view of the cover of the reuseable cartridge according to the present invention taken along line 74-74 of FIG. 73B.

Figure 75B:
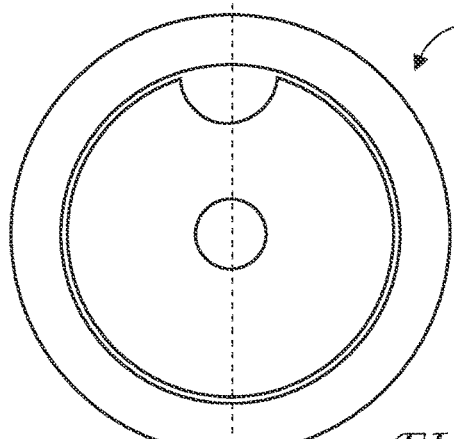
Figure 75A:

FIG. 75A shows a side view of a base of the reuseable cartridge according to the present invention.

FIG. 75B shows a top view of the base of the reuseable cartridge according to the present invention.

Figure 76:
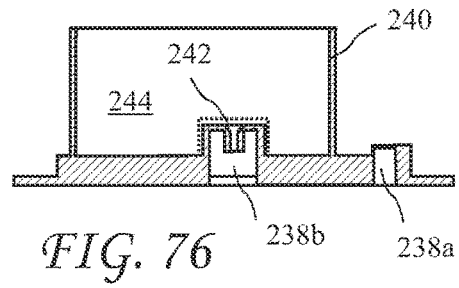

FIG. 76 show a cross-sectional view of the base of the reuseable cartridge according to the present invention taken along line 76-76 of FIG. 75B.

Figure 77A:
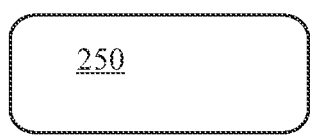

FIG. 77A shows a side view of a brewed beverage pod for use in the reuseable cartridge according to the present invention.

Figure 77B:
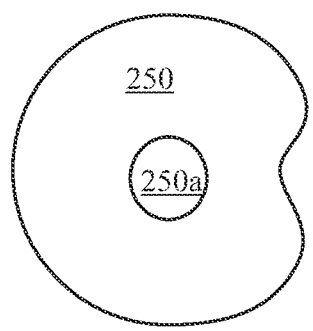

FIG. 77B shows a top view of the brewed beverage pod for use in the reuseable cartridge according to the present invention.

Figure 78A:
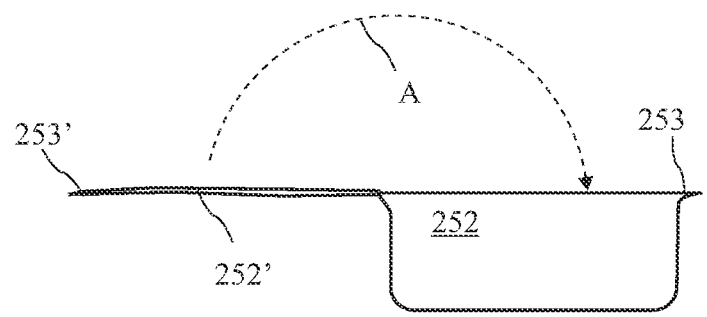

FIG. 78A shows a side view of filter paper for use in the reuseable cartridge according to the present invention.

Figure 78B:
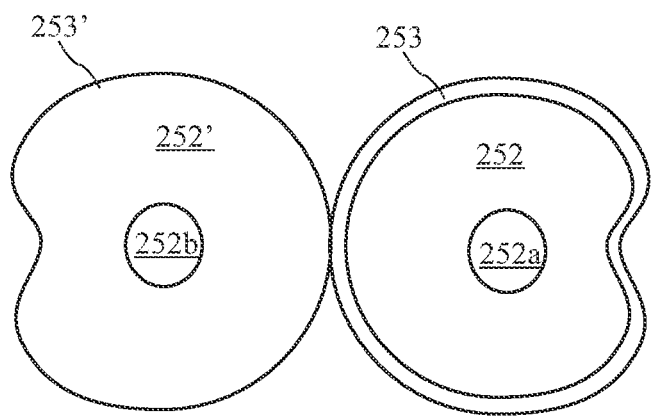

FIG. 78B shows a top view of the filter paper for use in the reuseable cartridge according to the present invention.

Figure 79A:
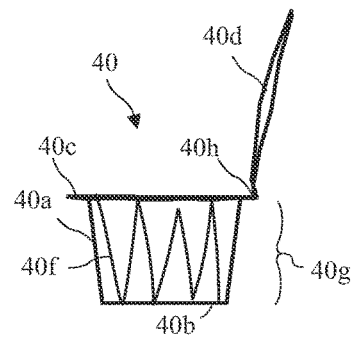

FIG. 79A shows a side view of the filter paper cup according to the present with the folding paper lid open.

Figure 79B:
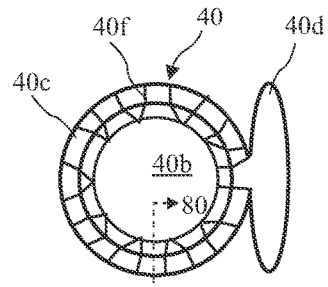

FIG. 79B shows a top view of the filter paper cup according to the present.

Figure 79C:
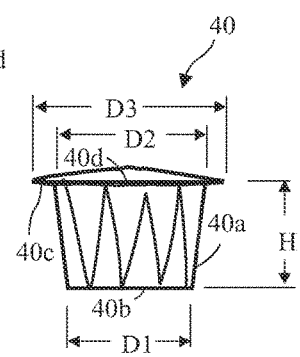

FIG. 79C shows a second side view of the filter paper cup with the folding paper lid closed.

Figure 80:
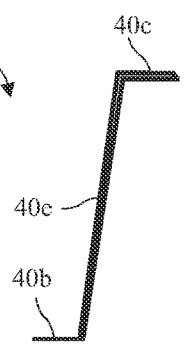

FIG. 80 is a cross-sectional view of the filter paper cup taken along line 80-80 of FIG. 79B showing folds according to the present.

Figure 81A:
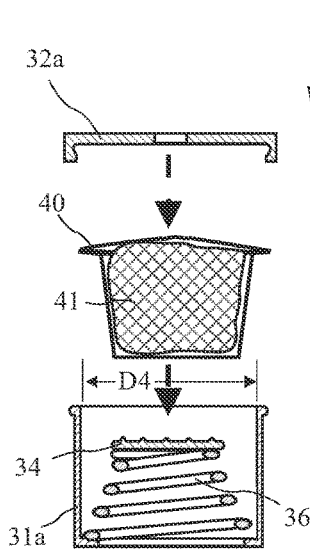

FIG. 81A is a cross-sectional side view of the coffee holder according to the present invention showing the coffee holder with the tamping spring and bottom tamper, the filter paper cup containing a portion of coffee, and the holder lid ready to attach to a holder body according to the present invention.

Figure 81B:
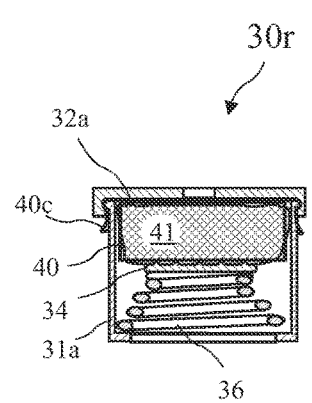

FIG. 81B is a cross-sectional side view of the coffee holder according to the present invention showing the coffee holder with the tamping spring and bottom tamper, the portion of coffee in the filter paper cup, and the holder lid attached to the holder body with the rim of the filter paper cup sandwiched between the lid and coffee holder and the tamping spring and bottom tamper pushing the filter paper cup against the lid according to the present invention.

Figure 82:
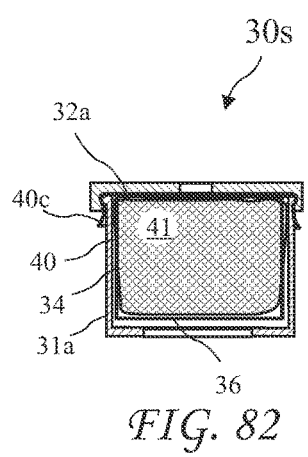

FIG. 82 shows a cross-sectional view of the coffee holder according to the present invention showing without the tamping spring.

Figure 83A:
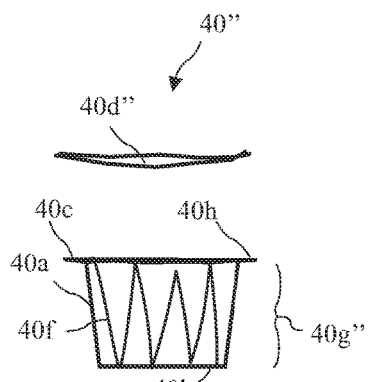

FIG. 83A shows a side view of the filter paper cup with a separate receptacle and paper lid according to the present.

Figure 83B:
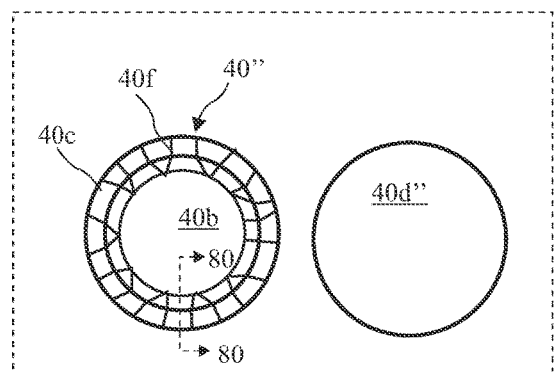

FIG. 83B shows a top view of the filter paper cup with the separate receptacle and paper lid according to the present.

Figure 83C:
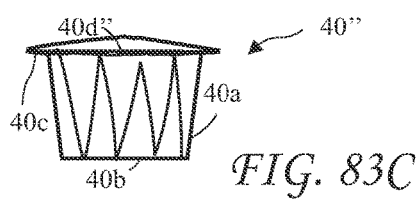

FIG. 83C shows a second side view of the filter paper cup with the separate paper lid residing on the receptacle.

Figure 84A:
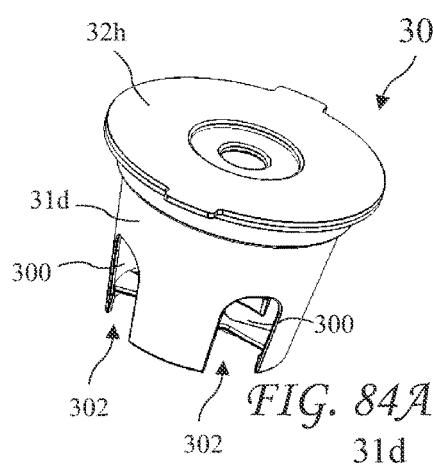

FIG. 84A shows a top and side view of another embodiment of a coffee holder according to the present invention.

Figure 84B:
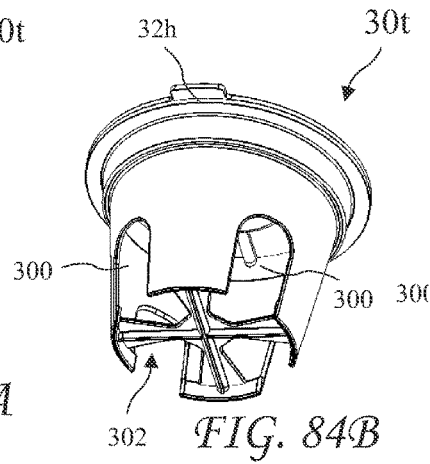

FIG. 84B shows a bottom and side view of the coffee holder of FIG. 84A according to the present invention.

Figure 85:
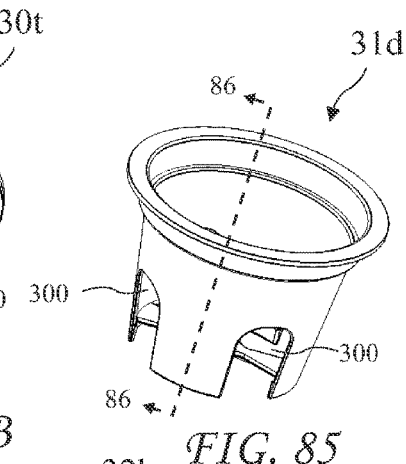

FIG. 85 shows a top and side view of the coffee holder of FIG. 84A with the lid removed, according to the present invention.

Figure 86:
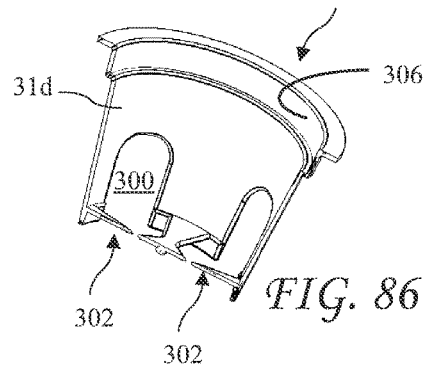

FIG. 86 shows a cross-sectional view of the coffee holder of FIG. 84A, according to the present invention, with the lid removed, taken along line 86-86 of FIG. 85.

Figure 87A:
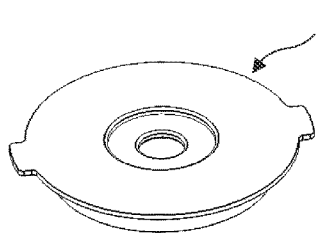

FIG. 87A is a top view of a lid of the coffee holder of FIG. 84A according to the present invention.

Figure 87B:
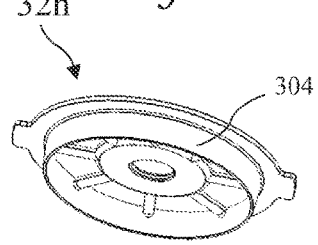

FIG. 87B is a bottom view of a lid of the coffee holder of FIG. 84A according to the present invention.

Figure 88C:
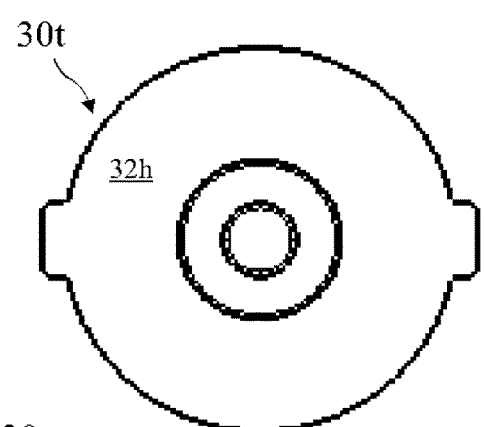
Figure 88A:
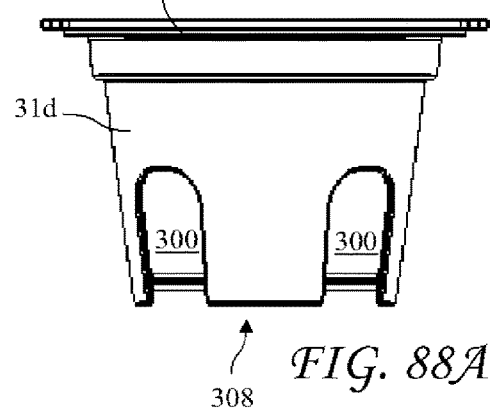

FIG. 88A shows a first side view of the coffee holder of FIG. 84A according to the present invention.

Figure 88B:
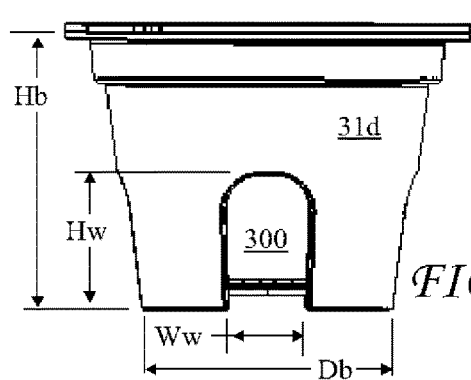

FIG. 88B shows a second side view of the coffee holder of FIG. 84A rotated 45 degrees, according to the present invention.

FIG. 88C shows a top view of the coffee holder of FIG. 84A according to the present invention.

Figure 88D:
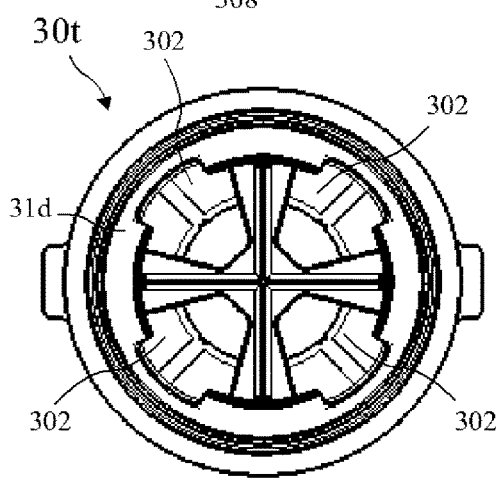

FIG. 88D shows a bottom side view of the coffee holder of FIG. 84A according to the present invention.

Figure 89A:
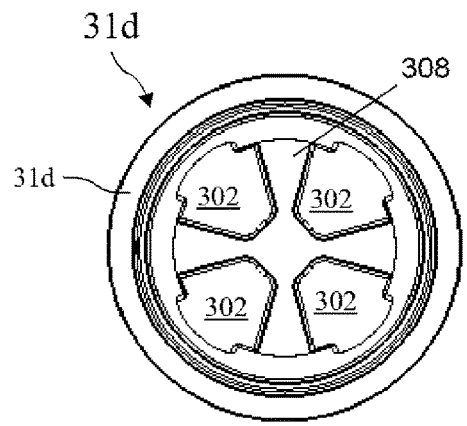

FIG. 89A shows a top view of the coffee holder of FIG. 84A according to the present invention, with the lid removed.

Figure 89B:
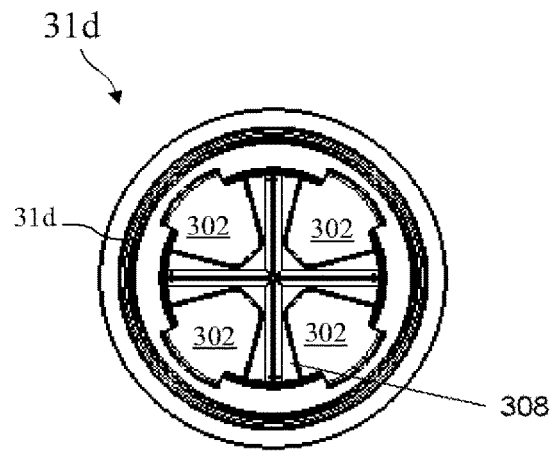

FIG. 89B shows a bottom side view of the coffee holder of FIG. 84A according to the present invention, with the lid removed.

Corresponding reference characters indicate corresponding components throughout the several views of the drawings.

DETAILED DESCRIPTION OF THE INVENTION

The following description is not to be taken in a limiting sense, but is made merely for the purpose of describing one or more preferred embodiments of the invention. The scope of the invention should be determined with reference to the claims.

A front view of a coffee 10 maker according to the present invention is shown in FIG. 1A a side view of the coffee maker 10 is shown in FIG. 1B, and a top view of the coffee maker 10 is shown in FIG. 1C. The coffee maker 10 includes a body 12, an opening lid 14, a lid handle 16, a water container 18, a display 20, controls 22, a platform 24 and a mouth 12a. A coffee pitcher 26 rests on the platform 24 inside the mouth 12a and has a pitcher lid 28. The coffee maker 10 provides a flow of hot water through coffee grounds to produce a coffee drink. The flow of water may be heated by one of any known means, for example, an electrical heating coil or a conductive coating on tubing carrying the water.

Figure 2A:
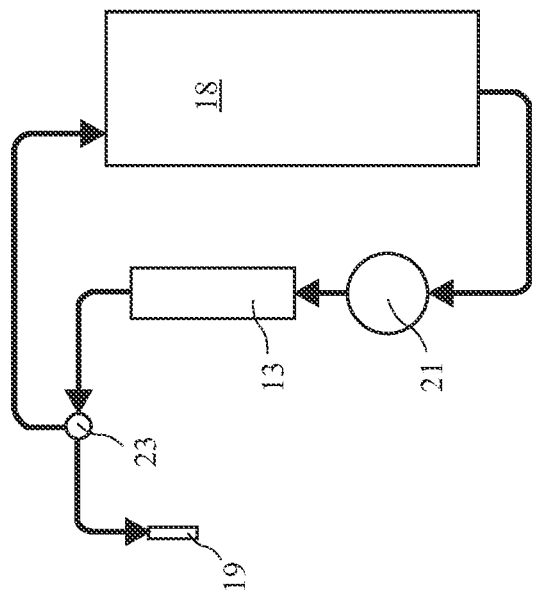
FIG. 2A is a functional diagram of the coffee maker.
Figure 2:
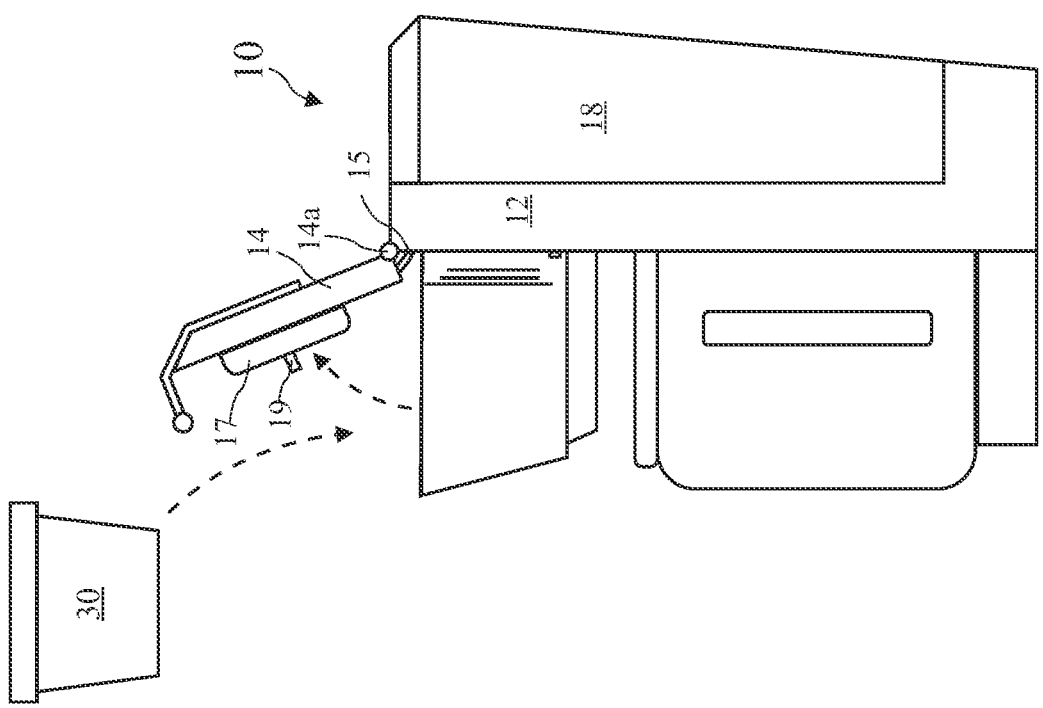
FIG. 2 is a side view of the coffee maker with an open lid allowing placement of a coffee holder according to the present invention inside the coffee maker.

A side view of the coffee maker 10 with an open lid 14 allowing placement of a coffee holder 30 according to the present invention inside the coffee maker 10 is shown in FIG. 2. The lid 14 includes a lid hinge 14a and a water tube 15 carries heated water into the lid 14. A pad 17 resides on a bottom surface of the lid 14 and presses against the coffee holder 30 when the lid 14 is closed, and in cooperation with other means discloses hereafter, tamps coffee contained in the coffee holder 30. A nozzle 19 extending down from the closed lid 14 directs the flow of hot water into the coffee holder 30.

A functional diagram of the coffee maker 10 is shown in FIG. 2A. The preferred coffee maker 10 includes the water tank 18, water pump 21, a heater 13, check valve 23 and the nozzle 18. The pump 21 preferably provides at least one PSI water pressure. The water heater 13 may include a heating coil or a resistive coating or any other means for heating water. The check valve 23 limits the water pressure at the nozzle 19 by returning some of the water flow to the water tank 18. While a the water pump 21 is a preferred method for providing a flow of water to the nozzle 19, other methods include pressuring the water in the water tank 18, and a coffee maker using any means to provide a forced flow of water is intending to within the scope of the present invention.

Figure 3:
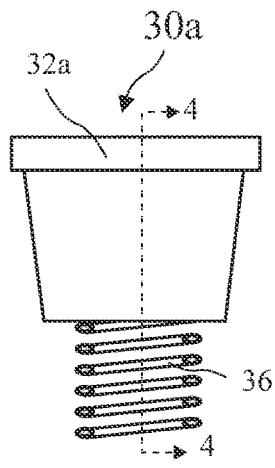
FIG. 3 is a side view of a first coffee holder according to the present invention.
Figure 4:
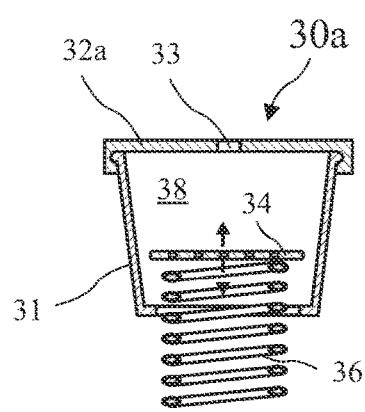
FIG. 4 is a cross-sectional side view of the first coffee holder according to the present invention taken along line 4-4 of FIG. 3.

A side view of a first coffee holder 30a according to the present invention is shown in FIG. 3 and a cross-sectional side view of the first coffee holder 30a including a holder body 31, a first holder lid 32a, a bottom tamper 34, and a tamping spring 36 according to the present invention taken along line 4-4 of FIG. 3 is shown in FIG. 4. A volume (or coffee holder interior) 38 is provided inside the coffee holder 30a to receive loose coffee 41. A passage 33 in the lid 32a is provided for the nozzle 19 (see FIG. 2).

Figure 5A:
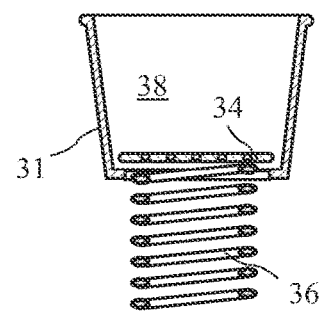
FIG. 5A is a cross-sectional side view of the first coffee holder according to the present invention taken along line 4-4 of FIG. 3 showing an empty coffee holder with the tamping spring and the bottom tamper according to the present invention.
Figure 5B:
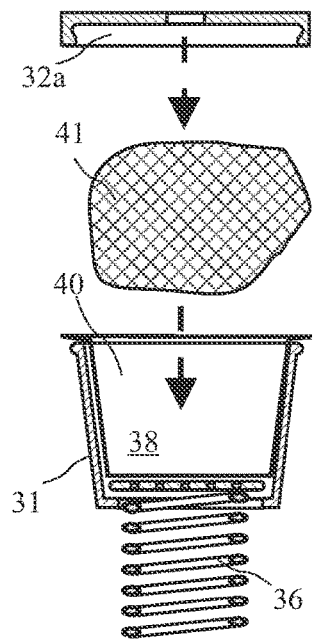
FIG. 5B is a cross-sectional side view of the first coffee holder according to the present invention taken along line 4-4 of FIG. 3 showing the coffee holder with the tamping spring and bottom tamper, a portion of coffee, and the holder lid ready to attach to a holder body according to the present invention.
Figure 5C:
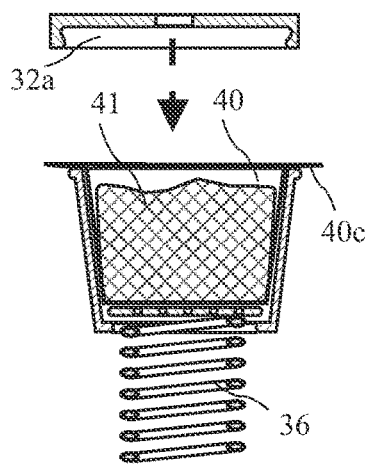
FIG. 5C is a cross-sectional side view of the first coffee holder according to the present invention taken along line 4-4 of FIG. 3 showing the coffee holder with the tamping spring and bottom tamper, the portion of coffee in the coffee holder, and the holder lid ready to attach to the holder body according to the present invention.
Figure 5D:
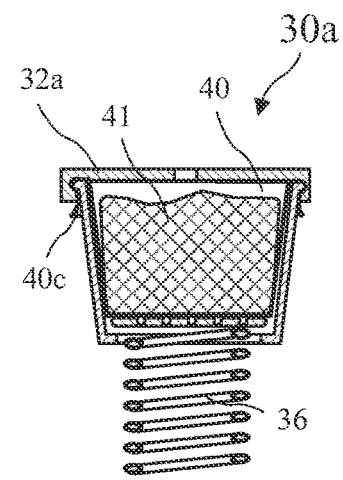
FIG. 5D is a cross-sectional side view of the first coffee holder according to the present invention taken along line 4-4 of FIG. 3 showing the coffee holder with the tamping spring and bottom tamper, the portion of coffee in the coffee holder, and the holder lid attached to the coffee holder body, according to the present invention.

A cross-sectional side view of the first coffee holder 30a taken along line 4-4 of FIG. 3 showing an empty coffee holder 30a with the tamping spring 36 and the bottom tamper 34 ready for filling are shown in FIG. 5A. A cross-sectional side view of the first coffee holder 30a taken along line 4-4 of FIG. 3 showing the coffee holder 30a with the tamping spring 36 and bottom tamper 34, a portion of loose coffee 41, and the holder lid 32a ready to attach is shown in FIG. 5B. A cross-sectional side view of the first coffee holder 30a taken along line 4-4 of FIG. 3 showing the coffee holder 30a with the tamping spring 36 and bottom tamper 34, a portion of coffee in the volume 38, and the holder lid 32a ready to attach is shown in FIG. 5C. A cross-sectional side view of the first coffee holder 30a taken along line 4-4 of FIG. 3 showing the coffee holder 30a with the tamping spring 36 and bottom tamper 34, a portion of loose coffee 41 in the volume 38, and the holder lid 32a attached to the coffee holder 30a, is shown in FIG. 5D.

Figure 6:
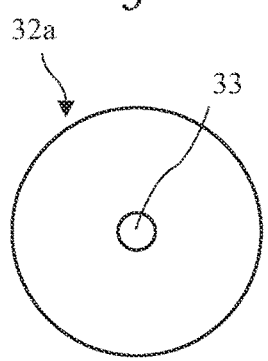
FIG. 6 is a top view of the first holder lid.

A top view of the first holder lid 32a showing the passage 33 provided for the nozzle 19 (see FIG. 2) is shown in FIG. 6.

Figure 7A:
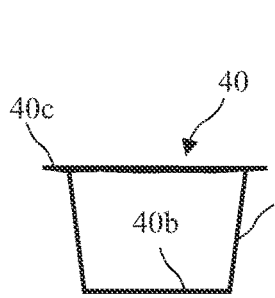
FIG. 7A is a side view of a filter paper cup according to the present invention.
Figure 7B:
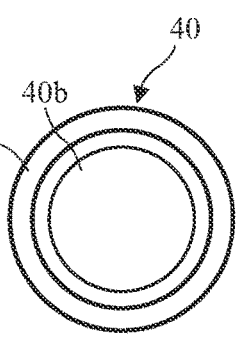
FIG. 7B is a top view of the filter paper cup according to the present invention.

A side view of a filter paper cup 40 according to the present invention is shown in FIG. 7A and a top view of the filter paper cup 40 is shown in FIG. 7B. The filter paper cup 40 includes a bottom 40b, sides 40a, and a rim 40c. The rim 40c rests on a top edge of the holder body 31 and is held between the holder cap and body when the cap is placed on the body, thereby preventing or restricting the escape of coffee 41 from the cup 40 when hot water flows into the coffee holder 30a.

Figure 7C:
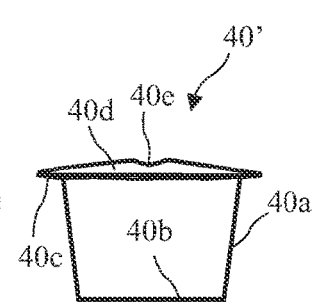
FIG. 7C is a second embodiment of the filter paper cup with a lid.

A second embodiment of the filter paper cup 40' with a folding paper lid 40d is shown in FIG. 7C. The lid 40d of the filter paper cup 40' may be folded over the cup 40' after loose coffee is poured into the cup. The lid 40d preferably includes a perforation 40e centered on the lid 40d allowing the nozzle 19 to enter and/or inject the hot flow of water into the tamped coffee 41.

The filter cups may be made from several materials including filter paper, nylon mesh, steel mesh, or any material suitable for filtration.

The first coffee holder 30a is shown ready for insertion into a first coffee maker 10a in FIG. 8A, the first coffee holder 30a is shown inserted into the coffee maker 10 before tamping the coffee 41 in FIG. 8B, and the first coffee holder 30a is shown in the coffee maker 10 after tamping the coffee 41 in FIG. 8C. The coffee maker includes a cavity 11 for accepting the coffee holder and has walls 11a for aligning the coffee holder in the coffee maker. When the lid 14 is closed, the pad 17 on the bottom of the lid 14 and/or arms 25 attached to the bottom of the lid 25, push the coffee holder 30a down over the tamping spring 36 and the coffee 41 is tamped between the lid 32a and the bottom tamper 34. The arms 25 push the coffee holder 30a down ahead of the nozzle 19 thereby seating the coffee holder 30a in the cavity 11 for alignment of the nozzle 10 with the passage 33 in the lid 32a.

Figure 9:
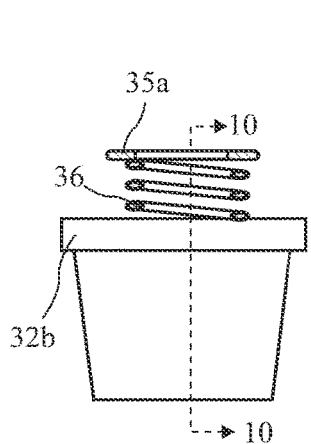
FIG. 9 is a side view of a second coffee holder according to the present invention.
Figure 10:
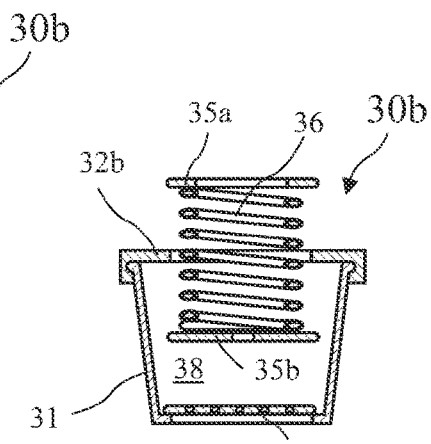
FIG. 10 is a cross-sectional side view of the second coffee holder according to the present invention taken along line 10-10 of FIG. 9.

A side view of a second coffee holder 30b according to the present invention is shown in FIG. 9 and a cross-sectional side view of the second coffee holder 30*b* taken along line 10-10 of FIG. 9 is shown in FIG. 10. The coffee holder 30*b* includes the holder body 31, a second holder lid 32*b*, a tamping spring 36, a spring washer 35*a*, and a top tamper 35*b*.

Figure 11A:
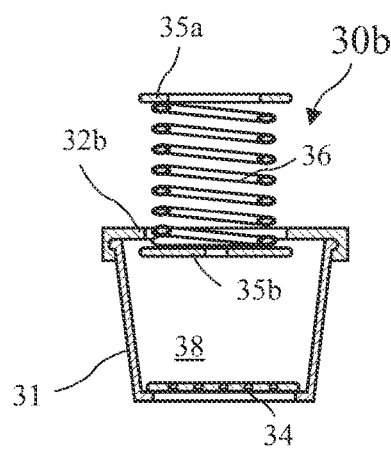
FIG. 11A is a cross-sectional side view of the second coffee holder according to the present invention taken along line 10-10 of FIG. 9 showing an empty coffee holder with the tamping spring and the top tamper according to the present invention.
Figure 11B:
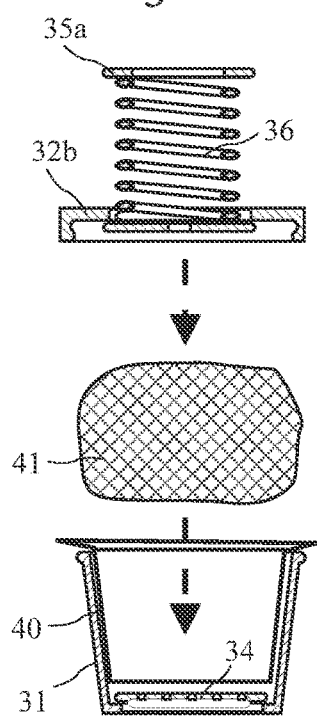
FIG. 11B is a cross-sectional side view of the second coffee holder according to the present invention taken along line 10-10 of FIG. 9 showing the coffee holder with the holder lid, tamping spring and top tamper, and a portion of coffee, ready to attach according to the present invention.
Figure 11C:
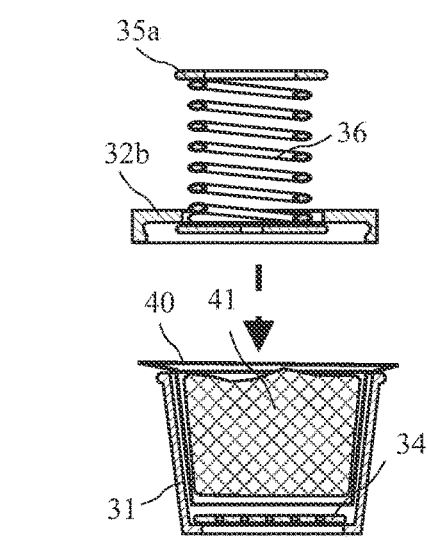
FIG. 11C is a cross-sectional side view of the second coffee holder according to the present invention taken along line 10-10 of FIG. 9 showing the portion of untamped coffee in the coffee holder, and the holder lid, tamping spring and top tamper, ready to attach to the holder base, according to the present invention.
Figure 11D:
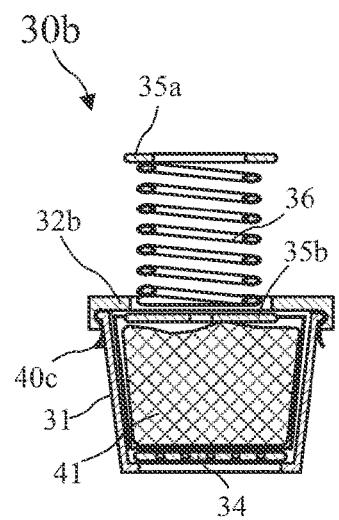
FIG. 11D is a cross-sectional side view of the second coffee holder according to the present invention taken along line 10-10 of FIG. 9 showing the portion of coffee in the coffee holder and the tamping spring, top tamper, and the holder lid attached to the coffee holder, according to the present invention.

A cross-sectional side view of the second coffee holder 30*b* taken along line 10-10 of FIG. 9 showing an empty coffee holder 30*b* is shown in FIG. 11A. A cross-sectional side view of the second coffee holder 30*b* taken along line 10-10 of FIG. 9 showing the holder lid 32*b* and a loose portion of coffee 41 above the empty coffee holder 30*b* is shown in FIG. 11B. A cross-sectional side view of the second coffee holder 30*b* taken along line 10-10 of FIG. 9 showing the holder lid 32*b* above the coffee holder 30*b* with the portion of loose coffee 41 in the coffee holder 32*b* is shown in FIG. 11C. A crosssectional side view of the second coffee holder 32*b* taken along line 10-10 of FIG. 9 showing the coffee holder with the holder lid 32*b* attached to the coffee holder 30*b* and a portion of loose coffee 41 in the coffee holder 30*b* is shown in FIG. 11D. The tamping spring 36 extends upward out of the coffee holder 30*b* for tamping the loose coffee as disclosed hereafter.

Figure 12:
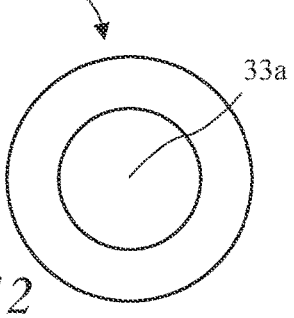
FIG. 12 is a top view of the second holder lid.

A top view of the second holder lid 32*b* is shown in FIG. 12. The holder lid 32*b* includes a larger passage 33*a* allowing passage of the tamping spring 36 through the holder lid 32*b*.

Figure 13:
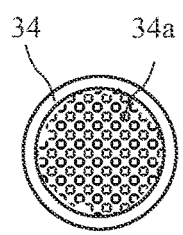
FIG. 13 is a top view of the bottom tamper.

A top view of the bottom tamper 34 is shown in FIG. 13. The bottom tamper 34 includes perforations 34*a* to allow coffee drink to pass through the bottom tamper 34.

Figure 14C:
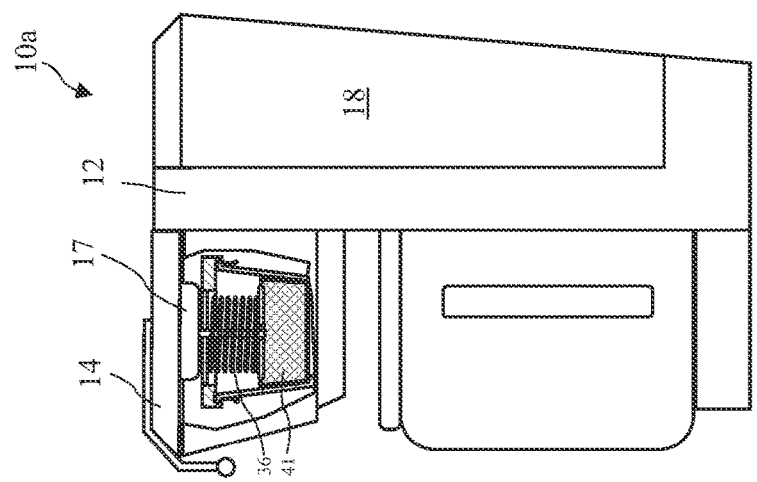
FIG. 14C shows the second coffee holder inserted into the coffee maker after tamping the coffee.
Figure 14B:
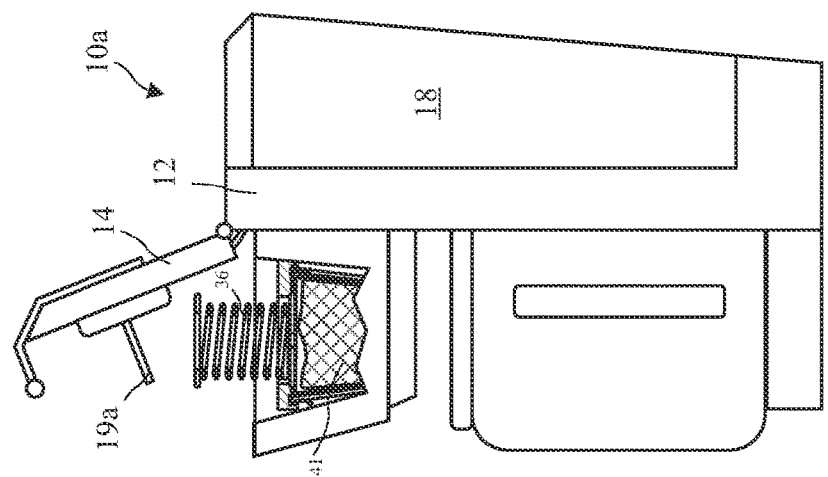
FIG. 14B shows the second coffee holder inserted into the coffee maker before tamping the coffee.
Figure 14A:
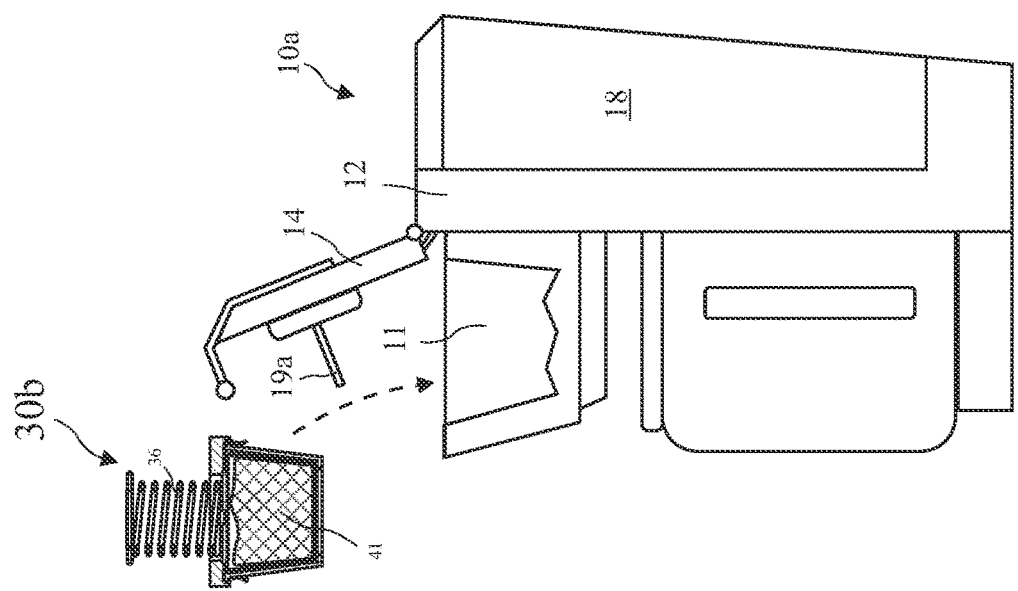
FIG. 14A shows the second coffee holder ready for insertion into the coffee maker.

The second coffee holder 30*b* is shown ready for insertion into the coffee maker 10 in FIG. 14A, the second coffee holder 30*b* is shown inserted into the coffee maker 10 before tamping the coffee 41 in FIG. 14B, and the second coffee holder 30*b* is shown in the coffee maker 10 after tamping the coffee 41 in FIG. 14C. The coffee maker 10 may include a long nozzle 19*a* to reach the top tamper 35*b* for "injection" of the heated water into the tamped coffee, but may also include the nozzle 19 and the heated water may pass through the coffee 41 under the pull of gravity.

A side view of a third coffee holder 30*c* according to the present invention is shown in FIG. 16 and a cross-sectional side view of the third coffee holder 30*c* taken along line 16-16 of FIG. 15 is shown in FIG. 16. The coffee holder 30*c* includes the holder body 31, the second holder lid 32*b*, the bottom tamper 34, and the top tamper 35*b*.

A cross-sectional side view of the third coffee holder 30*c* taken along line 16-16 of FIG. 15 showing the coffee holder 30*c* with the holder lid 32*b*, the top tamper 35*b*, and a portion of coffee, ready to attach to the holder 31, is shown in FIG. 17A. A cross-sectional side view of the third coffee holder taken along line 16-16 of FIG. 15 showing the coffee holder 30*c* with the holder lid 32*b* and the top tamper ready to attach, and a portion of coffee 41 in the coffee holder, is shown in FIG. 17B. A cross-sectional side view of the third coffee holder 30*c* taken along line 16-16 of FIG. 15 showing the coffee holder with the holder lid and the top tamper attached and a loose portion of coffee 41 in the coffee holder is shown in FIG. 17C. The coffee holder 30*c* is configured to use with a coffee make 10*b* (see FIGS. 18A-18C) including apparatus for entering the coffee holder for tamping the loose coffee 41.

Figure 18C:
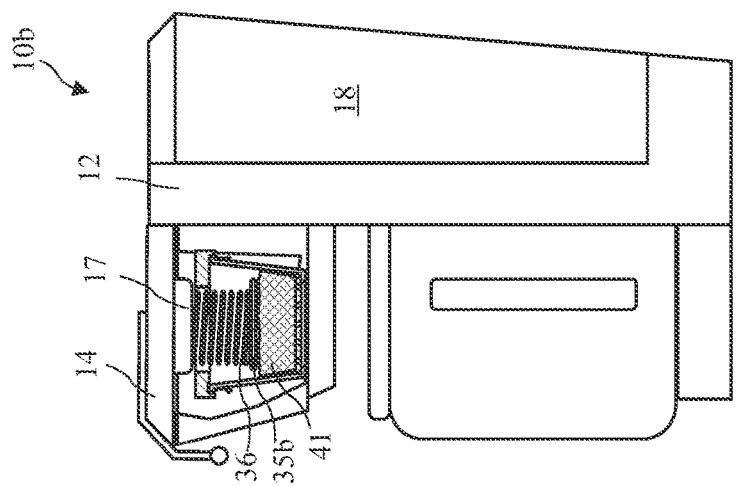
FIG. 18C shows the third coffee holder inserted into the coffee maker after tamping the coffee.
Figure 18B:
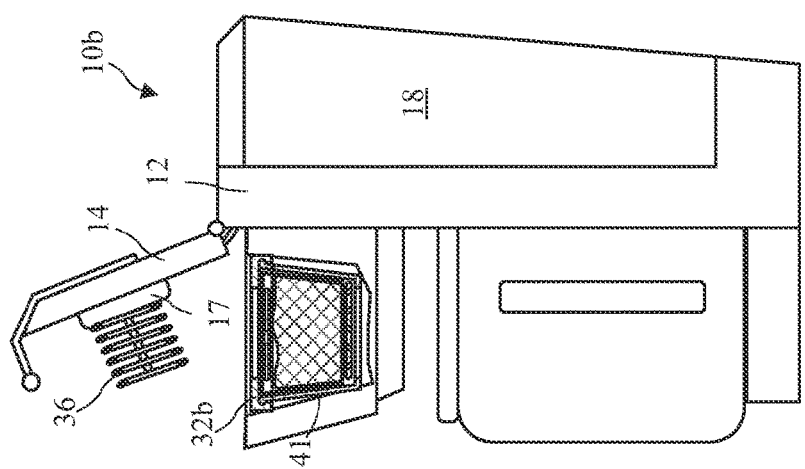
FIG. 18B shows the third coffee holder inserted into the coffee maker before tamping the coffee.
Figure 18A:
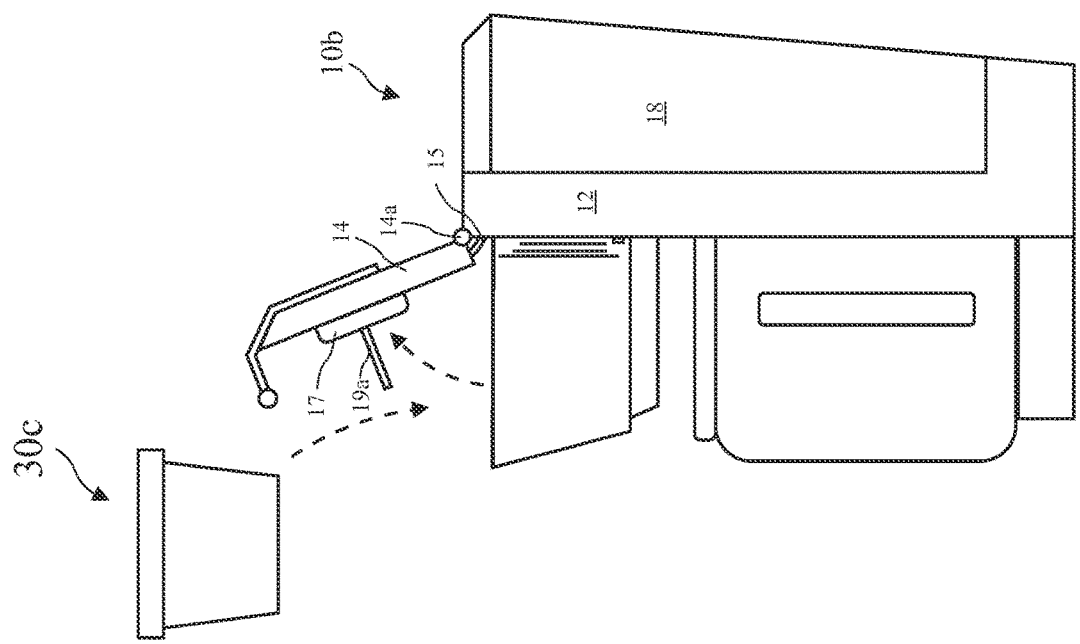
FIG. 18A shows the third coffee holder ready for insertion into a second coffee maker according to the present invention.

The third coffee holder 30*c* ready for insertion into a second coffee maker 10*b* in FIG. 18A, the third coffee holder 30*c* is shown residing in the coffee maker 10*b* before tamping the coffee 41 in FIG. 18B, and the third coffee holder 30*c* is shown residing in the coffee maker 10*b* after tamping the coffee 41 in FIG. 18C. The coffee maker 10*b* includes the tamping spring 36 attached to the pad 17 on the bottom of the lid 14. When the lid 14 is closed the tamping spring 36 enters the coffee holder 30*c* through the lid passage 33*a* (see FIG. 12) and pushes the top tamper 35*b* against the coffee 41 to tamp the coffee 41.

Figures 19, 20:
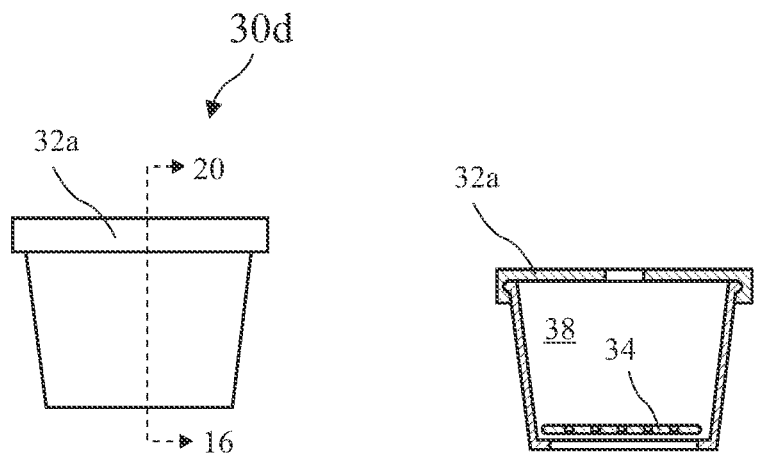
FIG. 19 is a side view of a fourth coffee holder according to the present invention.
FIG. 20 is a cross-sectional side view of the fourth coffee holder according to the present invention taken along line 20-20 of FIG. 19.

A side view of a fourth coffee holder 30*d* according to the present invention is shown in FIG. 19 and a cross-sectional side view of the fourth coffee holder 30*d* taken along line 20-20 of FIG. 19 is shown in FIG. 20. The coffee holder 30*d* includes the holder body 31, the first holder lid 32*a*, and the bottom tamper 34.

Figures 21A, 21B, 21C:
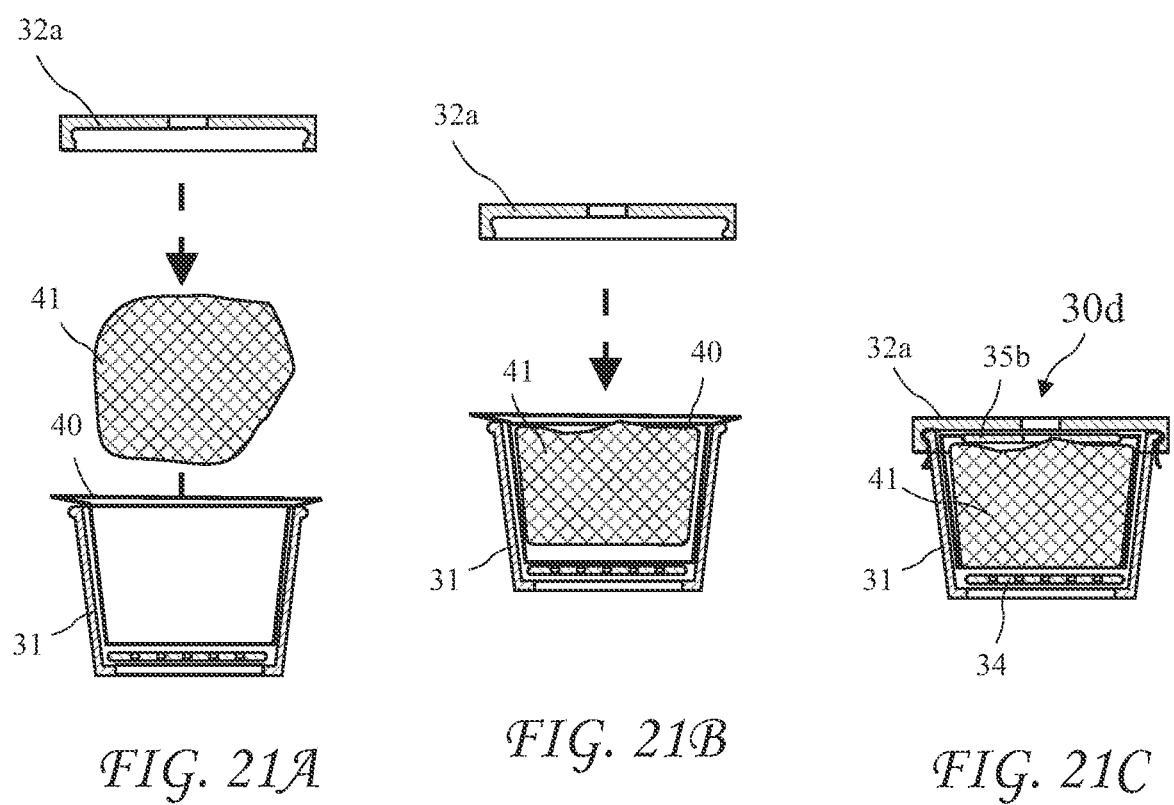
FIG. 21A is a cross-sectional side view of the fourth coffee holder according to the present invention taken along line 20-20 of FIG. 19 showing the coffee holder with the bottom tamper, a portion of coffee, and the holder lid ready to attach, according to the present invention.
FIG. 21B is a cross-sectional side view of the fourth coffee holder according to the present invention taken along line 20-20 of FIG. 19 showing the coffee holder with the bottom tamper, a portion of coffee in the coffee holder, and the holder lid ready to attach, according to the present invention.
FIG. 21C is a cross-sectional side view of the fourth coffee holder according to the present invention taken along line 20-20 of FIG. 19 showing the coffee holder with the bottom tamper, a portion of coffee in the coffee holder, and the holder lid attached, according to the present invention.

A cross-sectional side view of the fourth coffee holder 30*d* taken along line 20-20 of FIG. 19 showing the coffee holder with the bottom tamper 34, and a portion of coffee 41 and the holder lid ready to attach is shown in FIG. 21A. A cross-sectional side view of the fourth coffee holder 30*d* taken along line 20-20 of FIG. 19 showing the coffee holder 30*d* with the bottom tamper 34, the portion of coffee 41 in the coffee holder 30*d*, and the holder lid 32*a* ready to attach is shown in FIG. 21B. A cross-sectional side view of the fourth coffee holder 30*d* taken along line 20-20 of FIG. 19 showing the coffee holder 30*d* with the bottom tamper 34, a portion of coffee in the coffee holder 41, and the holder lid 32*a* is shown in FIG. 21C.

Figure 22C:
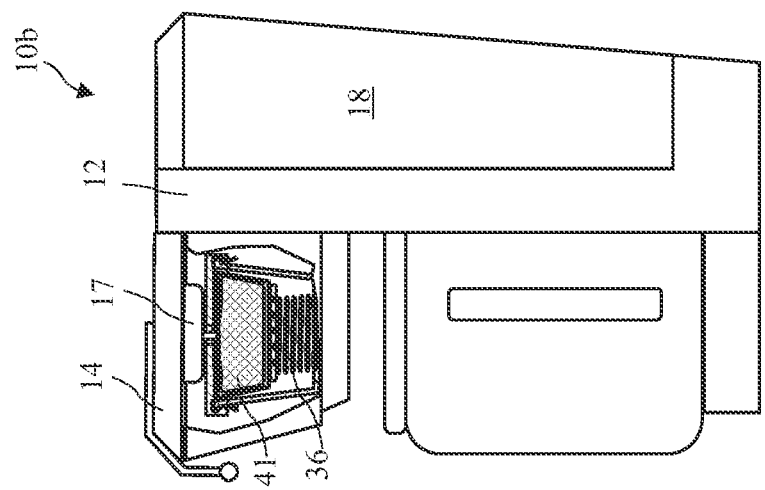
FIG. 22C shows the fourth coffee holder inserted into the coffee maker after tamping the coffee.
Figure 22B:
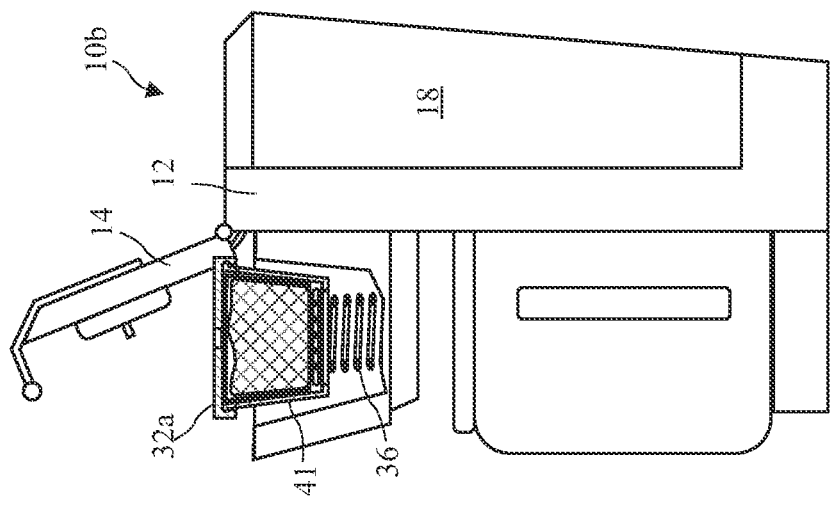
FIG. 22B shows the fourth coffee holder inserted into the coffee maker before tamping the coffee.
Figure 22A:
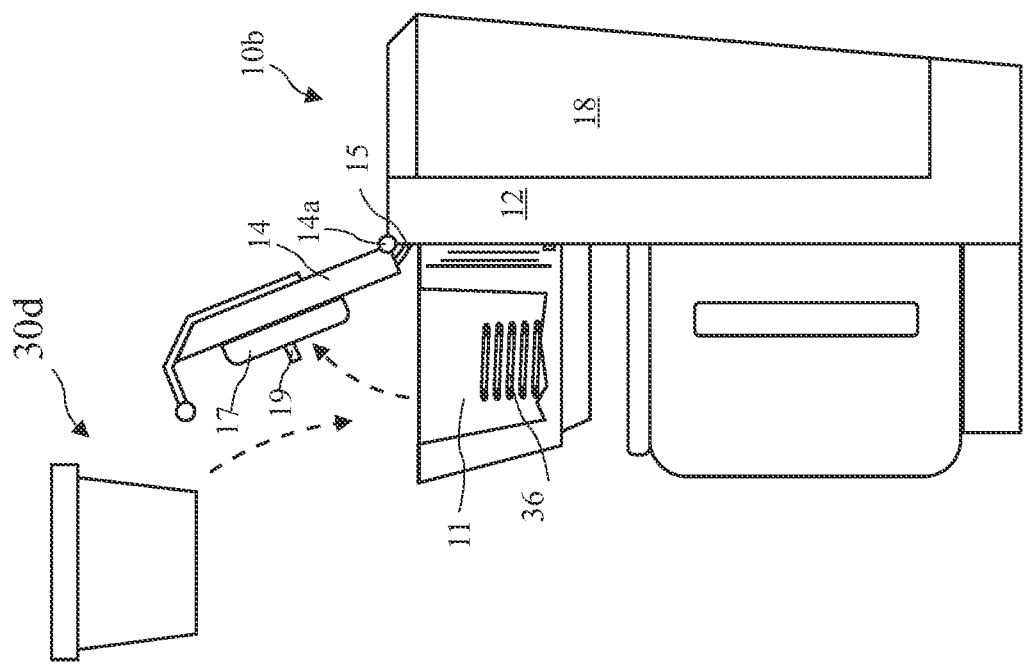
FIG. 22A shows the fourth coffee holder ready for insertion into the coffee maker.

The fourth coffee holder 30*d* ready for insertion into another embodiment of the second coffee maker 10*b* in FIG. 22A, the fourth coffee holder 30*d* is shown residing in the coffee maker 10*b* before tamping the coffee 41 in FIG. 22B, and the fourth coffee holder 30*d* is shown residing in the coffee maker 10*b* after tamping the coffee 41 in FIG. 22C. The coffee maker 10*b* may include the tamping spring 36 residing in the bottom of the coffee holder cavity 11. When the lid 14 is closed, the pad 17 pushed the coffee holder 30*d* down over the tamping spring 36 and the tamping spring 36 enters the coffee holder 30*c* through the bottom of the holder body 31 and pushes the bottom tamper 34 against the coffee 41 to tamp the coffee 41.

Figure 23C:
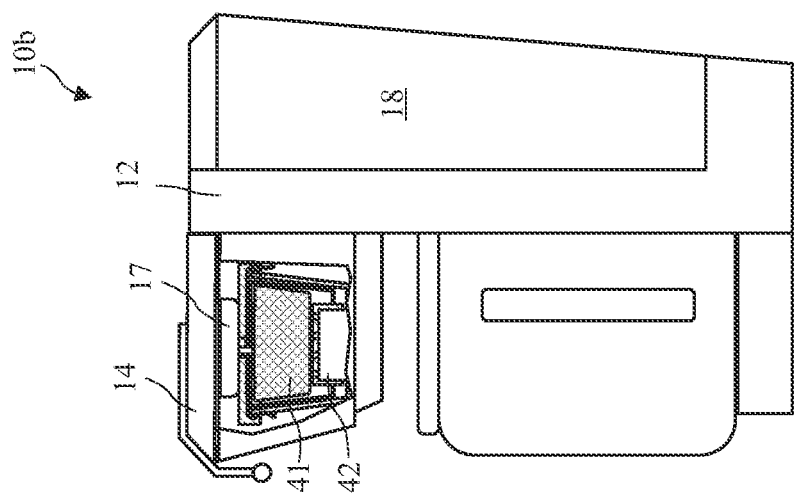
FIG. 23C shows the fourth coffee holder inserted into the coffee maker having the tamping block after tamping the coffee.
Figure 23B:
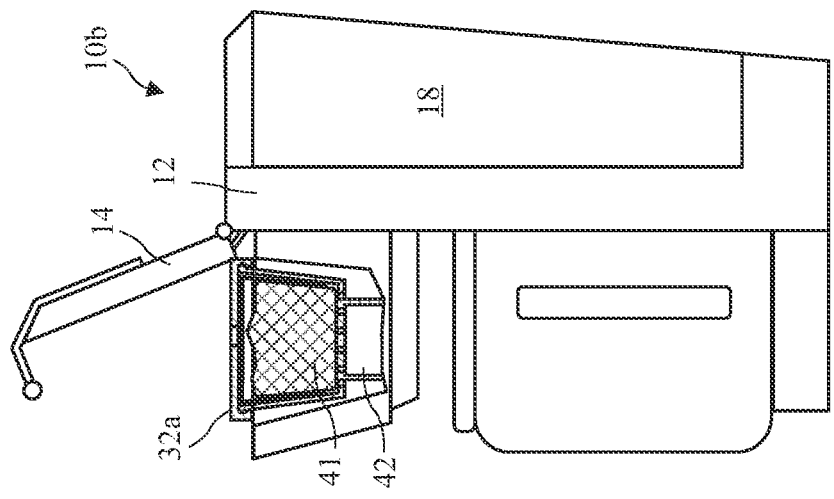
FIG. 23B shows the fourth coffee holder inserted into the coffee maker having the tamping block before tamping the coffee.
Figure 23A:
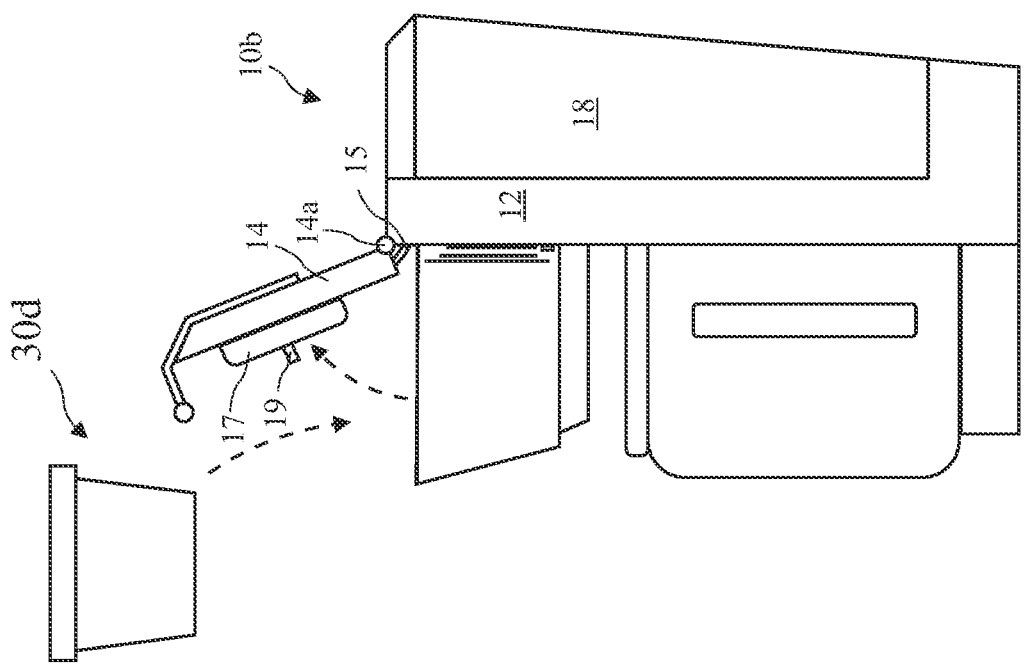
FIG. 23A shows the fourth coffee holder ready for insertion into the coffee maker having a tamping block according to the present invention.

The fourth coffee holder 30*d* ready for insertion into another embodiment of the second coffee maker 10*b* in FIG. 23A, the fourth coffee holder 30*d* is shown residing in the coffee maker 10*b* before tamping the coffee 41 in FIG. 23B, and the fourth coffee holder 30*d* is shown residing in the coffee maker 10*b* after tamping the coffee 41 in FIG. 23C. The coffee maker 10*b* may include a resilient solid block 42 residing in the bottom of the coffee holder cavity 11. When the lid 14 is closed, the pad 17 pushed the coffee holder 30*d* down over the resilient solid block 42 and the resilient solid block 42 enters the coffee holder 30*c* through the bottom of the holder body 31 and pushes the bottom tamper 34 against the coffee 41 to tamp the coffee 41.

A side view of a fifth coffee holder 30*e* according to the present invention is shown in FIG. 24 and a cross-sectional side view of the fifth coffee holder 30*e* taken along line 25-25 of FIG. 24 is shown in FIG. 25. The fifth coffee holder 30*e* includes the holder body 31, the holder lid 32*b*, the tamping spring 36 and the top tamper 35*b* attached to the holder lid 32*a*.

A cross-sectional side view of the fifth coffee holder 30*e* taken along line 25-25 of FIG. 24 showing the coffee holder 30*e* with a portion of coffee 41, and the holder lid 32*b* with the top tamper 35*b* and tamping spring 36 attached, above the holder body 31, is shown in FIG. 26A. A cross-sectional side view of the fifth coffee holder 30*e* taken along line 25-25 of FIG. 24 showing the coffee holder with the portion of coffee 41 in the coffee holder, and the holder lid 32*b* with the top tamper 35*b* and tamping spring 36 attached, above the holder body 31, is shown in FIG. 26B. A cross-sectional side view of the fifth coffee holder 30e taken along line 25-25 of FIG. 24 showing the coffee holder 30e with the portion of coffee 41 in the coffee holder 30e, and the holder lid 32b with the top tamper 35b and tamping spring 36 attached to the holder base 31 is shown in FIG. 26D. The tamping spring 36 and top tamper 35b tamp the coffee 41 to provide a tamped coffee when the holder lid 32b is attached to the holder base 31.

A side view of a sixth coffee holder 30f according to the present invention is shown in FIG. 27 and a cross-sectional side view of the sixth coffee holder 30f taken along line 28-28 of FIG. 27 is shown in FIG. 28. The sixth coffee holder 30f includes the holder body 31 and a third holder lid 32c. The third holder lid 32c includes a recessed portion 32' which reaches into the interior of the sixth coffee holder 30f. The recessed portion 32' is preferably a solid resilient material.

A cross-sectional side view of the sixth coffee holder 30f taken along line 28-28 of FIG. 27 showing the sixth coffee holder 30f with a portion of coffee 41, and the holder lid 32c, above the holder body 31, is shown in FIG. 29A. A cross-sectional side view of the sixth coffee holder 30f taken along line 28-28 of FIG. 27 showing the coffee holder with the portion of coffee 41 in the coffee holder, and the holder lid 32c above the holder body 31, is shown in FIG. 29B. A cross-sectional side view of the sixth coffee holder 30f along line 28-28 of FIG. 27 showing the sixth coffee holder 30f with the portion of coffee 41 in the coffee holder 30e, and the holder lid 32e attached to the holder base 31 is shown in FIG. 26D. A cushion 32' tamps the coffee 41 to provide a tamped coffee when the holder lid 32e is attached to the holder base 31. The cushion 32' is preferably made from a resilient material to cushion the tamping of the loose coffee.

A side view of a seventh coffee holder 30g according to the present invention is shown in FIG. 30 and a cross-sectional side view of the seventh coffee holder 30g taken along line 31-31 of FIG. 30 is shown in FIG. 31. The seventh coffee holder 30g includes the holder body 31, the holder lid 32b, the tamping spring 36, and the bottom tamper 34 inside the holder base 31.

A cross-sectional side view of the seventh coffee holder 30g taken along line 31-31 of FIG. 30 showing the seventh coffee holder 30g with a portion of coffee 41 and the holder lid 32a above the holder body 31, and with the bottom tamper 34 and tamping spring 36 inside the holder base 31, is shown in FIG. 26A. A cross-sectional side view of the seventh coffee holder 30g taken along line 31-31 of FIG. 30 showing the coffee holder with the portion of coffee 41 in the filter paper 40 in the holder base 31 resting on the bottom tamper 34 supported by the tamping spring 36, and the holder lid 32a above the holder body 31, is shown in FIG. 26B. A cross-sectional side view of the seventh coffee holder 30g taken along line 31-31 of FIG. 30 showing the seventh coffee holder 30g with the portion of coffee 41 in the coffee holder 30e, and the holder lid 32a attached to the holder base 31, is shown in FIG. 26D. The tamping spring 36 and bottom tamper 34 tamp the coffee 41 upward against the tamper lid 32a to provide a tamped coffee when the holder lid 32a is attached to the holder base 31.

Figures 33, 34A, 34B:
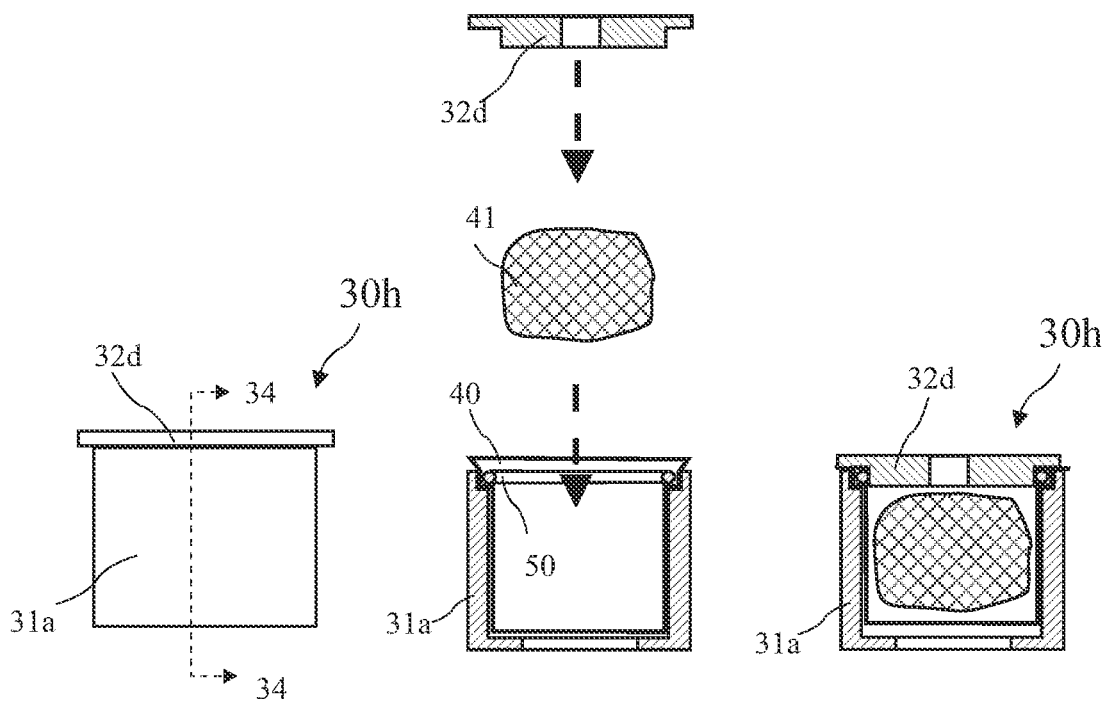
FIG. 33 is a side view of an eighth coffee holder according to the present invention.
FIG. 34A is a cross-sectional side view of the eighth coffee holder taken along line 34-34 of FIG. 33 showing a portion of coffee for placing inside the coffee holder and the holder lid with an insertable portion and an O-Ring inside the coffee holder for sealing according to the present invention.
FIG. 34B is a cross-sectional side view of the eighth coffee holder taken along line 34-34 of FIG. 33 showing the portion of coffee inside the coffee holder and the holder lid with the insertable portion inserted into the coffee holder and cooperating with the O-Ring inside the coffee holder for sealing.

A side view of an eighth coffee holder 30h according to the present invention is shown in FIG. 33, a cross-sectional side view of the eighth coffee holder 30h taken along line 34-34 of FIG. 33 showing a portion of coffee 41 for placing inside the coffee holder and a fourth holder lid 32d with an insertable portion and an O-Ring 50 inside the coffee holder for sealing is shown in FIG. 34A, and a cross-sectional side view of the eighth coffee holder taken along line 34-34 of FIG. 33 showing the portion of coffee 41 inside the coffee holder 30h and the holder lid 32d with the insertable portion inserted into the coffee holder base 31a is shown in FIG. 34B. The filter paper 40 extends up above the O-ring 50 and the O-Ring 50 cooperates with the holder lid 32d to sandwich the top edge of the filter paper 40 for sealing the filter paper 40 to reduce or prevent the coffee 41 from escaping when the flow of hot water is provided to the coffee holder 30h. The holder base 31a is preferably cylindrical but may also be conical in shape.

Figures 35, 36A, 36B:
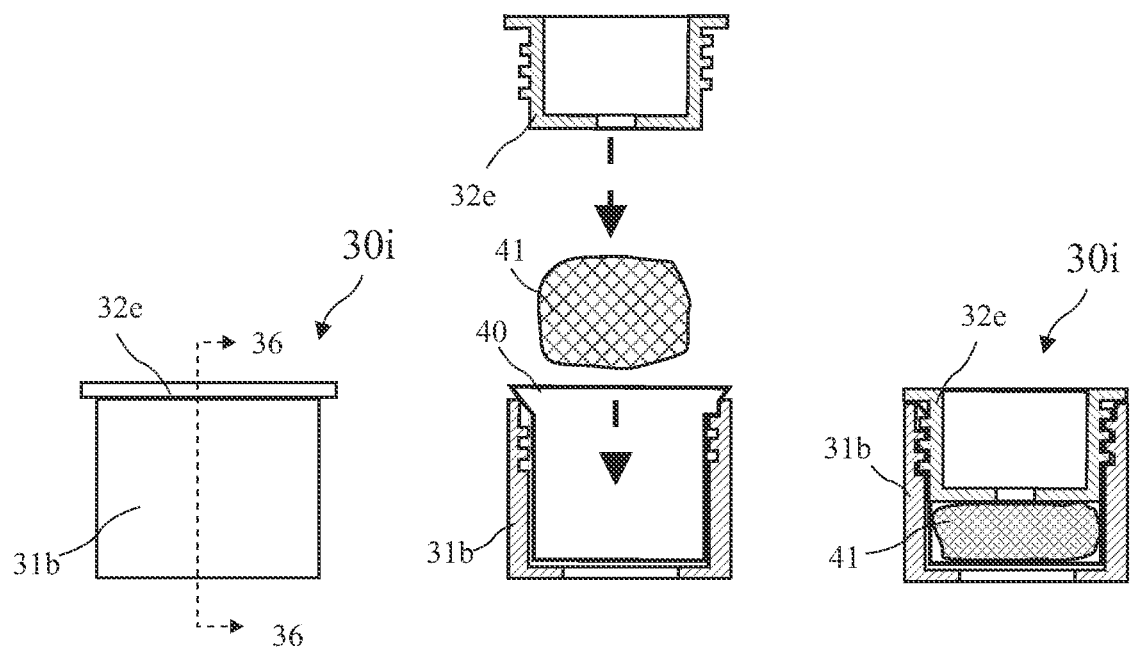
FIG. 35 is a side view of a ninth coffee holder according to the present invention.
FIG. 36A is a cross-sectional side view of the ninth coffee holder taken along line 36-36 of FIG. 35 showing a portion of coffee for placing inside the coffee holder and a holder lid with a threaded portion for screwing inside the holder body for sealing according to the present invention.
FIG. 36B is a cross-sectional side view of the ninth coffee holder taken along line 36-36 of FIG. 35 showing the portion of coffee inside the coffee holder and a holder lid with the threaded portion screwed into the holder body and tamping the coffee according to the present invention.

A side view of a ninth coffee holder 30i according to the present invention is shown in FIG. 35, a cross-sectional side view of the ninth coffee holder 30i taken along line 36-36 of FIG. 35 showing a portion of coffee 41 for placing inside the coffee holder and a fifth holder lid 32e with a threaded portion for screwing inside the holder base 31b for sealing is shown in FIG. 36A, and a cross-sectional side view of the ninth coffee holder 30i taken along line 36-36 of FIG. 35 showing the portion of coffee 41 inside the coffee holder and the holder lid 32e with the threaded portion screwed into the coffee holder and tamping the coffee 41 is shown in FIG. 36B. The threads both provide tamping and sealing the coffee to reduce or prevent the coffee 41 from escaping when the flow of hot water is provided to the coffee holder 30h. The holder base 31b is preferably cylindrical to facilitate having internal threads, and at least the threaded portion is preferably cylindrical.

A third coffee maker 10c having a coffee holder 30 according to the present invention for receiving a portion of coffee and a tamping spring 36 for tamping the coffee is shown in FIG. 37A, the third coffee maker 10c with the coffee holder 30 holding the portion of coffee 41 is shown in FIG. 37B, and the third coffee maker 10c with the coffee holder 30 holding the portion of coffee 41 with the coffee maker lid 14 closed for tamping the coffee 41 is shown in FIG. 37C. When the lid 14 is closed, the pad 17 pushes the coffee holder 30 down and the tamping spring 36 enters the bottom of the coffee holder 30 to tamp the coffee 41. While attaching the lid 32a to the holder 30 is preferred in order to prevent coffee grounds from escaping the holder 30, the coffee maker 10c may also be used without the lid 32a and the pad 17 may serve to seal the coffee 41 in the holder 30. In this instance, the coffee maker lid 14 serves as a coffee holder lid.

A third coffee maker 10c having a coffee holder for receiving a portion of coffee and tamping spring 36 attached to the coffee maker lid 14 according to the present invention for tamping the coffee 41 when the coffee maker lid 14 is closed is shown in FIG. 38A, the third coffee maker with the coffee holder 30 holding the portion of coffee 41 is shown in FIG. 38B, and the third coffee maker 10c with the coffee holder 30 holding the portion of coffee 41 with the coffee maker lid 14 closed to push the tamping spring 36 into the coffee holder 30 for tamping the coffee 41 is shown in FIG. 38C.

A fourth coffee maker 10d having a third holder base 31c for receiving a packet 41a containing untamped coffee, a knife 50 for cutting the packet 41a open, and tamping spring 36 under the holder base 31c according to the present invention for tamping the coffee when the coffee maker lid is closed is shown in FIG. 39A, the fourth coffee maker 10d with the holder base 31c holding the packet 41a of untamped coffee is shown in FIG. 39B, and fourth coffee maker with the holder base 31c holding the packet of tamped coffee 41c with the coffee maker lid 14 closed to push the holder base down over the tamping spring 36 for tamping the coffee is shown in FIG. 39C. The coffee maker 10d includes a somewhat pointed nozzle 19b to puncture the packet 41a to provide the flow of hot water to the tamped coffee in the packet 41a. Known coffee packets include internal filters to allow a flow of hot water through the packet to make the coffee drink while preventing coffee grounds from escaping. The cut in the packet 41a made by the knife 50 allows the coffee drink to escape from the packet while filter material in the packet 41a prevent coffee grounds from escaping. The tamping spring 36 may also be attached to the lid 14 as in FIGS. 38A-38C.

The packet 41a may be an airtight pod containing coffee in filter paper and positioning the knife on the side of the holder base 31c results in less likelihood of the knife 50 cutting the filter paper. The packet 41a is preferably airtight to maintain coffee freshness and may be plastic, metal foil, or other airtight material which is sufficiently flexible to allow the coffee contained in the packet 41a to be tamped. Alternatively, the knife 50 may be eliminated when the packet 41a is configured to burst under pressure to expose the coffee, for example, when the coffee maker tamps the coffee, the packet 41a also bursts. In one embodiment, filter paper 41 is inserted into the holder base 31c without the knife 50, and the packet 41a bursts during compacting to release the coffee into the filter paper.

Known coffee makers use a sealed cup or capsule having a somewhat ridged cup with a foil cover. Such cups might be compressible and used in the coffee maker 10d, however, a similar cup or capsule having a less ridged cup which may be compressed in the coffee maker 10d are more suitable for use in the coffee maker 10d to allow tamping of the coffee contained in the cup or capsule.

Figure 40C:
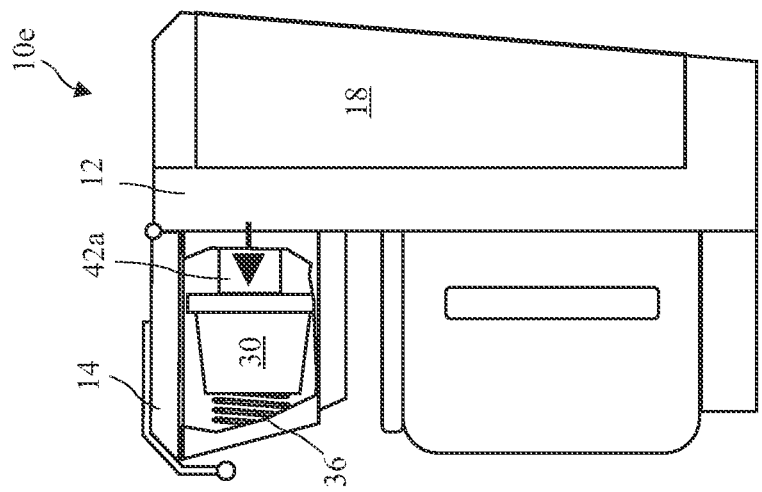
FIG. 40C shows the fifth coffee maker with the coffee holder residing horizontally in the coffee holder cavity with the coffee maker lid closed and the coffee holder pushed against the tamping spring for tamping the coffee, according to the present invention.
Figure 40B:
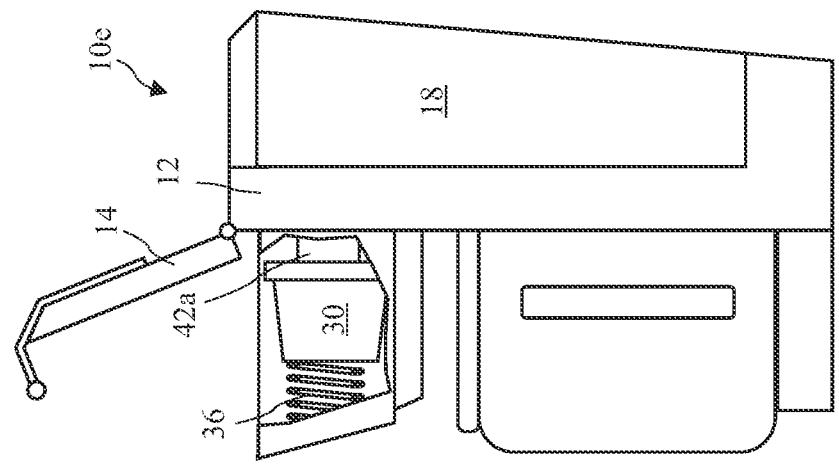
FIG. 40B shows the fifth coffee maker with the coffee holder residing horizontally in the coffee holder cavity according to the present invention for tamping the coffee when the coffee maker lid is closed.
Figure 40A:
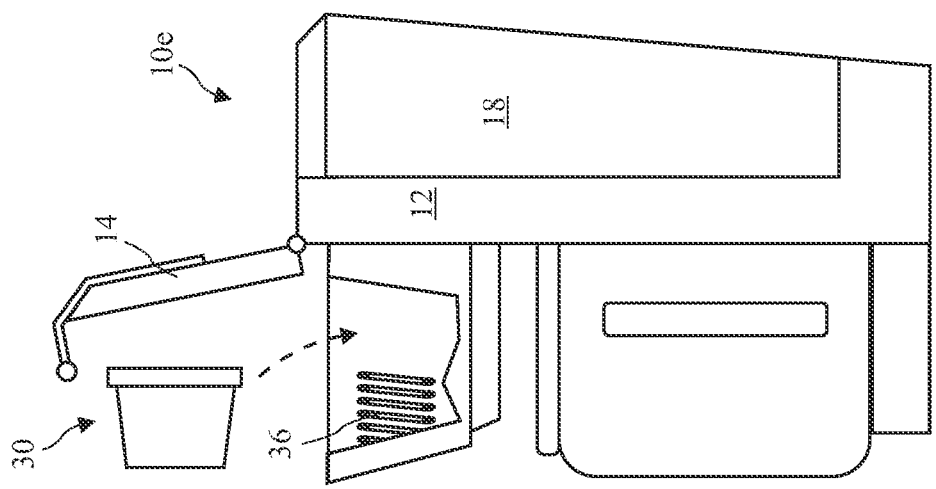
FIG. 40A shows a fifth coffee maker accepting a horizontal coffee holder and tamping spring residing horizontally in a coffee holder cavity according to the present invention for tamping the coffee when the coffee maker lid is closed.

A fifth coffee maker 10e for horizontally receiving the coffee holder 30 is shown in FIG. 40A, the fifth coffee maker with the coffee holder 30 residing in the coffee maker is shown in FIG. 40B, and the fifth coffee maker with the coffee maker lid 14 closed and the tamping spring 36 entering the coffee holder 30 for tamping the coffee 41 is shown in FIG. 40C. The fifth coffee maker 10d may alternatively include a tamping spring entering the coffee holder top, or a resilient solid block pushed into the coffee holder 30 to tamp the coffee. Preferably, a horizontal ram 42a is actuated when the lid 14 is closed and pushed the coffee holder 30 against the spring 36 to tamp the coffee. The horizontal ram 42a may actuated by an electrical solenoid, by pressure, or by mechanical levers connected to the lid 14. The fifth coffee maker 10e may further include any of the features described above for other embodiments of the coffee maker according to the present invention and may be configured to use any of the coffee holders described above according to the present invention.

Figure 41:
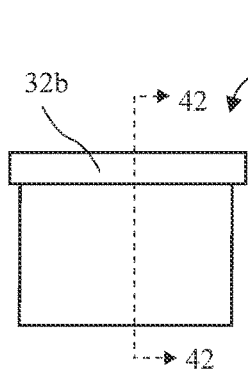
FIG. 41 is a side view of a tenth coffee holder with straight walls according to the present invention.
Figure 42:
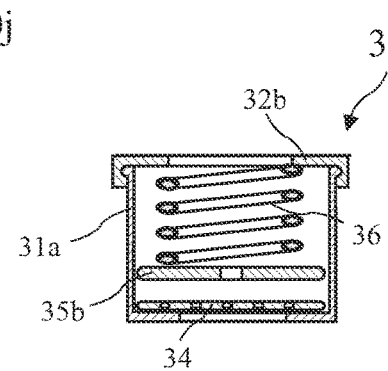
FIG. 42 is a cross-sectional view of the tenth coffee holder taken along line 42-42 of FIG. 41 showing an empty coffee holder.

A side view of a tenth coffee holder 30j with straight walls according to the present invention is shown in FIG. 41, and a cross-sectional view of the tenth coffee holder 30j taken along line 42-42 of FIG. 41 showing an empty coffee holder is shown in FIG. 42. The coffee holder 30j provides straight cylindrical inside walls allowing a better fit between the top tamper 35b and the inside walls to reduce or eliminate coffee 41 escaping past the top tamper 35b during tamping.

Figure 43:
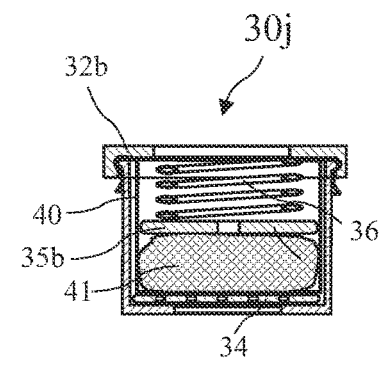
FIG. 43 is a cross-sectional view of the tenth coffee holder taken along line 42-42 of FIG. 41 showing a full and tamped coffee holder.

A cross-sectional view of the tenth coffee holder 30j taken along line 42-42 of FIG. 41 showing a full and tamped coffee holder is shown in FIG. 43. The tamping spring 36 has been pushed down by the lid 32b to tamp the coffee 41.

Figure 44:
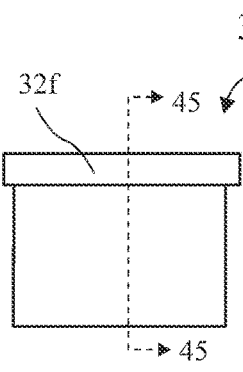
FIG. 44 is a side view of an eleventh coffee holder with straight walls according to the present invention.
Figure 45:
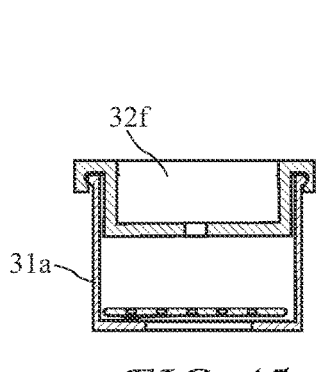
FIG. 45 is a cross-sectional view of the eleventh coffee holder taken along line 45-45 of FIG. 44 showing an empty coffee holder.
Figure 46:
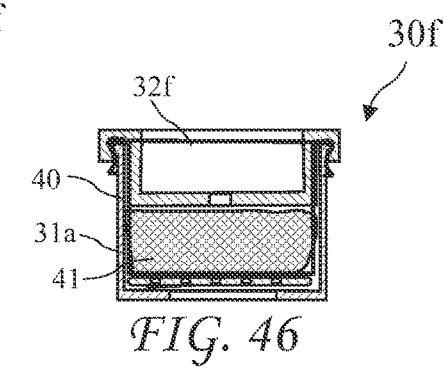
FIG. 46 is a cross-sectional view of the eleventh coffee holder taken along line 45-45 of FIG. 41 showing a full and tamped coffee holder.

A side view of an eleventh coffee holder 30k with straight walls according to the present invention is shown in FIG. 44, a cross-sectional view of the eleventh coffee holder 30k taken along line 45-45 of FIG. 44 showing an empty coffee holder is shown in FIG. 45, and a cross-sectional view of the eleventh coffee holder 30k taken along line 45-45 of FIG. 41 showing a full and tamped coffee holder. As with the coffee holder 30j, the coffee holder 30k provides straight cylindrical inside walls allowing a better fit between the lid 32f and the inside walls to reduce or eliminate coffee 41 escaping past the lid 32f during tamping. The lid 32f may be used with or without the top tamper 35b.

Figure 47B:
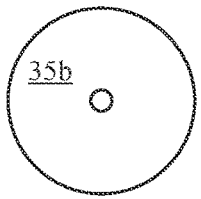
FIG. 47B is a top view of the top tamper.
Figure 47D:
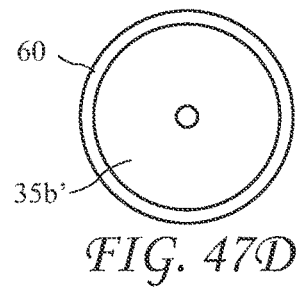
FIG. 47D is a top view of the top tamper with a seal.
Figure 47A:
FIG. 47A is a side view of a top tamper.
Figure 47C:
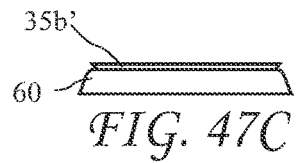
FIG. 47C is a side view of a top tamper with a seal according to the present invention.

A side view of a top tamper 35b is shown in FIG. 47A and a top view of the top tamper 35B is shown in FIG. 47B. A side view of a top tamper 35b' with a seal 60 according to the present invention is shown in FIG. 47C and a top view of the top tamper 35b' with the seal 60 is shown in FIG. 47D. In some instances, for example with a very fine ground coffee, an amount of coffee may escape past the top tamper 35b. In such instances, a user may prefer to use the top tamper 35b' with the seal 60 to reduce or eliminate the escape of the coffee.

Figure 48:
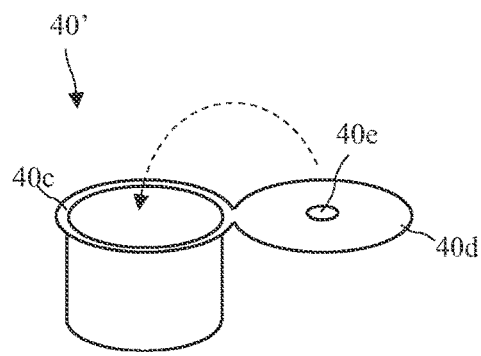
FIG. 48 is a perspective view of a filter paper cup with a folding cup lid.

A perspective view of a filter paper cup 40' with a folding cup lid 40d is shown in FIG. 48 (also see FIG. 70). The cup lid 40d may be folded over the rim 40c to reduce or prevent coffee from escaping during tamping of subsequent processing. The lid 40d may also include a perforation 40e centered on the lid 40d allowing the nozzle 19 to enter and/or inject the hot flow of water into the tamped coffee 41, but in some embodiments, the lid 40d does not include the perforation 40e. The filter paper cup 40' may be used in the coffee containers described herein, and may able be used in a coffee machine having a cavity for receiving the filter paper cup 40'. While the cup 40' is preferably made from filter paper, the cup may also be made from a reusable mesh.

A side view of a twelfth coffee holder 30l with straight walls according to the present invention is shown in FIG. 49, and a cross-sectional view of the twelfth coffee holder 30l taken along line 50-50 of FIG. 49 showing an empty coffee holder is shown in FIG. 50. The twelfth coffee holder 30l includes a straight walled base and the tamping spring below the coffee, and additionally uses a filter paper cup 40' with the folding lid 40d.

A cross-sectional view of the twelfth coffee holder 30l taken along line 50-50 of FIG. 49 showing the lid 32a, coffee 41, the filter paper cup 40' with lid 40d, above the coffee holder base 31a is shown in FIG. 51A, a cross-sectional view of the twelfth coffee holder 30l taken along line 50-50 of FIG. 49 showing the lid 32a, above the coffee 41 and the filter paper cup 40' resting in the coffee holder base 31a is shown in FIG. 51B, a crosssectional view of the twelfth coffee holder 30l taken along line 50-50 of FIG. 49 showing the lid 32a, above the coffee 41 and the filter paper cup 40' resting in the coffee holder base 31a with the filter paper cover 40d folded over the coffee 41 in the filter paper cup 40' is shown in FIG. 51C, and a cross-sectional view of the twelfth coffee holder 30l taken along line 50-50 of FIG. 49 showing the lid 32a attached to the base 31a with the coffee 41 and the filter paper cup 40' residing in the coffee holder base 31a with the coffee 41 tamped is shown in FIG. 51D. In embodiments with the coffee 41 partially exposed above the base 31a, some coffee 41 may escape during tamping. Using the filter paper cup 40' having the fold over paper lid 40d reduces or eliminates such escape of coffee 41 and additionally provides a drum like taut surface for consistent puncturing.

Figure 52:
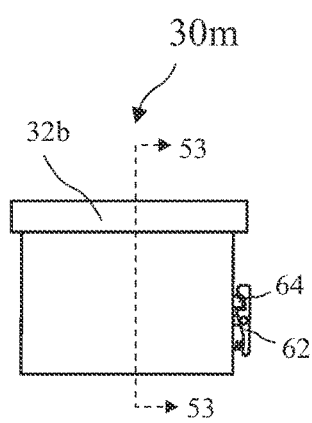
FIG. 52 is a side view of a thirteenth coffee holder with a releaseable tamping latch according to the present invention.
Figure 53:
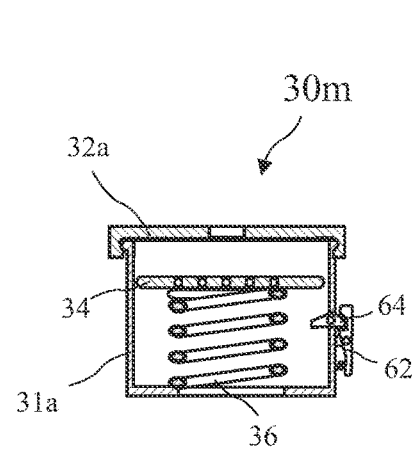
FIG. 53 is a cross-sectional view of the thirteenth coffee holder taken along line 53-53 of FIG. 52 showing an empty coffee holder.

A side view of a thirteenth coffee holder 30m with a releaseable tamping latch 64 according to the present invention is shown in FIG. 52 and a cross-sectional view of the thirteenth coffee holder 30m taken along line 53-53 of FIG. 52 showing an empty coffee holder is shown in FIG. 53. The latch 64 is held in a latched position by a spring-loaded lever 62 on the exterior of the base 31a.

Figure 54A:
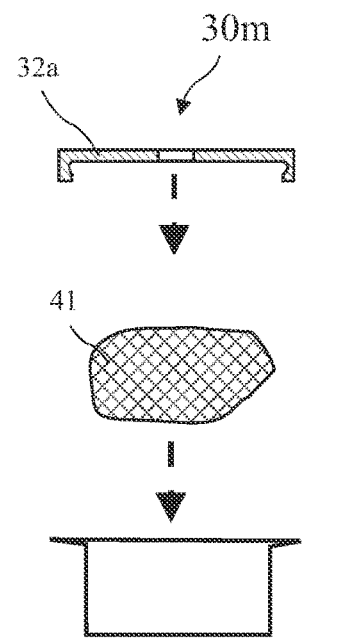
FIG. 54A is a cross-sectional view of the thirteenth coffee holder taken along line 53-53 of FIG. 52 showing a lid, coffee, a filter paper cup, above the base, and the coffee holder base, with the tamping latch retaining the bottom tamper.
Figure 54B:
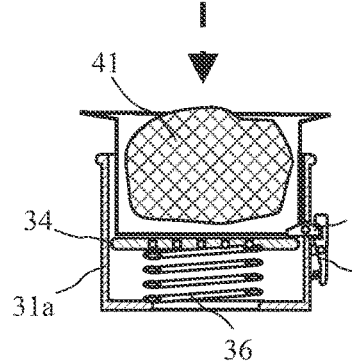
FIG. 54B is a cross-sectional view of the thirteenth coffee holder taken along line 53-53 of FIG. 52 showing the lid, above the coffee and the filter paper cup resting in the coffee holder base, with the tamping latch retaining the bottom tamper.
Figure 54C:
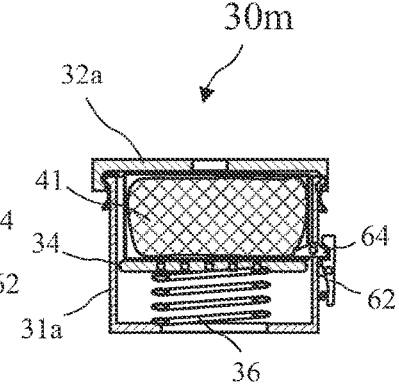
FIG. 54C is a cross-sectional view of the thirteenth coffee holder taken along line 53-53 of FIG. 52 showing the lid, above the coffee and the filter paper cup resting in the coffee holder base with the tamping latch retaining the bottom tamper.
Figure 54D:
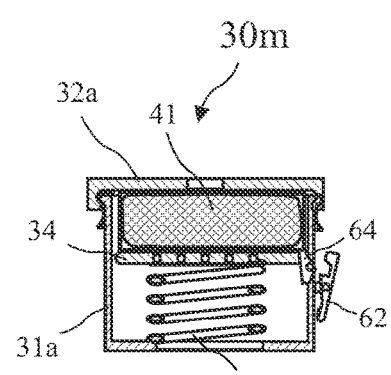
FIG. 54D is a cross-sectional view of the fourteenth coffee holder taken along line 53-53 of FIG. 52 showing the lid attached to the base with the coffee and the filter paper cup residing in the coffee holder base with tamping latch released and the coffee tamped.

A cross-sectional view of the thirteenth coffee holder 30m taken along line 53-53 of FIG. 52 showing the lid 32a, coffee 41, the filter paper cup 40, above the base 31a, and the coffee holder base 31a, with the tamping latch 64 retaining the bottom tamper 34 is shown in FIG. 54A, a cross-sectional view of the thirteenth coffee holder 30m taken along line 53-53 of FIG. 52 showing the lid 32a above the coffee 41 and the filter paper cup 40 resting in the coffee holder base 31a, with the tamping latch 64 retaining the bottom tamper 34 is shown in FIG. 54B, a cross-sectional view of the thirteenth coffee holder 30m taken along line 53-53 of FIG. 52 showing the lid 32a, above the coffee 41 and the filter paper cup 40 resting in the coffee holder base 31a with the tamping latch 64 retaining the bottom tamper 34 is shown in FIG. 54C, and a cross-sectional view of the fourteenth coffee holder 30m taken along line 53-53 of FIG. 52 showing the lid 32a attached to the base 31a with the coffee 41 and the filter paper cup 40 residing in the coffee holder base 31a with tamping latch 64 released and the coffee 41 tamped is shown in FIG. 54D. The lever 62 thus holds the latch 64 until the lever 62 is pushed to release the latch 62 to release the bottom tamper 34 to tamp the coffee 41.

Figure 55:
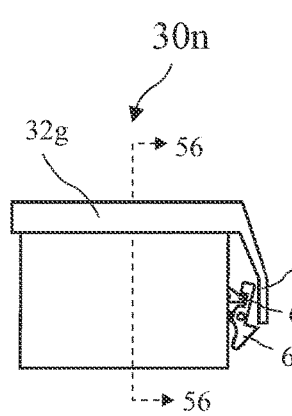
FIG. 55 is a side view of a fourteenth coffee holder with a releaseable tamping latch according to the present invention.
Figure 56:
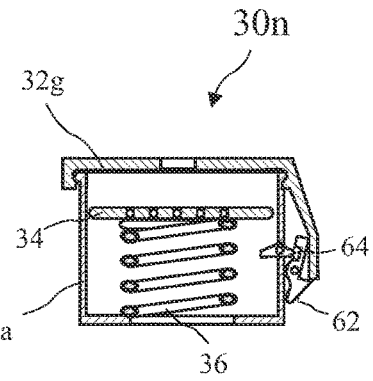
FIG. 56 is a cross-sectional view of the fourteenth coffee holder taken along line 56-56 of FIG. 55 showing an empty coffee holder.

A side view of a fourteenth coffee holder 30n with a releaseable tamping latch 64 according to the present invention is shown in FIG. 55 and a cross-sectional view of the fourteenth coffee holder taken along line 56-56 of FIG. 55 showing an empty coffee holder is shown in FIG. 56. The lever 62 holds the latch 64 until the arm 66 attached to the lid 32g pushes the lever 62 to release the latch 64.

Figure 57A:
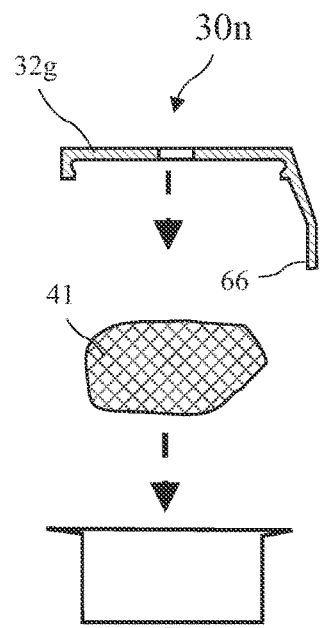
FIG. 57A is a cross-sectional view of the fourteenth coffee holder taken along line 56-56 of FIG. 55 showing a lid, coffee, a filter paper cup, above the base, and the coffee holder base, with the tamping latch retaining the bottom tamper.
Figure 57B:
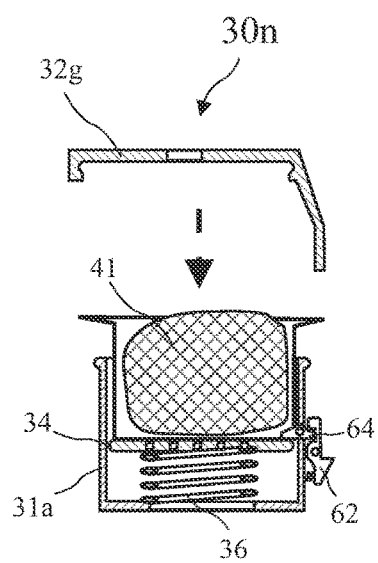
FIG. 57B is a cross-sectional view of the fourteenth coffee holder taken along line 56-56 of FIG. 55 showing the lid, above the coffee and the filter paper cup resting in the coffee holder base, with the tamping latch retaining the bottom tamper.
Figure 57C:
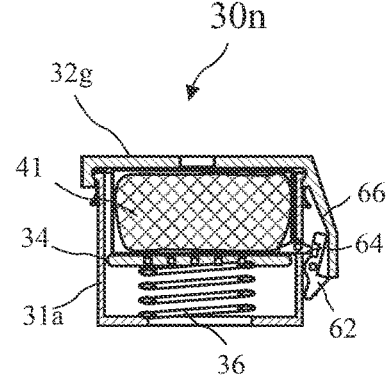
FIG. 57C is a cross-sectional view of the fourteenth coffee holder taken along line 56-56 of FIG. 55 showing the lid, above the coffee and the filter paper cup resting in the coffee holder base, with the tamping latch released but just prior to tamping.
Figure 57D:
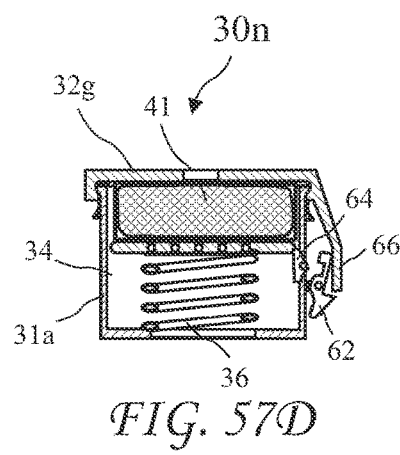
FIG. 57D is a cross-sectional view of the fourteenth coffee holder taken along line 56-56 of FIG. 55 showing the lid attached to the base with the coffee and the filter paper cup residing in the coffee holder base with tamping latch released and the coffee tamped.

A cross-sectional view of the fourteenth coffee holder 30n taken along line 56-56 of FIG. 55 showing the lid 32g, coffee 41, and the filter paper cup 40, above the coffee holder base 31a, with the tamping latch 64 retaining the bottom tamper 34 is shown in FIG. 57A, a cross-sectional view of the fourteenth coffee holder 30n taken along line 56-56 of FIG. 55 showing the lid 32g above the coffee 41 and the filter paper cup 40 resting in the coffee holder base 31a, with the tamping latch 64 retaining the bottom tamper 34 is shown in FIG. 57B, a cross-sectional view of the fourteenth coffee holder 30n taken along line 56-56 of FIG. 55 showing the lid 32g, above the coffee 41 and the filter paper cup 40 resting in the coffee holder base 31a with the tamping latch 64 released but just prior to tamping (the bottom tamper has been released but has not moved upward against the coffee 41) is shown in FIG. 57C, and a cross-sectional view of the fourteenth coffee holder 30n taken along line 56-56 of FIG. 55 showing the lid 32g attached to the base with the coffee 41 and the filter paper cup 40 residing in the coffee holder base 31a with tamping latch 64 released and the coffee 41 tamped is shown in FIG. 57D. The lever 62 thus holds the latch 64 until the lever 62 is pushed by the arm 66 to release the latch 64 to release the bottom tamper 34 to tamp the coffee 41.

Figure 58:
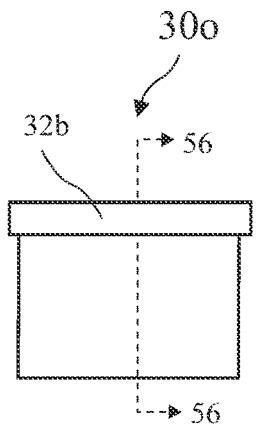
FIG. 58 is a side view of a fourteenth coffee holder with a releaseable tamping lock according to the present invention.
Figure 59:
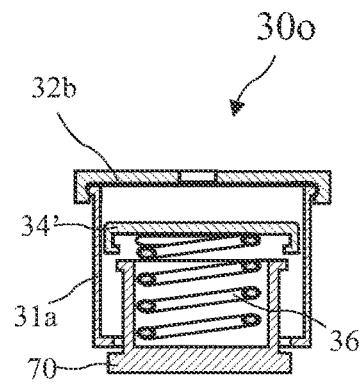
FIG. 59 is a cross-sectional view of the fourteenth coffee holder taken along line 59-59 of FIG. 58 showing an empty coffee holder.

A side view of a fourteenth coffee holder 30o with a releaseable tamping lock according to the present invention is shown in FIG. 58 and a cross-sectional view of the fourteenth coffee holder 30o taken along line 59-59 of FIG. 58 showing an empty coffee holder is shown in FIG. 59. The coffee holder 30o includes a tamping lock 70 which engages a second bottom tamper 34' to hold the second bottom tamper in a down position for filling the coffee holder with coffee and releases the bottom tamper 34' to be pushed upwards by the tamping spring 36 to tamp the coffee after the holder lid 32b is attached to the base 31a.

Figure 60A:
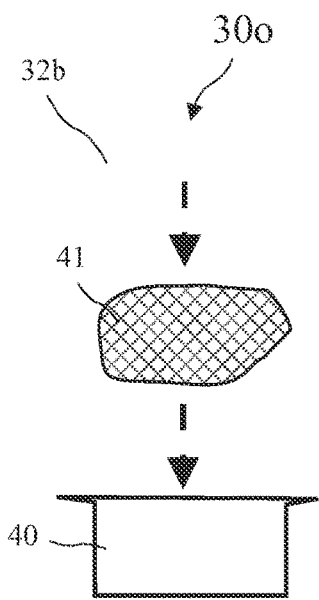
FIG. 60A is a cross-sectional view of the fourteenth coffee holder taken along line 59-59 of FIG. 58 showing a lid, coffee, a filter paper cup, above the base, and the coffee holder base, with the tamping lock retaining the bottom tamper.
Figure 60B:
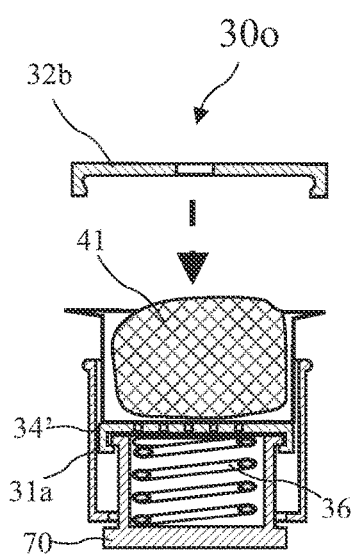
FIG. 60B is a cross-sectional view of the fourteenth coffee holder taken along line 59-59 of FIG. 58 showing the lid, above the coffee and the filter paper cup resting in the coffee holder base, with the tamping lock retaining the bottom tamper.
Figure 60C:
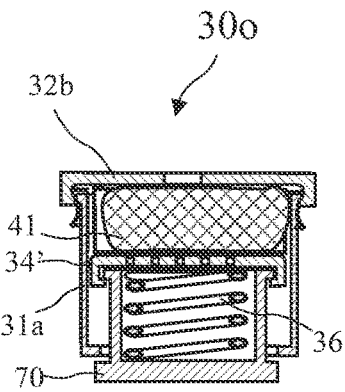
FIG. 60C is a cross-sectional view of the fourteenth coffee holder taken along line 59-59 of FIG. 58 showing the lid, above the coffee and the filter paper cup resting in the coffee holder base prior to tamping.
Figure 60D:
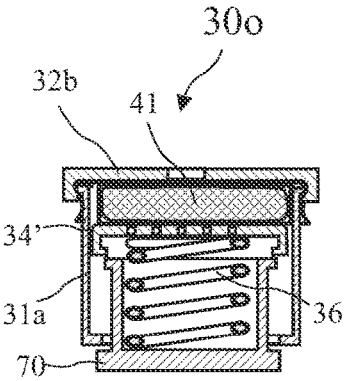
FIG. 60D is a cross-sectional view of the fourteenth coffee holder taken along line 59-59 of FIG. 58 showing the lid attached to the base with the coffee and the filter paper cup residing in the coffee holder base with tamping lock released and the coffee tamped.

A cross-sectional view of the fourteenth coffee holder 30o taken along line 59-59 of FIG. 58 showing a lid 32b, coffee 41, a filter paper cup 40, above the coffee holder base 31, with the tamping lock 70 retaining the bottom tamper 34' is shown in FIG. FIG. 60A, cross-sectional view of the fourteenth coffee holder taken along line 59-59 of FIG. 58 showing the lid, above the coffee and the filter paper cup resting in the coffee holder base, with the tamping latch retaining the bottom tamper 34' is shown in FIG. FIG. 60B, a crosssectional view of the fourteenth coffee holder taken along line 59-59 of FIG. 58 showing the lid, above the coffee and the filter paper cup resting in the coffee holder base prior to tamping is shown in FIG. 60A, and a cross-sectional view of the fourteenth coffee holder taken along line 59-59 of FIG. 58 showing the lid 32b attached to the base 31a with the coffee 41 and the filter paper cup 41 residing in the coffee holder base 31a with tamping lock released and the coffee tamped is shown in FIG. 60D.

Figure 61A:
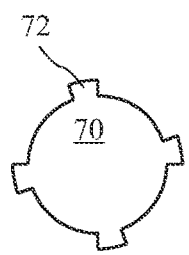
FIG. 61A is a top view of a lock according to the present invention.
Figure 61B:
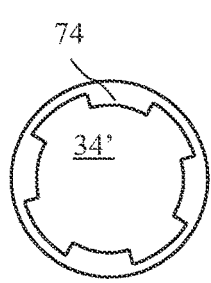
FIG. 61B is a bottom view of a second bottom tamper with cooperates with the tamping lock according to the present invention.

A top view of a tamping lock 70 according to the present invention is shown in FIG. 61A and a bottom view of a second bottom tamper 34' which cooperates with the tamping lock 70 according to the present invention is shown in FIG. 61B. The tamping lock 70 includes teeth 72 which are inserted between and turned to engage lips 74 on the bottom of the bottom tamper 34' to hold the bottom tamper in the down position for filling the coffee holder 30o with coffee 41. After the coffee holder 30o is filled with coffee and the holder lid 32b attached, the tamping lock is twisted to release the bottom tamper 32b to tamp the coffee.

Figure 62A:
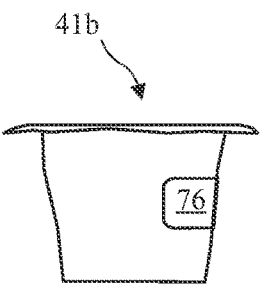
Figure 62B:
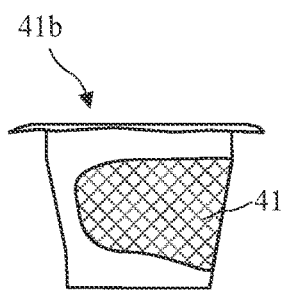
Figure 62C:
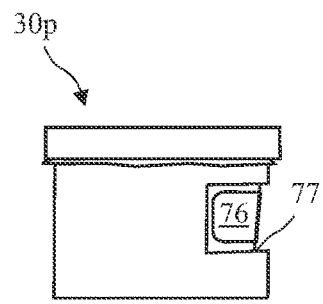

A pre-packaged rimmed brewing pod 41b for use in the coffee making according to the present invention is shown in FIG. 62A, a cut away view of the pre-packaged brewing material 41a for use in the coffee making showing the pod 41b is shown in FIG. 62B, and a coffee holder 30p having a window 77 is shown in FIG. 62C. The pod 41b is generally suitable for use in any of the coffee holders 30a-30o described above. The pod 41b further includes an identification feature 76 to provide information to the coffee maker to properly brew the specific brewing material 41 in the pod 41b. The rim of the pod 41b is captured by the lid of the coffee holder 30p thereby providing a drum like (or taut) surface for consistent puncturing by the pointed nozzle 19b (see FIGS. 39A-39C).

Figure 62D:
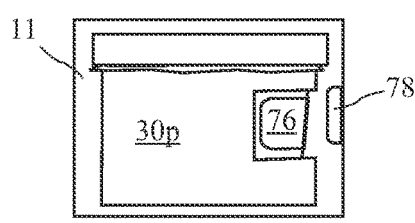
Figure 62E:
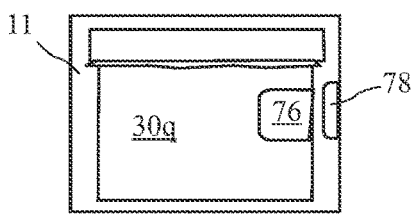

The pre-packaged rimmed brewing pod 41b is shown residing in a coffee holder 30p in FIG. 62D with the identification feature 76 cooperating with a sensor 78 residing in or near the cavity 11 of the coffee maker, and a coffee holder 30q having the identification feature 76 affixed to the coffee holder 30d is shown in FIG. 62E with the identification feature 76 cooperating with the sensor 78 residing in or near the cavity 11 of the coffee maker. The window 77 provides visual cooperation between the identification feature 76 and sensor 78 when necessary.

The identification feature 76 may be visual (for example any feature which may be read or a bar code), a readable magnetic strip, a Radio Frequency Identification (RFID), or any feature able to contain information and provide that information to a reader. The identification feature 76 may be read by a sensor 78 appropriately positioned in the cavity 11 of the coffee maker. The identification feature 76 may be on any surface of the prepackaged brewing material 41a and in the instance of a visual identification feature 76, the window 77 may be positioned on the coffee holder 30p and the sensor may be positioned in the cavity 11 to correspond with the position of the visual identification feature 76. A window 77 is generally not required for a magnetic or RF identification feature 76 and the location of the corresponding sensor 78 generally only need be sufficiently near to the identification feature 76.

In another embodiment, a sensor 78 resides on the exterior of the coffee maker. A bulk brewing material container, a prepackaged pod, a coffee holder, a recipe book, or any apparatus carrying an identification feature, may be swept past the sensor or held against or near the sensor, to provide brewing information to the coffee maker.

Figure 63B:
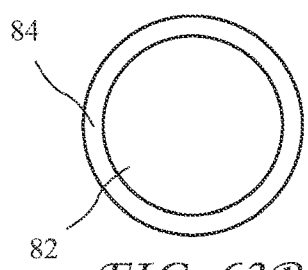
Figure 63A:
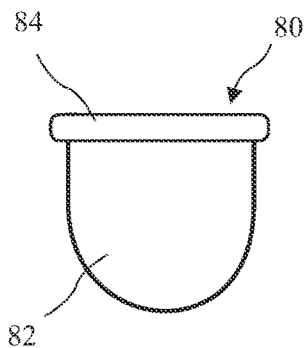

A side view of a filter cup 80 according to the present invention is shown in FIG. 63A and a top view of the filter cup 80 is shown in FIG. 63B. The filter cup 80 includes a ring 84 made a of a material sufficiently strong to hold shape in the proposed use. Filter material 82 is attached to the ring 84. The filter cup 80 is insertable into the coffee holder and in many embodiments is a replacement for the filter paper cup 40.

Figure 64:
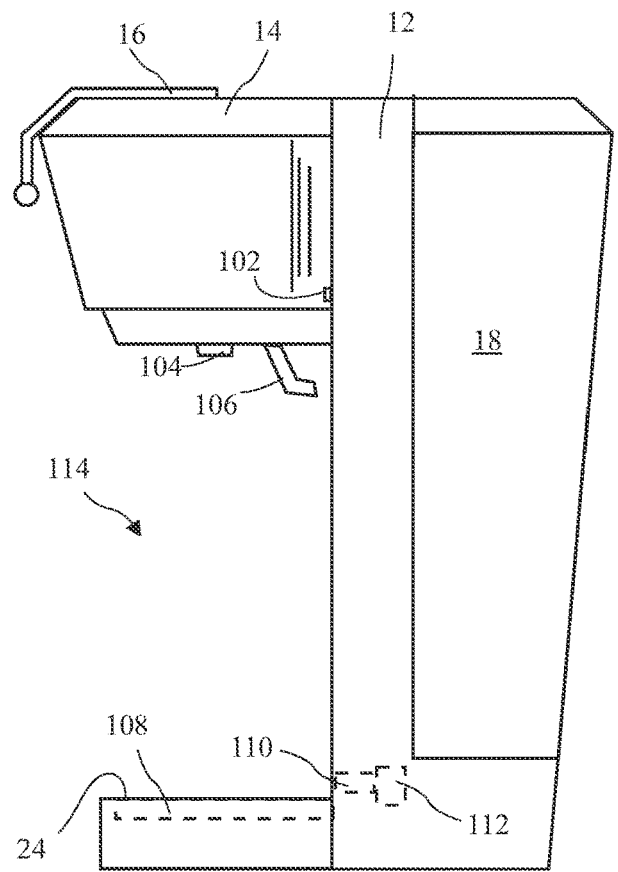

A side view of multi-mode coffee maker 100 according to the present invention is shown in FIG. 64. The multi-mode coffee maker 100 allows the user to easily make a single cup of coffee or several cups of coffee. The multi-mode coffee maker 100 includes manually operated controls 102 for selecting a volume of water for a single cup of coffee or to fill a carafe, residing in the mouth 114 of the multi-mode coffee maker 100. The controls 102 may also allow selection of a large or small cup of coffee, and of hot water only. Alternatively, the multi-mode coffee maker 100 may detect the presence of a single cup adapter 118 and limit the volume of coffee produced to an amount for a single cup, for example as an override if a user accidentally selects a volume of coffee too large for a single cup.

A spout/drip valve 104 releases the desired amount of coffee into a carafe or coffee positioned on a platform 24, and a drip valve actuator (or valve lever) 106 is actuateable to open and close the spout/drip valve 104. In other examples, the drip valve actuator may be pneumatic, hydraulic, or electric, and may be any mechanical link which opens the spout/drip valve 104. The spout/drip valve 104 may further be manually opened by a user. For example, the spout/drip valve 104 is opened by placing the multi-cup brewed coffee container 26 in the coffee maker 100 and openable for use of the single cup brewed coffee container 116 by either a mechanical or electrically operated actuator or by positioning of the single cup adapter 118 for use of the single cup.

In another embodiment the spout/drip valve 104 is opened by the positioning of a single cup adapter into position for use of a single cup in the coffee maker, for example by an arm on the single cup adapter cooperating with a lever connected to the spout/drip valve, by an arm residing at the rear of the mouth, the single cup adapter pushing against the arm to open the spout/drip valve, or by any mechanical or electrical apparatus connected to the spout/drip valve and actuated by positioning the single cup adapter to use a single cup in the coffee maker. In still another embodiment the flow of brewed coffee is controlled by turning the pump 21 on and off, by controlling a boiler, or by controlling a valve preventing the flow of water to the coffee holder.

A hot plate 108 is recessed on the top surface of the platform 24 and the recess is larger than the footprint of the multi-cup brewed coffee container (or carafe) 26 allowing contact with the hot plate 108 for keeping a carafe at a minimum temperature. A passage 110 allows a finger 120 of a single cup adapter 118 (see FIG. 67B) to engage a switch 112 to turn off the hot plate 108 when the single cup adapter 118 is in use.

Figure 65B:
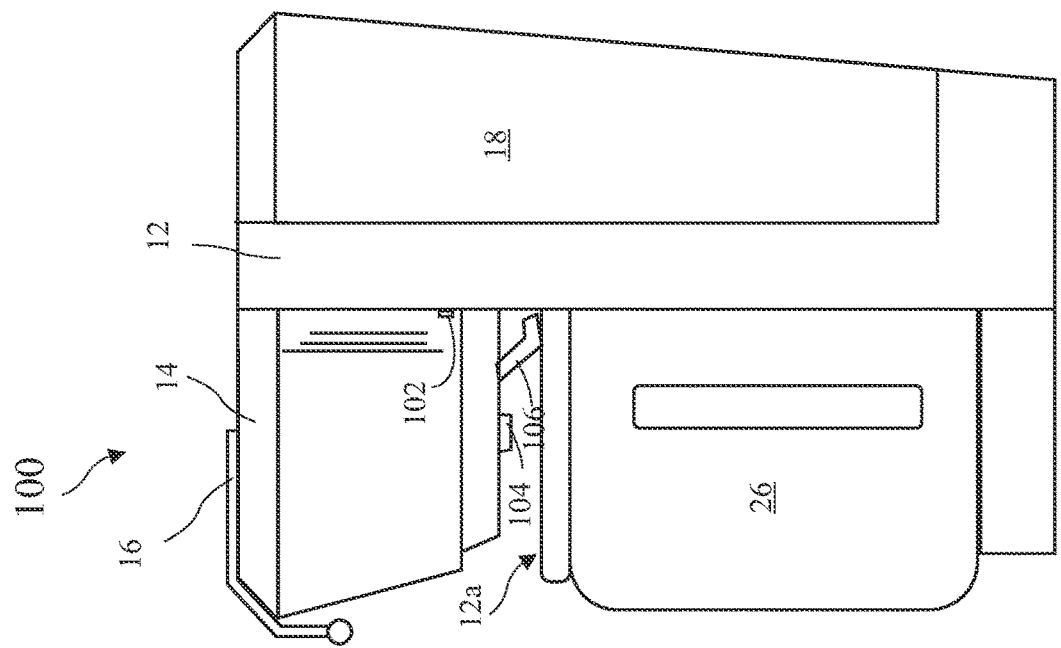
Figure 65A:
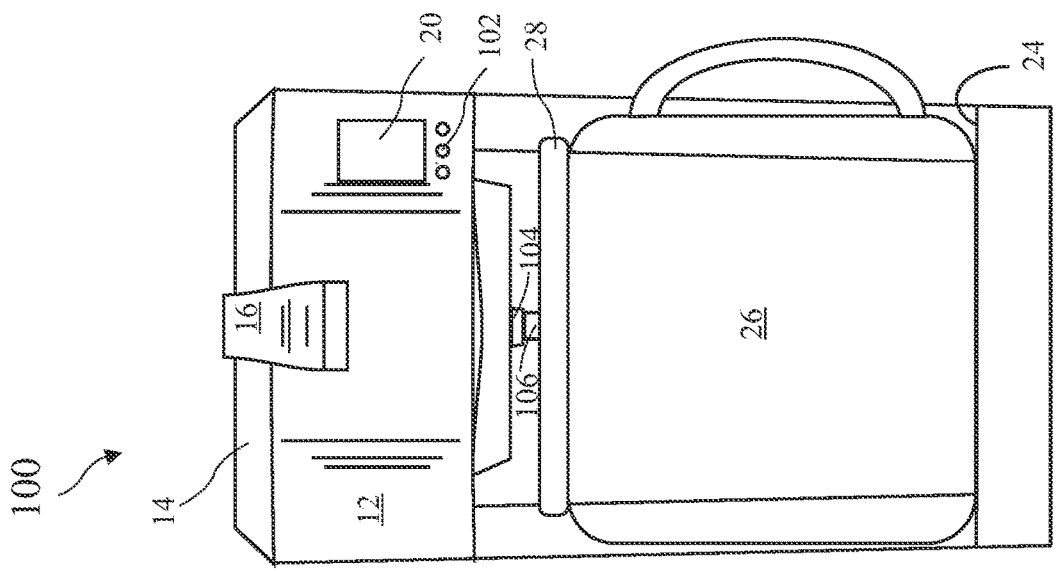

A front view of the multi-mode coffee maker 100 with a carafe 26 residing on the platform 24 for receiving a selected volume of coffee is shown in FIG. 65A and a side view of the multi-mode coffee maker 100 with the carafe 26 positioned for receiving a selected volume of coffee is shown in FIG. 65B. The top edge of the carafe 26 pushes the valve lever 106 upward opening the spout/drip valve 104 to allow the selected volume of coffee to flow into the carafe 26.

Figure 66A:
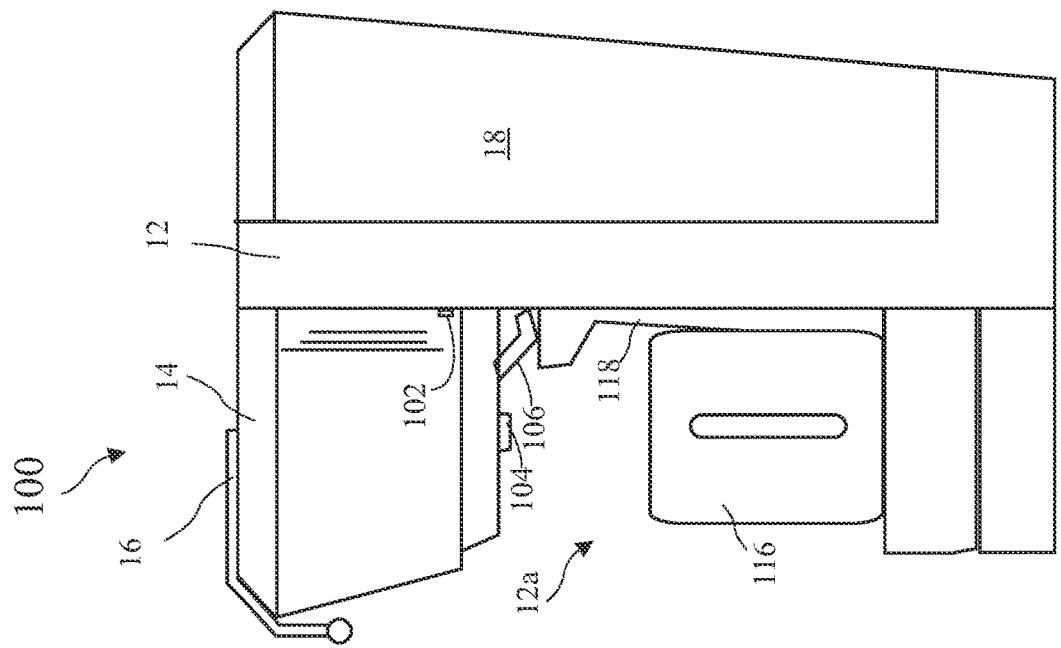
Figure 66B:
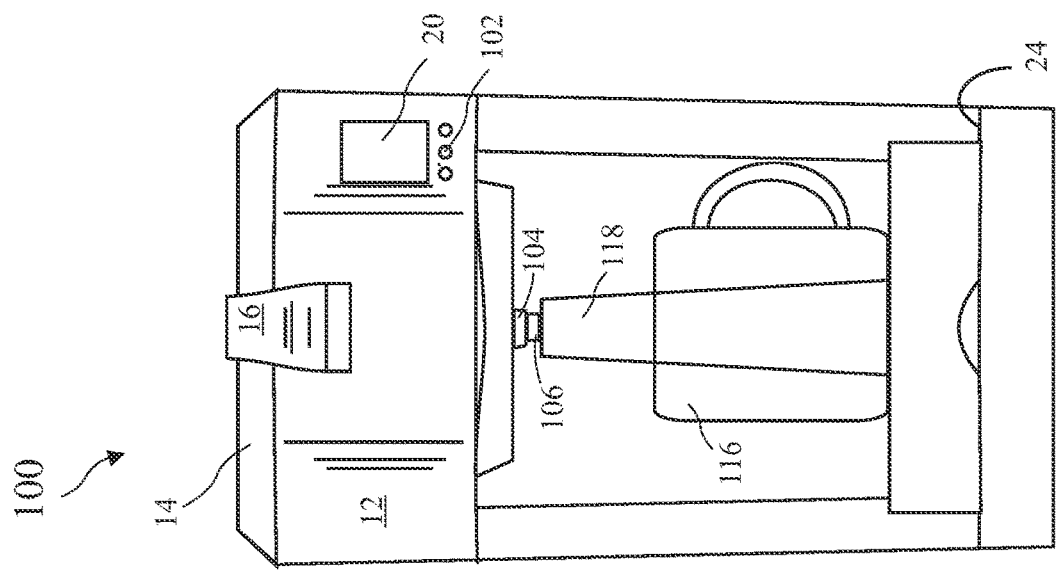

A front view of the multi-mode coffee maker 100 with a coffee cup (or single cup brewed coffee container) 116 residing on a single cup adapter 118 for receiving the selected volume of coffee is shown in FIG. 66A and a side view of the multi-mode coffee maker 100 with the coffee cup residing on the single cup adapter 118 for receiving the selected volume of coffee is shown in FIG. 66B. The single cup adapter 118 includes an upward reaching arm portion 118b (see FIG. 67B) which pushes the valve lever 106 upward opening the spout/drip valve 104 to allow the selected volume of coffee to flow into the coffee cup 116.

A front view of a single cup adapter 118 according to the present invention is shown in FIG. 67A, a side view of the single cup adapter 118 is shown in FIG. 67B, a top view of the single cup adapter 118 is shown in FIG. 67C, and a cross-sectional view of the single cup adapter 118 taken along line 68-68 of FIG. 67A is shown in FIG. 68. The single cup adapter 118 includes a base portion 118a which includes a single cup platform 129 for supporting the coffee cup 116 and a drip basin (or tray) 124 for catching and holding drops from the spout/drip valve 104. A grill 126 resides over the drip basin 124 and the coffee cup 116 rests on the grill 126. An arm portion 118b reaches up and an angled surface 128 at the top of the arm portion 118b cooperates with the valve lever 106 to open the spout/drip valve 104 when the single cup adapter 118 is positioned in the coffee maker 100. In another embodiment, the drip tray may be integrated into the coffee maker 100 and may pivot or slide into position under the coffee cup 116, for example, the single cup adapter 118 may have an open side or rear that the drip tray slides or pivots into.

A downward protrusion 122 on the bottom of the base portion 118a fits into a recess in the platform 24 to correctly position the single cup adapter 118 in the mouth 114 of the coffee maker 100, and to resist easy detachment of the single cup adapter 118 from the coffee maker 100. A rearward reaching finger 120 enters the passage 110 to actuate the switch 112 (see FIG. 64) to turn off the hot plate when the single cup adapter 118 is attached to the coffee maker 100. The finger 120 and switch 112 are one example of a means for turning off the hot plate 108 when the single cup adapter 118 is attached to the coffee maker 100. Other means include a magnet switch detecting the presence of the hot plate 108 in the single cup adapter 118 by the proximity of a magnet and piece of magnetically attractive metal or a second magnet, a switch in the platform, or even a manual switch, and a coffee maker according to the present invention with any switch for turning off the hot plate is intended to come within the scope of the present invention.

A side view of a second single cup adapter 118' according to the present invention is shown in FIG. 67D. The single cup adapter 118' is a compact version of the single cup adapter 118 and does not include the arm portion 118b. The single cup adapter 118' provide single serving functions through the insertion of the rearward reaching finger 120 into the coffee maker 100. These functions include shutting off the hot plate 108 (see FIG. 64), opens the open the spout/drip valve 104 to release brewed beverage, setting the coffee maker 100 to the single serving mode (limits the beverage to one to sixteen ounces).

A side view of a multi-serving dry coffee holder 130a according to the present invention for use in the multi-mode coffee maker 100 for making several cups of brewed coffee is shown in FIG. 69A and a side view of a single-serving dry coffee holder 130b according to the present invention for use in the multi-mode coffee maker 100 for making one cup of coffee is shown in FIG. 69B. A variety of dry coffee holders 30a-30o and means for containing and tamping dry coffee in a coffee maker are disclosed in FIGS. 3 though 63B, and a multi-mode coffee maker 100 including any of the coffee holders disclosed herein, or any other coffee holder, is intended to come within the scope of the present invention.

A coffee maker 210 and reuseable cartridge 230 according to the present invention are shown in FIG. 70, a side view of the reuseable cartridge 230, is shown in FIG. 71B, a top view of the reuseable cartridge 230 is shown in FIG. 71B, and a crosssectional view of the reuseable cartridge according to the present invention taken along line 72-72 of FIG. 71B. The reuseable cartridge 230 comprises a cover 230a and a base 230b. The cover 230a is removeable from the base 230b to fill the reuseable cartridge 230 with brewing material 41. Generally, the reuseable cartridge 230 is filled by pouring loose coffee 41 into the base 230b. Once filled with the brewing material 41, the reuseable cartridge 230 is inserted into the cavity 211 of the coffee maker 210 and the lid 214 is closed. The lid 214 of the coffee maker 210 generally includes a projections 214a which engages recesses 236a of the cover 236 to urge the reuseable cartridge 230 into position in the cavity 211. A flow of water 232 (generally a flow of heated water) enters the reuseable cartridge 230, passes through the brewing material 41, and a flow of brewed beverage 234 exits the reuseable cartridge 230. An identification feature 7 resides on a bottom surface providing the benefits described in FIGS. 62A-62E above. Such identification feature 76 may be attached other positions on the exterior of the reuseable cartridge 230.

A side view of a cover 230a of the reuseable cartridge 230 is shown in FIG. 73A, a top view of the cover 230a of the reuseable cartridge 230 is shown in FIG. 73B, and a cross-sectional view of the cover 230a of the reuseable cartridge 230 taken along line 74-74 of FIG. 73B. The cover includes recesses 236a and 236b.

A side view of a base 230b of the reuseable cartridge 230 is shown in FIG. 75A, a top view of the base 230b is shown in FIG. 75B, and a cross-sectional view of the base 230b taken along line 76-76 of FIG. 75B is shown in FIG. 76. The base 230b includes entry port 238a for the flow of water 232, and exit port 238b for the flow of brewed beverage 234. The flow of water 232 enters the base 230a and much climb over the wall 240 to reach the interior of the 244 of the base 230b. Forcing the flow of water 232 over the wall 240 causes the flow of water 232 to pass through the brewing material 41, thereby producing a rich brewed beverage. A filter 242 resides over the exit port 238b to prevent the brewing material 41 from escaping into a cup of brewed beverage.

A side view of a brewed beverage pod 250 for use in the reuseable cartridge 230 according to the present invention is shown in FIG. 77A and a top view of the brewed beverage pod 250 is shown in FIG. 77B. The brewed beverage pod 250 is shaped to conform reasonably well to the interior of the 244 of the base 230b and includes a passage 250a for the recess 236a in the cover 230a.

A side view of a filter paper 252 for use in the reuseable cartridge 230 according to the present invention is shown in FIG. 78A and a top view of the filter paper 252 is shown in FIG. 78B. The filter paper 252 is shaped to conform reasonably well to the interior of the 244 of the base 230b and includes a passage 252a for the recess 236a in the cover 230a. The filter paper 252 includes a filter cover 252'. After inserting the filter paper 252 into the base 230b and filling the filter paper 252 with brewing material 41, the filter cover 252' is folded over the brewing material 41 and the cover 230a is pressed onto the base 230b. A rim 253 of the filter paper 252, and matching rim 253' of the filter cover 252' may be sandwiched between the cover 230a and base 230b to securely hold the filter cover 252' on the filter paper 252 to retain the brewing material 41 in the filter paper 252.

A side view of the filter paper cup 40 with the folding paper lid 40d open is shown in FIG. 79A, a top view of the filter paper cup 40 is shown in FIG. 79B, a second side view of the filter paper cup 40 with the folding paper lid 40d closed is shown in FIG. 7C, and a cross-sectional view of the filter paper cup 40 taken along line 80-80 of FIG. 79B is shown in FIG. 80. The lid 40d of the filter paper cup 40 may be folded over the cup 40 and sealed after loose brewing material 41 is poured into the cup. The filter paper cup 40 includes a receptacle 40g formed from a bottom 40b, sides 40a, and a rim (or annular rim) 40c, and a cover (or lid) 40d for closing the receptacle 40g to capture brewing material in the filter paper cup 40. The filter paper cup 40 is formed using heat and/or moisture to form permanent folds (or pleats) 40f in the sides 40a and rim 40c of the filter paper cup 40 to add strength and rigidity to the filter paper cup 40 so that the filter paper cup 40 retains its shape after forming, and preferably, adhesive is applied to the rim 40c and/or the sides 40a to retain the pleats and add strength and rigidity to the filter paper cup 40. Preferably, the filter paper cup 40 is constructed from heat sealable filter paper having a heat reacting film on at least one side, which film causes the pleats to adhere to adjacent pleats when heat is applied following forming. The pleats in the rim 40c are generally continuations of the pleats in the sides 40a. The filter paper cup 40 may alternatively be corrugated to retain shape. The filter paper cup 40 thus has structure for maintaining a substantially (i.e., within the ability of the paper to maintain a shape) frustoconical or cylindrical shape unlike known coffee pods with have no structure for maintaining shape and are pillow-like. U.S. patent application Ser. No. 11/392,893 filed Mar. 28, 2006 filed by the present inventor, discloses a similar filter paper cup forming a coffee pod. The '893 application is incorporated by reference above.

The filter paper cup 40 is preferable frusto-conical shaped or cylindrically shaped and more preferably frusto-conical shaped. The filter paper cup 40 has a base diameter D1, an inner top diameter D2, an outer top diameter (the diameter of the rim) D3, and a height H. The diameter D1 is preferably approximately 1.25 inches, the diameter D2 is preferably approximately 1.625 inches, the diameter D3 is preferably approximately 2.125 inches, and the height H is preferably approximately one inch. The rim 40c is thus approximately 0.25 inches wide. The lid 40d has approximately the same diameter D3 as the rim 40c.

The filter paper cup 40 may be sold in an empty state for filling by a user, or as a pre-packaged single serving coffee pod. When sold for filling by the user, the filter paper cup 40 is preferably sold with the cover 40d attached to the rim 40c of the receptacle 40g. For example, the filter paper cup 40 may be made from a single piece of filter paper cut into two circular portions attached by a hinge 40h, or by two separately cut pieces of filter paper attached at the hinge 40h. The filter paper cup 40 may be sold as two pieces, where the cover 40d is detached from the receptacle 40g, but may be more difficult to use. A user may seal the cover 40d to the rim 40c of the receptacle 40g as disclosed in the '893 patent, or the cover 40d may be held to the receptacle 40g by sandwiching the filter paper cup 40 between a holder lid 32a and holder body 31. When the filter paper cup 40 is sold as a ready to use pod containing brewing material, the pod is generally manufactured using filter paper off two separate rolls as described below.

A cross-sectional side view of a pod holder 30r showing the pod holder 30r with the tamping spring 36 and bottom tamper 34, the filter paper cup 40 containing a portion of coffee 41, and the holder lid 32a ready to attach to a holder body 31a is shown in FIG. 81A, and a cross-sectional side view of the pod holder 30r the coffee holder with the tamping spring and bottom tamper, the portion of coffee in the filter paper cup, and the holder lid attached to the holder body with the rim of the filter paper cup sandwiched between the lid and coffee holder and the tamping spring and bottom tamper pushing the filter paper cup against the lid according to the present invention is shown in FIG. 81B. The rim 40c rests on a top edge of the holder body 31 and is sandwiched between the holder lid 32a and body 31a when the lid 32a is attached to the body 31a, thereby holding the filter paper cup 40 against the holder lid 32a so that a needle inserted through the holder lid 32a will puncture the folding paper lid 40d and inject hot water into the filter paper cup 40. The brewing material 41 is preferably retained in the filter paper cup 40 solely by attaching a lid 32a of the pod holder 30r to the base 31a of the pod holder to sandwich the rim 40c of the filter paper cup 40 and the outer edge of the cover 40d between the lid of the pod holder to the base of the pod holder. U.S. patent application Ser. No. 11/777,831, filed Jul. 13, 2007, describes a similar pod holder. The '831 application is incorporated by reference above.

The inside diameter D4 of the mouth of the pod holder 30r is approximately the same size as the Diameter D2 of the filter paper cup 40 and is preferably approximately 1.625 inches, thereby facilitating the capture and sandwiching of the rim 40c and edge of the cover 40d between the holder lid 32a and body 31a. Sandwiching of the rim 40c and edge of the cover 40d between the holder lid 32a and body 31a both seals the brewing material in the filter paper cup 40 to prevent or restrict the escape of the brewing material from the filter paper cup 40 during brewing and provides a taut cover 40d facilitating puncturing the cover 40d by a needle used to inject heated water into the filter paper cup 40 during brewing. The body 31a may have a cylindrical or frusto-conical shape.

Another embodiment of the coffee holder 30s is shown in FIG. 82. The coffee holder 30a is similar to the coffee holder 30s but omits the tamping spring 36 and bottom tamper 34.

A side view of the filter paper cup 40" with a separate receptacle 40g" and paper lid 40d" is shown in FIG. 83A, a top view of the filter paper cup 40" with the separate receptacle 40g" and paper lid 40d" is shown in FIG. 83B, and a second side view of the filter paper cup 40" with the separate paper lid 40d" residing on the receptacle 40g" is shown in FIG. 83C. The filter paper cup 40" includes the features of the filter paper cup 40, except the lid 40d" is not hingedly attached to the receptacle 40g" and is a separate piece. Further, the receptacle 40g" may be used without the lid 40d".

A top and side view of a coffee holder 30t is shown in FIG. 84A, a bottom and side view of the coffee holder 30t is shown in FIG. 84B, a top and side view of body 31d of the coffee holder 30t with a lid 32h removed is shown in FIG. 85, and a cross-sectional view of the coffee holder 30t of FIG. 84A with the lid 32h removed, taken along line 86-86 of FIG. 85, is shown in FIG. 86. The base 31d includes between three and six side windows 300 and between three and six bottom windows 302, and preferably four side windows 300 and bottom windows 302. The windows 300 and 302 allow unrestricted flow from a filter material receptacle 40g" (see FIG. 83C) residing inside the base 31d, and allow portions of the filter material receptacle 40g" to expand into and through the windows 300 and 302.

A top view of a lid 32h of the coffee holder 30t is shown in FIG. 87A and a bottom view of a lid of the coffee holder 30t is shown in FIG. 87B. The lid 32h includes a round skirt 304 which cooperates with an annular interior surface 306 of the base 31d to sandwich the filter material receptacle 40g", retaining the filter material receptacle 40g" in the base 31d.

A first side view of the coffee holder 30t is shown in FIG. 88A, a second side view of the coffee holder 30t of FIG. 84A rotated 45 degrees, is shown in FIG. 88B, a top view of the coffee holder 30t is shown in FIG. 88C, and a bottom side view of the coffee holder 30t is shown in FIG. 88D. Additionally, a top view of the coffee holder 30t with the lid 32h removed is shown in FIG. 89A and a bottom view of the coffee holder 30t with the lid 32h removed is shown in FIG. 89B. The base 31d has a height Hb of about 1.45 inches and base bottom diameter Db of about 1.35 inches. The wall windows 300 have a height Hw of between 0.5 inches and one inch, and preferably about 0.72 inches measured to a peak of an arched opening and a window width Ww of between 0.3 inches and 0.7 inches, and preferable about 0.45 inches. In general, the wall windows 300 reach about one half the base height Hb, and between 30 and 60 percent and preferably about 41 percent of the base circumference. The bottom windows 302 have a combined area of between 40 and 70 percent of the area of a bottom 308 of the base 31d, and preferably about 60 percent of the area of the bottom 308 of the base 31d.

A preferred method for manufacturing the filter paper cups includes the following steps. Providing filter paper to a machine. Forming a receptacle in the filter paper. Using heat and/or steam make the filter paper retain the receptacle shape. Cutting out the receptacle and the lid. The following additional steps may be used to manufacture a pod according to the present invention. Filling the receptacle with brewing material. Tamping the brewing material in the receptacle. Positioning the lid over the receptacle. Attaching the lid to the receptacle. Nitrogen flushing and sealing the pod. Either the filter paper cups or the completed pods may be manufactured in a printing press or an assembly line style.

While the present invention is described above as placing loose coffee in a coffee holder, the invention may also be practiced by placing prepackaged coffee, for example coffee pods, into the coffee holder. Further, while the coffee holder is generally described as having a snap on lid, a screw on lid may also be used, and in general the various elements of different embodiments described above may be mixed to provide new embodiments and such new embodiments are intended to come within the scope of the present invention.

Further, many embodiments are described as including a coffee chamber comprising a filter paper cup. In many cases, a filter cup made of nylon mesh or metal mesh is equally suitable, and any coffee holder or combination of coffee maker and coffee holder including a filter chamber which holds coffee and allows the coffee to be tamped as described above is intended to come within the scope of the present invention regardless of the specific filter material. Further, those skilled in the art will recognize that the features of the various embodiments of the present invention disclosed herein may be combined to provide various combinations. All of such combinations are intended to come with the scope of the present invention.

While the invention herein disclosed has been described by means of specific embodiments and applications thereof, numerous modifications and variations could be made thereto by those skilled in the art without departing from the scope of the invention set forth in the claims.

I claim:

1. A holder, comprising:
   a holder base; and
   a holder lid;
   wherein the holder base includes:
      a sidewall, defining an interior space and having an open top end and an open bottom end; and
      a partition arranged within the interior space of the sidewall, in contact with an interior surface of the sidewall between the open top end and the open bottom end, thereby dividing the interior space and defining an upper interior portion and a lower interior portion;
   wherein the sidewall includes at least one sidewall opening separated from the open top end;
   wherein the holder lid is configured to removably sealingly engage with the open top end of the sidewall, wherein the holder lid includes a holder lid opening; and
   wherein the holder is configured to accept input fluid through the holder lid opening and to provide a corresponding outflow of fluid through the at least one sidewall opening.

2. The holder of claim 1, further comprising a filter that is configured to be held within the base.

3. The holder of claim 1, wherein at least one of the at least one sidewall opening is at least partially covered by a screen material.

4. The holder of claim 1, wherein the at least one sidewall opening is four sidewall openings.

5. The holder of claim 1, wherein the holder lid is configured to repeatedly removably engage with the top edge of the sidewall.

6. The holder of claim 1, wherein the lower interior portion is configured to provide distance for the partition to avoid a lower nozzle of a beverage brewer.

7. The holder of claim 1, wherein the sidewall surrounds a periphery of the partition.

8. The holder of claim 1, wherein at least one of the at least one sidewall opening spans the enclosed upper interior portion and the enclosed lower interior portion.

9. The holder of claim 1, wherein the partition is arranged to provide a bottom platform for the upper interior portion.

10. The holder of claim 1, wherein the upper interior portion is configured to hold a filter, and the partition is arranged to provide a bottom support for the upper interior portion.

11. The holder of claim 2, wherein the filter is a cup made of filter material, configured to receive and hold ground brewing material.

12. The holder of claim 4, wherein points at which the partition is in contact with the interior surface of the sidewall define a cross shape of the partition.

13. A holder, comprising:
    a holder base; and
    a holder lid;
    wherein the holder base includes:
       a bottom, and
       a sidewall extending from the bottom;
    wherein the bottom and the sidewall define a filter space of the holder base;
    wherein the sidewall includes a top edge opposite the bottom;
    wherein the sidewall includes at least one sidewall opening separated from the top edge, and the bottom includes at least one bottom opening;
    wherein the holder lid is configured to repeatedly removably sealingly engage with the top edge of the sidewall, wherein the holder lid includes a holder lid opening;
    wherein the holder is configured to accept input fluid through the holder lid opening and to provide a corresponding outflow of fluid through the at least one sidewall opening and the at least one bottom opening; and
    wherein the top edge of the sidewall and the holder lid are configured to secure a rim of a filter at least partially arranged in the filter space when the holder lid is engaged with the top edge of the sidewall.

14. The container of claim 2, wherein the sidewall encloses the bottom at a fixed distance from a bottom edge of the sidewall.

15. The holder of claim 13, further comprising a filter configured to be at least partially held in the filter space, wherein the filter includes a filter lid configured to be arranged on the rim.

16. The holder of claim 13, wherein the at least one sidewall opening is at least partially covered by a screen material.

17. The holder of claim 13, wherein the holder base openings are four holder base openings.

18. The holder of claim 13, further comprising a cup made of filter material, configured to be at least partially held in the filter space and to receive and hold ground brewing material.

19. The holder of claim 13, wherein the holder lid is configured to sealingly engage with the top edge of the sidewall.

20. The holder of claim 13, wherein the holder is configured to accept input fluid through the holder lid opening and to provide a corresponding filtered outflow of fluid through the at least one sidewall opening and the at least one bottom opening.

21. A beverage brewing holder, comprising:
    a holder base; and
    a holder lid;
    wherein the holder base includes:
       a bottom,
       a sidewall extending from the bottom and having a top edge opposite the bottom, defining a filter space, and
       a plurality of holder base openings, separated from the top edge, providing fluid communication between an interior of the holder base and an exterior of the holder base;
    wherein the holder lid is configured to repeatedly removably engage with the top edge of the sidewall, wherein the holder lid includes a holder lid opening;
    wherein the holder is configured to accept input fluid through the holder lid opening and to provide a corresponding outflow of fluid through the holder base openings; and
    wherein the top edge of the sidewall and the holder lid are configured to secure a rim of a filter at least partially arranged in the filter space when the holder lid is engaged with the top edge of the sidewall.

22. The holder of claim 21, further comprising a filter configured to be at least partially held in the filter space, wherein the filter includes a filter lid configured to be arranged on the rim.

23. The holder of claim 21, wherein the at least one holder base opening includes a sidewall opening.

24. The holder of claim 21, wherein the holder is configured to accept input fluid through the holder lid opening and to provide a corresponding filtered outflow of fluid through the holder base openings.

* * * * *